United States Patent
Dutta

(10) Patent No.: US 11,929,925 B2
(45) Date of Patent: Mar. 12, 2024

(54) RELIABLE GENERIC ROUTING ENCAPSULATION TUNNELS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 353 days.

(21) Appl. No.: 17/123,430

(22) Filed: Dec. 16, 2020

(65) Prior Publication Data
US 2022/0191139 A1    Jun. 16, 2022

(51) Int. Cl.
*H04L 45/74* (2022.01)
*H04L 12/46* (2006.01)
*H04L 69/22* (2022.01)

(52) U.S. Cl.
CPC .......... *H04L 45/74* (2013.01); *H04L 12/4633* (2013.01); *H04L 69/22* (2013.01); *H04L 2212/00* (2013.01)

(58) Field of Classification Search
None
See application file for complete search history.

(56) References Cited

U.S. PATENT DOCUMENTS

| 10,142,129 B1* | 11/2018 | Gupta | H04L 45/66 |
| 2006/0262783 A1* | 11/2006 | Nedeltchev | H04L 63/164 |
| | | | 370/389 |
| 2013/0250956 A1* | 9/2013 | Sun | H04L 12/4633 |
| | | | 370/392 |
| 2019/0097840 A1* | 3/2019 | Li | H04L 63/0272 |

OTHER PUBLICATIONS

"Internet Protocol, DAPRA Internet Program, Protocol Specification", RFC 791, Sep. 1981, 49 pages.
Stewart, "Stream Control Transmission Protocol", Network Working Group, RFC 4960, Sep. 2007, 152 pages.
Thomson et al., "Using TLS to Secure QUIC", Internet-Draft, Dec. 13, 2020, 65 pages.
(Continued)

*Primary Examiner* — Christine T Duong
(74) *Attorney, Agent, or Firm* — Tong, Rea, Bentley & Kim, LLC

(57) ABSTRACT

A router encapsulates a payload of a packet in a generic routing encapsulation (GRE) header that defines a connectionless GRE tunnel. The router also encapsulates the payload and the GRE header in one or more reliable transport headers associated with a connection formed using a reliable transport layer. The router conveys the packet via the connectionless GRE tunnel over the reliable transport layer. In some cases, the GRE header is a network virtualization using GRE (NVGRE) header that allows multiple NVGRE overlays to be multiplexed onto a single IP underlay tunnel. The reliable transport layer can be implemented as Transmission Control Protocol (TCP) layer, a QUIC protocol, a Stream Control Transmission Protocol (SCTP) or a QUIC protocol to establish a set of multiplexed sub-connections or streams over a single connection between two endpoints of the tunnel, or a transport layer security (TLS) cryptographic protocol.

31 Claims, 57 Drawing Sheets

(56) References Cited

OTHER PUBLICATIONS

"Transmission Control Protocol, DARPA Internet Program, Protocol Specification", RFC 793, Sep. 1981, 89 pages.
Yengar et al., "Quic: A UDP-Based Multiplexed and Secure Transport", Internet-Draft, Dec. 13, 2020, 206 pages.
Jacobson et al., "TCP Extensions for High Performance", Network Working Group, RFC 1323, May 1992, 37 pages.
U.S. Appl. No. 16/911,980, filed Jun. 25, 2020, listing Pranjal Kumar Dutta as inventor, entitled "Multilayer Tunneling of Protocol Over Quic".
"Priority-Based Flow Control", <http://1.ieee802.org/dcb/802-1qbb>, Accessed Dec. 16, 2020, 8 pages.
Friedl et al., "Transport Layer Security (TLS) Application-Layer Protocol Negotiation Extension", Internet Engineering Task Force (IETF), RFC 7301, Jul. 2014, 9 pages.
Ford et al., "TCP Extensions for Multipath Operation with Multiple Addresses", Internet Engineering Task Force (IETF), RFC 6824, Jan. 2013, 64 pages.
"Enhanced Transmission Selection", <http://1.ieee802.org/dcb/802-1qaz>, Accessed Dec. 16, 2020, 12 pages.
Braden, "Requirements for Internet Hosts—Communication Layers", Network Working Group, RFC 1122, Oct. 1989, 116 pages.
Deering et al., "Internet Protocol, Version 6 (IPv6) Specification", Network Working Group, RFC 2460, Dec. 1998, 39 pages.
Farinacci et al., "Generic Routing Encapsulation (GRE)", Network Working Group, RFC 2784, Mar. 2000, 9 pages.
Floyd et al., "An Extension to the Selective Acknowledgment (Sack) Option for TCP", Network Working Group, RFC 2883, Jul. 2000, 17 pages.
Garg et al., "NVGRE: Network Virtualization Using Generic Routing Encapsulation", Independent Submission, RFC 7637, Sep. 2015, 17 pages.

\* cited by examiner

700

| 0 | | 1 | 0 | Reserved0 | VER | PROTOCOL TYPE 0x6570 |
|---|---|---|---|---|---|---|
| VIRTUAL SUBNET ID (VSID) | | | | | | FlowID |

| 0 | | 1 | 0 | Reserved0 | VER | PROTOCOL TYPE 0x6572 |
|---|---|---|---|---|---|---|
| VIRTUAL SUBNET ID (VSID) | | | | | | FlowID |
| UPPER LAYER PROTOCOL TYPE | | | | | | |

FIG. 8

RELIABLE GENERIC ROUTING ENCAPSULATION TUNNELS

BACKGROUND

Networks typically use the Internet Protocol (IP) for addressing host interfaces, encapsulating data into datagrams, and routing datagrams from a source host interface to a destination host interface across one or more IP networks. The datagrams include a payload and a header that indicates a source IP address, a destination IP address, and other metadata needed to route and deliver the datagram. The generic routing encapsulation (GRE) tunneling protocol is used to encapsulate various networking protocols inside virtual point-to-point or point-to-multipoint links over IP networks. The GRE protocol is therefore implemented as a layer atop the IP layer in a protocol stack, e.g., a stack implemented in a router in the IP network. Source routers encapsulate packets that are tunneled between two routers via a GRE tunnel in a set of headers corresponding to different layers in the protocol stack. A link layer header includes information used to reach the next hop in the IP network, an IP header includes the source and destination IP addresses of the routers of the underlay IP tunnel, and a GRE header that defines the GRE tunnel and includes a protocol type field set to an Ethertype value that indicates the type of the payload, i.e., the network protocol being tunneled across the IP network. Destination routers receive a packet via the GRE tunnel and decapsulate the packet by removing the IP header and the GRE header. The packet is then processed by a user application based on the protocol type specified by the Ethertype value in the GRE header.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 7 is a format of a generic NVGRE header of a first type according to some embodiments.

FIG. 8 is a format of a generic NVGRE header of a second type according to some embodiments.

DETAILED DESCRIPTION

Figure 1:
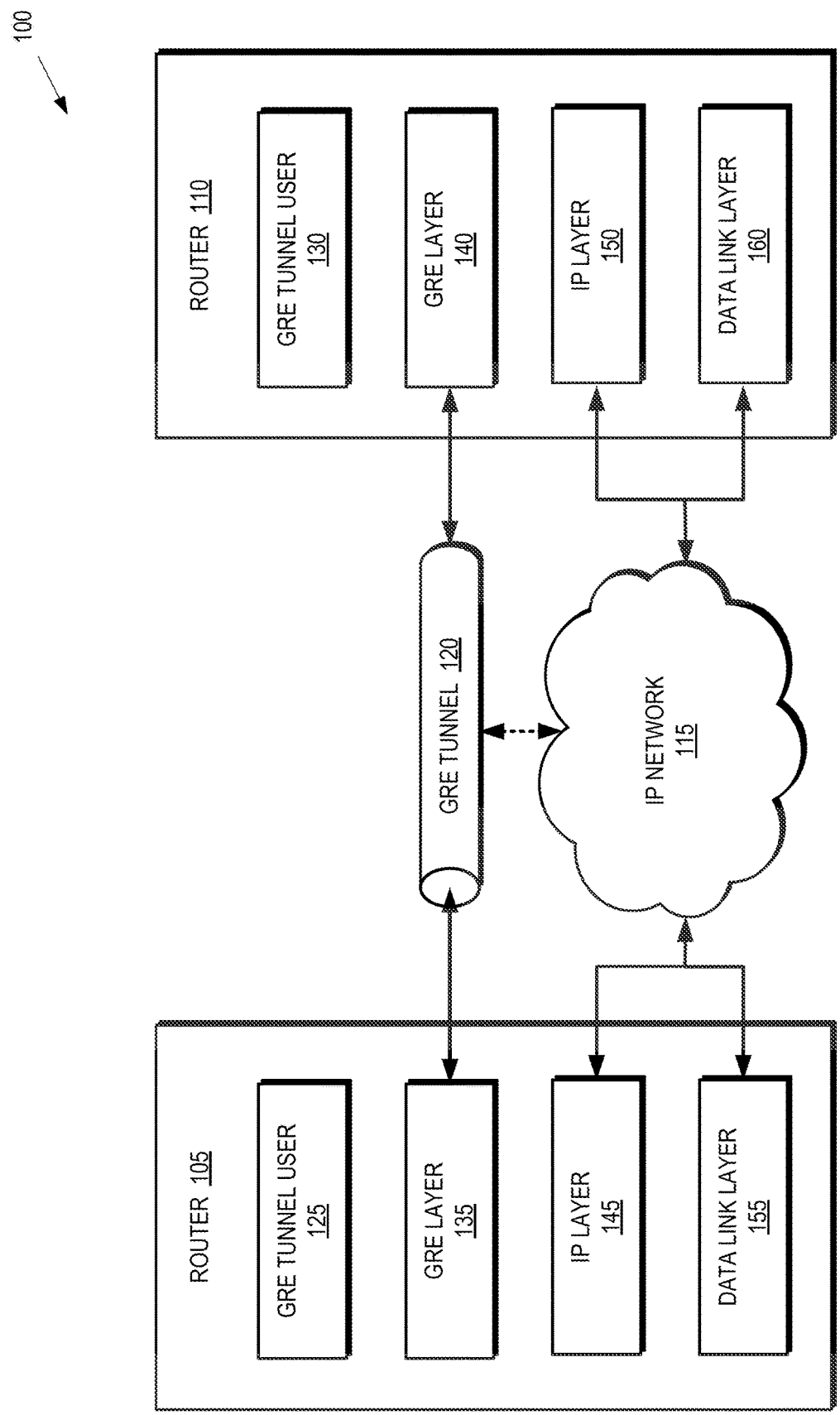
FIG. 1 is a block diagram of a communication system that is configured for GRE tunneling according to some embodiments.

Network virtualization using GRE (NVGRE) allows multiple NVGRE overlays to be multiplexed onto a single IP underlay tunnel. The NVGRE overlays correspond to different Ethernet networks that are identified by virtual subnet identifiers (VSID). Source routers encapsulate packets associated with the different NVGRE overlays in a link layer header, an IP header, and an NVGRE header. The NVGRE header differs from the conventional GRE header because the NVGRE header includes information identifying the NVGRE overlay for the packet. In some cases, the NVGRE header includes a 3-octet VSID of the NVGRE overlay that generated the packet and a 1-octet flow identifier field that indicates a per-flow entropy within packets belonging to the VSID. The value of the per-flow entropy indicated in the flow ID field can be used for load-balancing packets within the VSID. The initial portion NVGRE header is the same as the initial portion of the GRE header so the Ethertype value is used to distinguish between the two. Destination routers receive the encapsulated packets from the NVGRE overlays and decapsulate the packets by removing the link layer header, IP header and the GRE header. Based on the Ethertype in the GRE header, the destination router determines that the payload is an Ethernet packet on an overlay and the GRE header has the type NVGRE. The destination routers use the VSID in the NVGRE header to process the received packet in the context of the NVGRE overlay indicated by the VSID. Thus, including the VSID in the NVGRE header allows multiple NVGRE overlays to be multiplexed over the same IP underlay tunnel. In addition to Ethernet networks, NVGRE overlays can be used for other, generic network types using variations of the NVGRE headers.

A network virtualization overlay (NVO) leverages NVGRE overlays to multiplex information conveyed between virtualized Ethernet networks, e.g., in a multi-tenant datacenter environment that hosts multiple virtual machines that are separately and independently allocated to different tenants. One or more physical servers provide the processing, memory, and networking resources to support the virtual machines. A hypervisor decouples the virtual machines from the physical servers and dynamically allocates resources to the virtual machines. The networking resources include an IP underlay network that interconnects the physical resources (e.g., different physical servers) that are used to host the virtual machines. In some cases, tenants are allocated virtual machines (or portions thereof) that are hosted on different physical servers that are interconnected by the IP underlay network. Packets generated by a virtual machine that is allocated to a tenant are tunneled over the IP network using the NVGRE overlay assigned to the tenant. Thus, the NVGRE overlays associated with different tenants are multiplexed over the single IP underlay tunnel. Packets conveyed over an NVGRE overlay are encapsulated within an IP header that includes the source and destination IP addresses for the IP underlay and an NVGRE header that includes a VSID that identifies the tenant. The destination decapsulates packets received via the NVGRE overlay (e.g., at an overlay termination point implemented in a hypervisor executing on a physical server) and the VSID from the NVGRE header is mapped to the corresponding virtual machine for the tenant indicated by the VSID. The virtual machine then processes the payload of the packet.

The GRE and NVGRE protocols are connectionless protocols. As used herein, the term "connectionless" refers to packet-switched data transmission in which each packet is individually addressed and routed based on information carried in the packet. Connectionless protocols are also referred to as "stateless" protocols because connectionless protocols do not define a process for determining a state of a "conversation" made up of multiple packets exchanged between the endpoints of the communication. In contrast, a "connection-oriented" protocol uses a previously established communication session to exchange data between the endpoints of the communication session. Connection-oriented protocols are also referred to as "stateful" protocols because the communication sessions are defined by state information stored at the endpoints. Furthermore, the GRE and NVGRE protocols do not support reliable delivery of packets and underlying IP underlay is an unreliable packet delivery network. As used herein, the term "reliable" indicates that the protocol guarantees delivery of all packets from a source to a destination. Thus, the term "unreliable" indicates that packets transmitted via GRE or NVGRE tunnels according to the GRE and NVGRE protocols can get lost and the GRE/NVGRE protocols do not provide processes for retransmission or recovery of the lost packets. For example, NVGRE overlay packets can be dropped at network interface cards (NICs) due to buffer overflow, in routers of the IP network due to buffer overflow, queue overflow, or congestion, faults in the links along the IP network, and the like.

Figure 73:
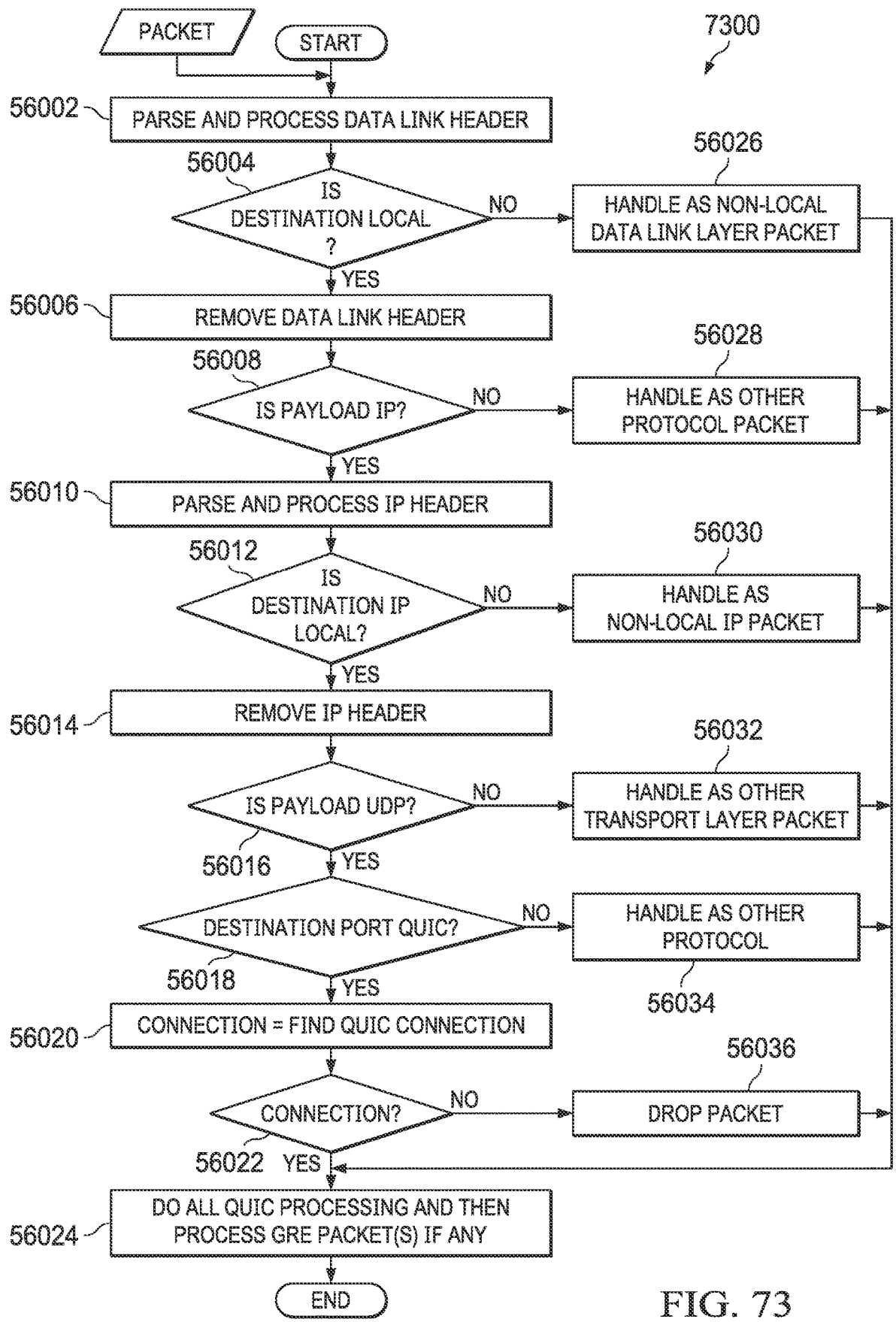
FIG. 73 is a flow diagram of a method of processing a GRE-in-QUIC packet after it is received by a router on a wire according to some embodiments.

FIGS. 1-73 disclose a reliable transport layer deployed between the GRE layer and the IP layer that supports the IP underlay network used by the tunnels to provide reliable transmission of packets via tunnels supported by the connectionless GRE or NVGRE protocols. The reliable transport layer is connection-oriented and guarantees reliable delivery of GRE packets between source and destination IP addresses in the IP underlay tunnel. In some embodiments, the reliable transport layer is implemented as a Transmission Control Protocol (TCP) layer, a QUIC protocol (note that QUIC is not an acronym) or a Stream Control Transmission Protocol (SCTP) to establish a set of multiplexed sub-connections (also referred to herein as streams) over a single connection between two endpoints of the tunnel, a transport layer security (TLS) cryptographic protocol, and the like. Some embodiments of the reliable transport layer perform flow control or congestion control of packets transmitted from the source to the destination. A source encapsulates a payload in a data link layer header for a next hop of the packet in the IP network, an IP header of the IP underlay, one or more headers from the reliable transport layer, and a GRE header. Some embodiments of the GRE header include a VSID field that indicates one of a set of overlays supported by NVGRE. In some embodiments, an additional GRE control header is included between the GRE header and the reliable transport header(s). The GRE control header is included between GRE header and the reliable transport header(s) when the reliable transport connection is stream-oriented and transports one or more streams of bytes. The GRE control header demarcates a GRE packet within a stream of bytes. The GRE control header includes a length field that indicates the size of the GRE packet in a byte stream, which allows the destination to determine an ending byte of the GRE packet based on the length field in the GRE control header.

FIG. 1 is a block diagram of a communication system 100 that is configured for GRE tunneling according to some embodiments. The communication system 100 includes routers 105, 110 that are interconnected by a network such as an IP network 115. A GRE tunnel 120 is formed over the IP network 115 for tunneling packets of any protocol transparently over the IP network between the routers 105, 110, which are the endpoints of the GRE tunnel 120. The GRE protocol is a connectionless protocol and consequently the GRE tunnel 120 is an unreliable tunnel that does not guarantee successful transmission or reception of packets. The routers 105, 110 are configured with corresponding IP addresses that are used as the source or destination addresses by an IP underlay tunnel in the IP network 115.

The routers 105, 110 implement protocol stacks including layers that are used to form connections or tunnels between corresponding layers in the routers 105, 110. In the illustrated embodiment, GRE tunnel users 125, 130 (such as applications implemented in the routers 105, 110) generate payloads for transmission over the GRE tunnel 120. GRE layers 135, 140 in the routers 105, 110 are configured to encapsulate payloads for transmission over the GRE tunnel 120 and de-encapsulate packets that are received via the GRE tunnel 120. IP layers 145, 150 in the routers 105, 110 are configured to encapsulate payloads in IP headers for transmission over the IP network 115 and de-encapsulate packets received over the IP network 115. Data link layers 155, 160 in the routers 105, 110 are configured to encapsulate payloads in data link layer headers for transmission using a network service and to de-encapsulate payloads that are received via the network service.

Figure 2:
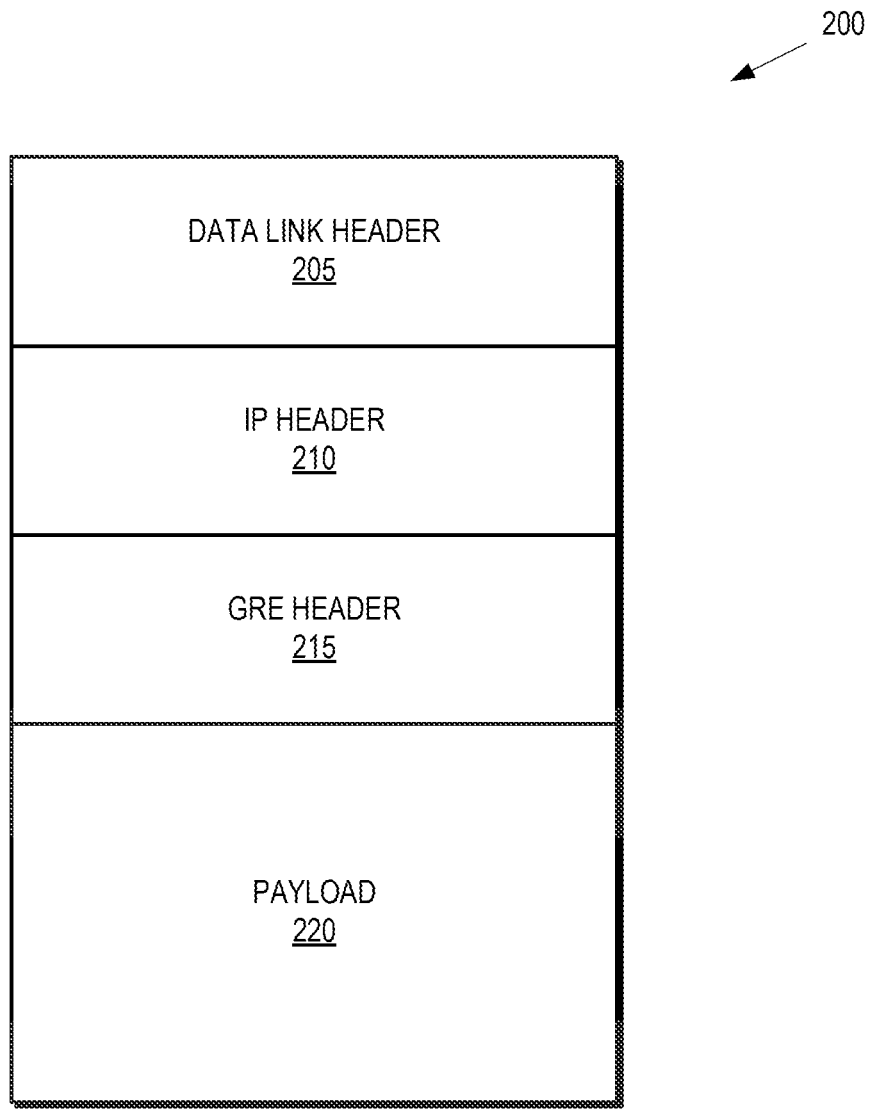
FIG. 2 is a block diagram of a packet that is encapsulated for transmission over the GRE tunnel according to some embodiments.

FIG. 2 is a block diagram of a packet 200 that is encapsulated for transmission over the GRE tunnel according to some embodiments. The packet 200 is generated by some embodiments of the routers 105, 110 shown in FIG. 1 for transmission over the GRE tunnel 120 shown in FIG. 1.

A data link header 205 is the link layer header that is used to reach the immediate next-hop in the IP network. For example, for an Ethernet link from a router to the IP next-hop, this header is an Ethernet Header.

An IP header 210 contains an IPv4 or an IPv6 datagram header. The source and destination addresses are set to addresses of the source and destination routers of the underlay IP tunnel, respectively. The IPv4 Protocol Number field or the IPv6 Next Header field in is set to a value of 47, indicating a GRE packet as the payload of IP.

A GRE header 215 contains the Protocol Type field that is set to the Ethertype value indicating the type of payload, e.g., the packet from the user of the GRE tunnel.

A payload 220 contains the packet from the user of the tunnel. The payload 220 can include information of types such as Ethernet, IPv4, IPv6, MPLS or the like. The type of information included in the payload 220 is indicated by the Protocol Type field.

The encapsulation represented by the data link header 205, the IP header 210, and the GRE header 215 causes user packets to be sent through the GRE tunnels. When the tunnel's receiving endpoint receives a packet, it decapsulates the user packet by removing the IP header 210 and the GRE header 215. The packet is then processed by the appropriate user application based on the Protocol Type specified in GRE header 215.

Figure 3:
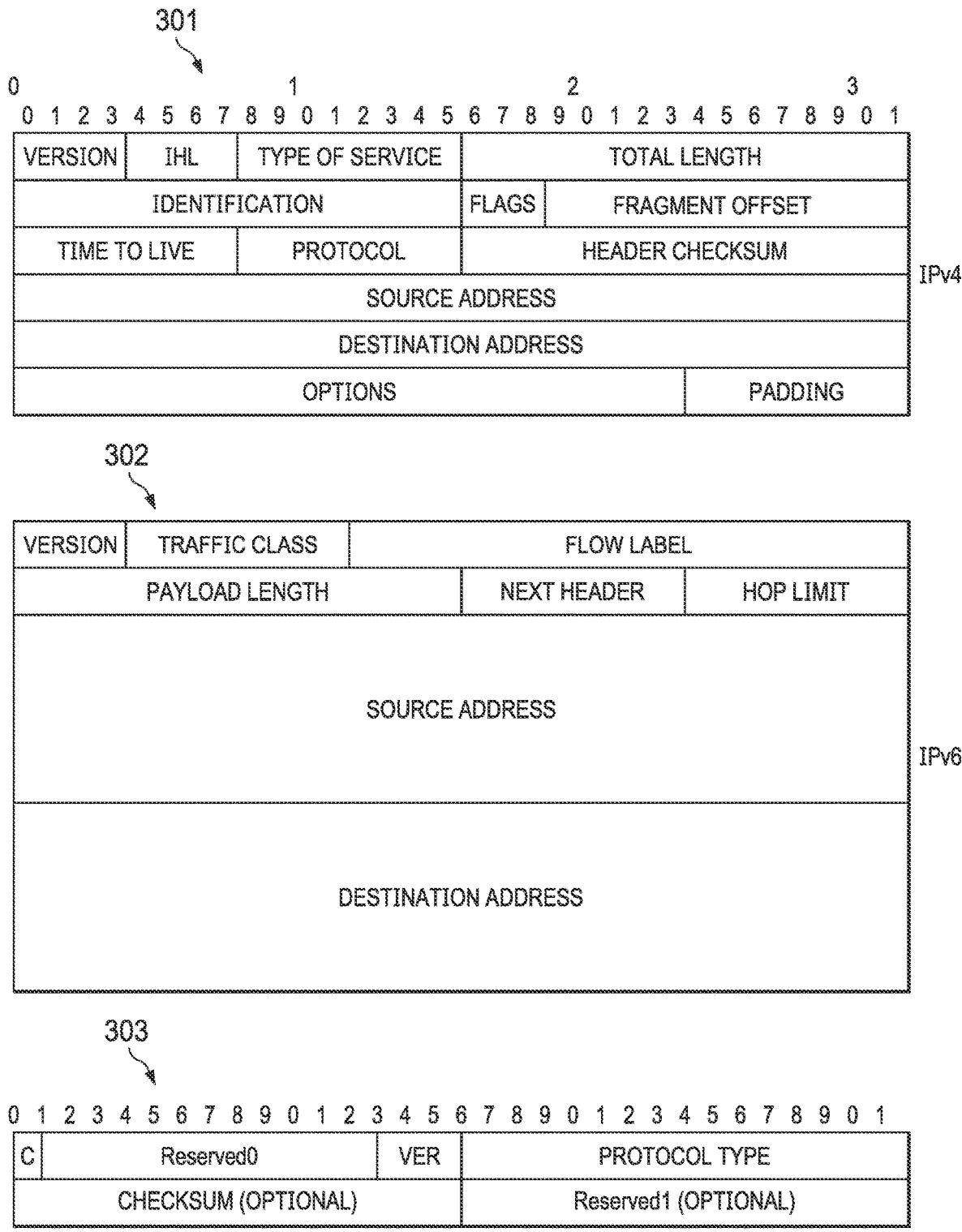
FIG. 3 shows formats of headers that are used to encapsulate payloads for transmission over a GRE tunnel according to some embodiments.

FIG. 3 shows formats of headers that are used to encapsulate payloads for transmission over a GRE tunnel according to some embodiments. The format 301 is used for an IP header (such as the IP header 210 shown in FIG. 2) that is formed according to the IPv4 standard protocols. The format 302 is used for an IP header (such as the IP header 210 shown in FIG. 2) that is formed according to the IPv6 standard protocols. The format 303 is used for a GRE header (such as the GRE header 215 shown in FIG. 2).

Network Virtualization GRE (NVGRE) based overlays are used in an extension of GRE that allows for two remote routers to multiplex traffic of a set of independent Ethernet networks over a GRE tunnel. The routers are separated by an IP network. The virtualized Ethernet networks are called overlays. Although some embodiments are disclosed herein with NVGRE overlays as an application of reliable GRE tunneling, the techniques disclosed herein are applicable to any GRE based tunneling method.

Figure 4:
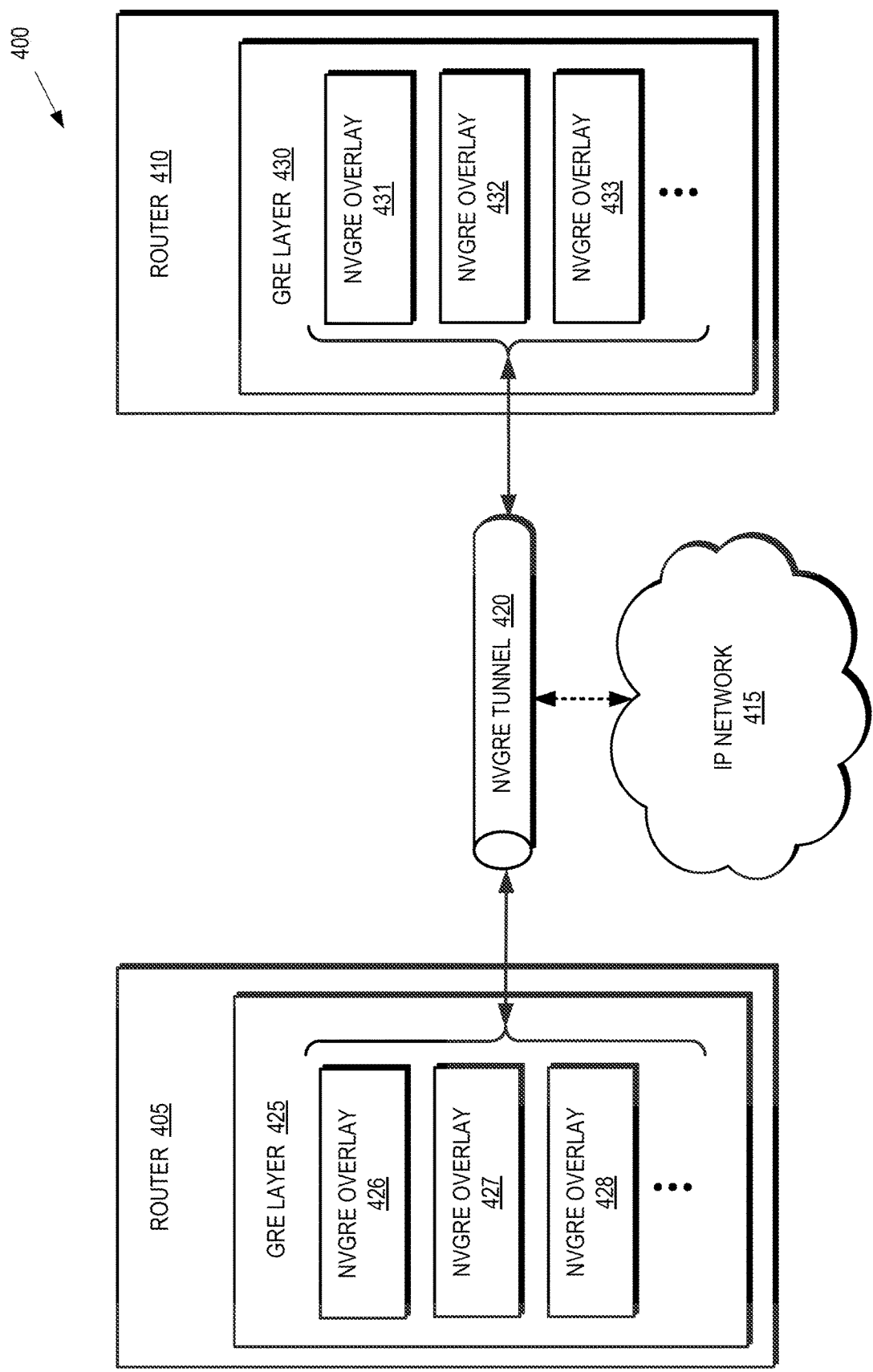
FIG. 4 is a block diagram of a communication system that is configured for NVGRE tunneling of multiple overlays according to some embodiments.

FIG. 4 is a block diagram of a communication system 400 that is configured for NVGRE tunneling of multiple overlays according to some embodiments. The communication system 400 includes routers 405, 410 that are interconnected by a network such as an IP network 415. An NVGRE tunnel 420 is formed over the IP network 415 for tunneling packets transparently over the IP network between the routers 405, 410, which are the endpoints of the NVGRE tunnel 420. The NVGRE protocol is a connectionless protocol and consequently the NVGRE tunnel 420 is an unreliable tunnel that does not guarantee successful transmission or reception of packets. The routers 405, 410 are configured with corresponding IP addresses that are used as the source or destination addresses by an IP underlay tunnel in the IP network 415.

The routers 405, 410 implement corresponding GRE layers 425, 430 that support one or more NVGRE overlays. In the illustrated embodiment, the GRE layer 425 supports the NVGRE overlays 426, 427, 428 and the GRE layer 430 supports the NVGRE overlays 431, 432, 433. The routers 405, 410 multiplex the NVGRE overlays 426-428, 431-433 over a single IP underlay tunnel via the IP network 415. The multiplexed packets are encapsulated in NVGRE headers that include identifiers of the NVGRE overlays 426-428, 431-433 such as virtual subnet identifiers (VSID).

Figure 5:
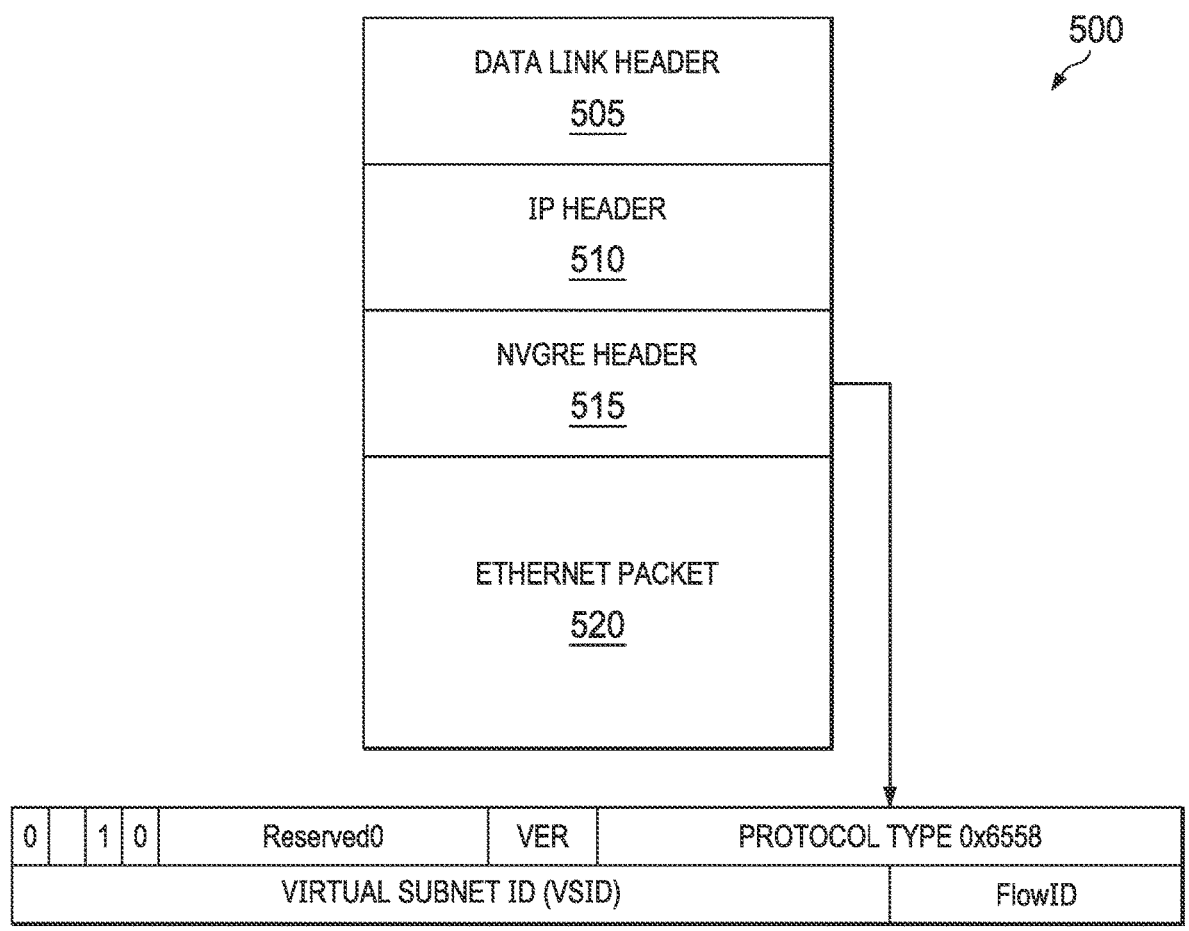
FIG. 5 is a block diagram of a packet that is encapsulated for transmission and NVGRE tunneling according to some embodiments.

FIG. 5 is a block diagram of a packet 500 that is encapsulated for transmission and NVGRE tunnel according to some embodiments. The packet 500 is generated and received by some embodiments of the routers 405, 410 shown in FIG. 4.

A data link header 505 is the link layer header that is used to reach the immediate next-hop in the IP network. For example, for an Ethernet link from a router to the IP next-hop, this header is an Ethernet Header.

An IP header 510 contains an IPv4 or an IPv6 datagram header. The source and destination addresses are set to addresses of the source and destination routers of the underlay IP tunnel, respectively. The IPv4 Protocol Number field or the IPv6 Next Header field in is set to a value of 47, indicating a GRE packet as the payload of IP.

An GRE header 515 contains the Protocol Type field that is set to the Ethertype value for 0x6558 that indicates "Transparent Ethernet Bridging". When Ethertype value is 0x6558, the GRE header differs from the default format and is referred to as an NVGRE header. The GRE header 515 includes the following fields after the Ethertype field:

3-octet Virtual Subnet ID (VSID) which is an identifier of the overlay Ethernet network multiplexed over the NVGRE tunnel.

1-octet FlowID field that indicates a per flow entropy within packets of belonging to a VSID, which can be used for load balancing packets within VSID.

The GRE header 515 differs from the GRE header 515 shown in FIG. 2 because the GRE header 515 supports multiplexing of multiple NVGRE overlays using the VSID field. The GRE header 515 can therefore be referred to as an NVGRE header 515.

An Ethernet Packet 520 is the payload of the NVGRE overlay, which is the packet on the overlaid Ethernet network.

This encapsulation causes Ethernet packets on an NVGRE overlay to be transparently tunneled across an IP network. When the overlay's receiving endpoint receives a packet, it decapsulates the Ethernet packet of the overlay by removing the IP header 510 and the GRE header 515. Based on the ethertype 0x6558 in the GRE header 515, the receiving endpoint determines that the payload is an Ethernet packet 420 on an overlay and the GRE header 515 is of type NVGRE. Based on the VSID in the GRE header 515, the Ethernet network associated with the packet is identified and accordingly the packet is handled in the context of the Ethernet network.

One application of an NVGRE tunnel is a Network Virtualization Overlay (NVO) that constructs the virtualized Ethernet networks in a "multi-tenant" data center (DC) environment. A DC is a pool or collection of cloud infrastructure resources specifically designed for enterprise business needs. The basic resources are servers that include one or more processors (CPU, GPU), memory (RAM)), storage (disk space), and networking capabilities (bandwidth) that interconnect servers and storages.

A multi-tenant DC can host virtual DCs for multiple enterprise customers (called tenants) on a single physical infrastructure. A virtual DC is a virtual representation of a physical data center, complete with servers, storage clusters and lots of networking components, all of which reside in the virtual space hosted by the multi-tenant DC. Servers for a virtual DC are virtualized with Virtual Machines (VMs). One or more VMs run atop a physical server wherein each VM is assigned a share of processor cores and memory (RAM) of the physical server. The VMs in a physical server can belong to same tenant or may belong to different tenants. A layer of software called a "hypervisor" runs in a physical server and decouples the VMs from the physical server. The hypervisor dynamically allocates computing resources to each VM as needed. There are various solutions to virtualize I/O including storage, which are omitted as this point for simplicity.

The VMs and virtualized storages for a tenant are interconnected by a virtual network specific to the tenant. The virtual network is implemented as an overlay network that sits atop an IP-based underlay that interconnects the physical resources in the DC. An NVO solution provides Ethernet virtual networks enabling multi-tenancy and VM mobility across a tenant's virtual network. Thus, each tenant is provided an independent island of virtualized servers, virtualized storages and the virtual network interconnecting them. When an NVGRE overlay is deployed as NVO, the VSID in the NVGRE Header is the demultiplexer that identifies the virtualized Ethernet network.

Figure 6:
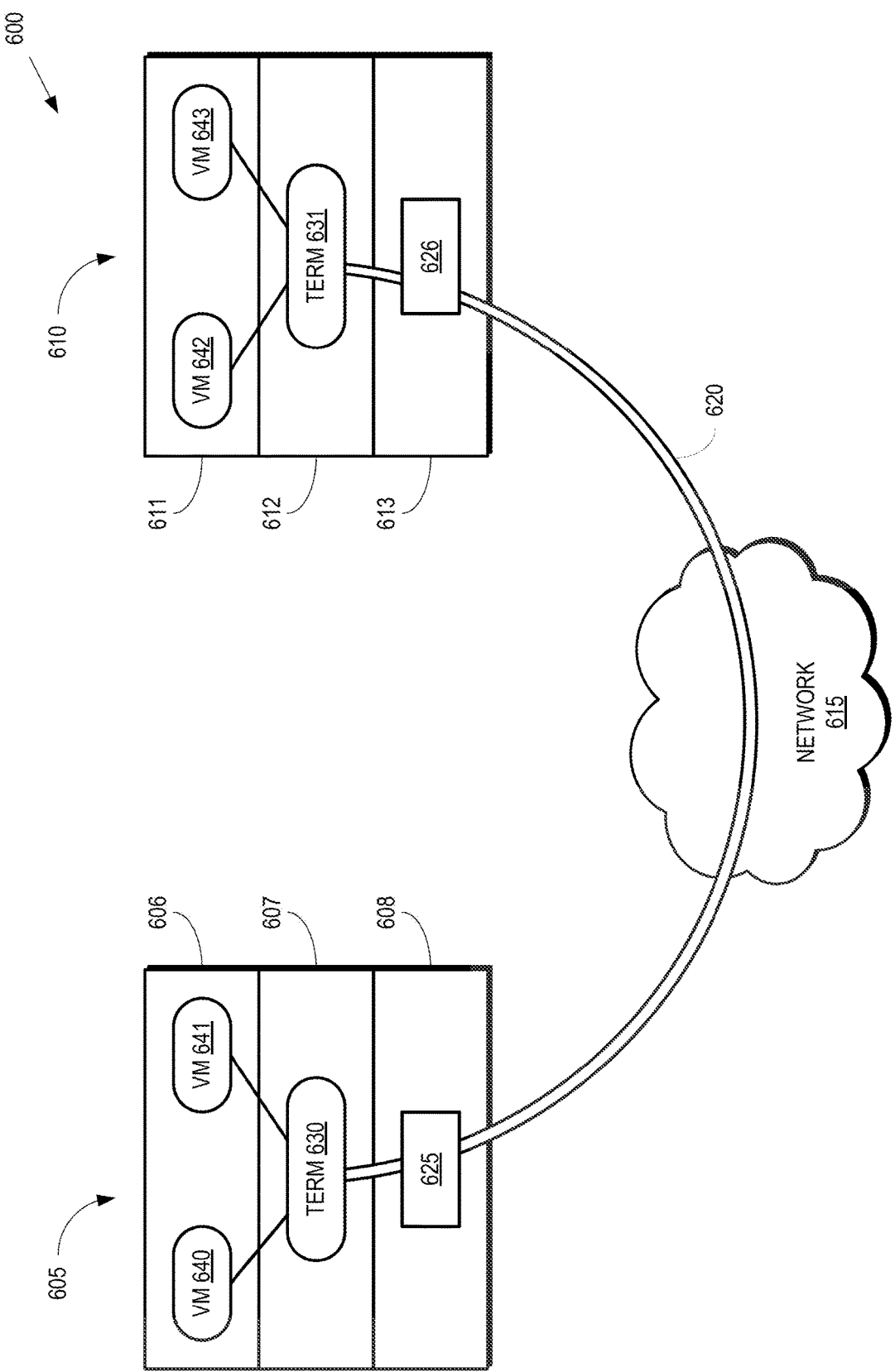
FIG. 6 is a block diagram of a communication system that is configured for NVGRE overlays in a multitenant data center according to some embodiments.

FIG. 6 is a block diagram of a communication system 600 that is configured for NVGRE overlay/NVO in a multitenant data center according to some embodiments. The communication system 600 includes physical servers 605, 610 that are interconnected by a network such as an IP network 615. An NVGRE tunnel 620 is formed over the IP network 615 for tunneling packets transparently over the IP network between the servers 605, 610. The physical servers 605, 610 are partitioned into three strata: (1) hardware layers 608, 613 that include one or more processors, memory, and I/O ports including network interface cards (NIC) 625, 626; (2) hypervisor layers 607, 612 that manage and allocate hardware resources to the VMs; and (3) the VM layers 606, 611 that run atop the hypervisor layers 607, 612. As discussed herein, the NVGRE tunnel 620 is an unreliable tunnel that does not guarantee successful transmission or reception of packets.

In the illustrated embodiment, the VM layers 606, 611 support VMs 640, 641, 642, 643 that are allocated to two tenants. The VMs 640, 642 are allocated to the first tenant and the VMs 641, 643 are allocated to the second tenant. The hypervisor layers 607, 612 implement NVGRE overlay termination points 630, 631 that are the endpoints of the NVGRE tunnel 620. The termination points 630, 631 are configured with IP addresses that are used for the IP underlay such that the IP addresses are reachable by the IP network 615. The first and second tenants are assigned network-wide unique identifiers (referred to herein as NVGRE VSID) that are used for the NVGRE overlays.

The VMs 640, 641 are connected to the overlay termination point 630 via corresponding virtual Ethernet ports that are mapped to the VSIDs of the VMs 640, 641. The VMs 642, 643 are connected to the overlay termination point 631 via corresponding virtual Ethernet ports that are mapped to the VSIDs of the VMs 642, 643. The payloads transmitted over the NVGRE tunnel 620 are layer-2/Ethernet packets that are generated by the VMs 640-643.

In operation, within the first tenant, VM 640 sends an Ethernet packet to VM 642. First, VM 640 forwards the Ethernet packet to the overlay termination point 630. In response to receiving the packet, the overlay termination point 630 pushes an NVGRE header including the VSID of the VM 640 onto the packet and then pushes the tunneling encapsulation (such as an IP header) onto the packet. A source address in the IP header of the tunnel is set to the IP address of the overlay termination point 630 and the destination address of the tunnel is set to the IP address of the overlay termination point 631. The encapsulated packet is then sent by the overlay termination point 630 to the IP network 615 through NIC 625. The overlay termination point 631 receives the encapsulated packet from NIC 626 that arrived via the IP network 615. The overlay termination point 631 de-encapsulates the tunneling encapsulation, which exposes the NVGRE header including the VSID of the VM 640. The NVGRE header is removed and the resulting Ethernet packet is forwarded on a corresponding port to the VM 642 since is configured with the VSID. A similar process is used to convey packets for the second tenant between the VMs 641, 643.

One limitation of NVGRE is that it is designed to carry only Ethernet packets as a payload. For example, the protocol type field in the GRE header is overloaded to indicate to aspects of the payload:
1. The GRE header is of the type NVGRE, i.e., the protocol type field is followed by a VSID field and a flow identifier field.
2. The payload of the GRE header is Ethernet.

Consequently, NVGRE can only be used to virtualize Ethernet networks. However, there are other use cases that require virtualization of different types of non-Ethernet networks. In some embodiments, additional NVGRE header types are defined to transport additional types of packets.

FIG. 7 is a format 700 of a generic NVGRE header of a first type according to some embodiments. The presence of the generic NVGRE header is indicated by encoding its ethertype value in the protocol type field of the GRE header. For example, a new ethertype value of 0x6570 is assigned to the first type of generic NVGRE header.

When the ethertype value in the Protocol Type is 0x6570 field then the GRE header uses the format 700 and includes the following fields after the ethertype field:
  3-octet Virtual Subnet ID (VSID) which is an identifier of the overlay multiplexed over the NVGRE based tunnel.
  1-octet FlowID field that indicates a per flow entropy within packets of belonging to a VSID, which can be used for load balancing packets within VSID.

Note that format 700 is similar to the NVGRE header 500 in FIG. 5, except the Protocol Type value.

The payload type carried by the format 700 of the header (i.e upper layer protocol) is not explicitly indicated in the header, rather the payload type expected on a VSID is negotiated through an out-of-band mechanism between the NVGRE overlay termination points or by manual configurations at the NVGRE overlay termination points. This header is particularly suitable to payloads which are not standard protocols in networking stacks. Note that the format 700 of the generic NVGRE header allows standard protocols as payloads (e.g., IP, FC, Infiband, PCIe, NVMe etc) as long as the NVGRE overlay termination points agree on the standard payload protocol type for an overlay through out-of-band mechanisms or by manual configurations.

FIG. 8 is a format 800 of a generic NVGRE header of a second type according to some embodiments. The presence of the generic NVGRE header is indicated by encoding its ethertype value in the protocol type field of the GRE header. For example, a new ethertype value of 0x6572 is assigned to the second type of generic NVGRE header.

When ethertype value in the Protocol Type field is 0x6572 of the format 800 then GRE header includes the following fields after the ethertype field:
- 3-octet Virtual Subnet ID (VSID) which is an identifier of the overlay multiplexed over the NVGRE based tunnel.
- 1-octet FlowID field that indicates a per flow entropy within packets of belonging to a VSID, which can be used for load balancing packets within VSID. An Upper Layer Protocol Type encodes the ethertype value of the payload protocol type.

Herein, payload type carried by the format 800 of the header (i.e upper layer protocol) is explicitly indicated in the header. The format 800 is particularly suitable to payloads which are standard protocols in networking stacks. In the discussion that follows, the phrase "NVGRE header" refers to headers that include headers formed according to the formats 700 and 800 shown in FIGS. 7 and 8, respectively.

Figure 9:
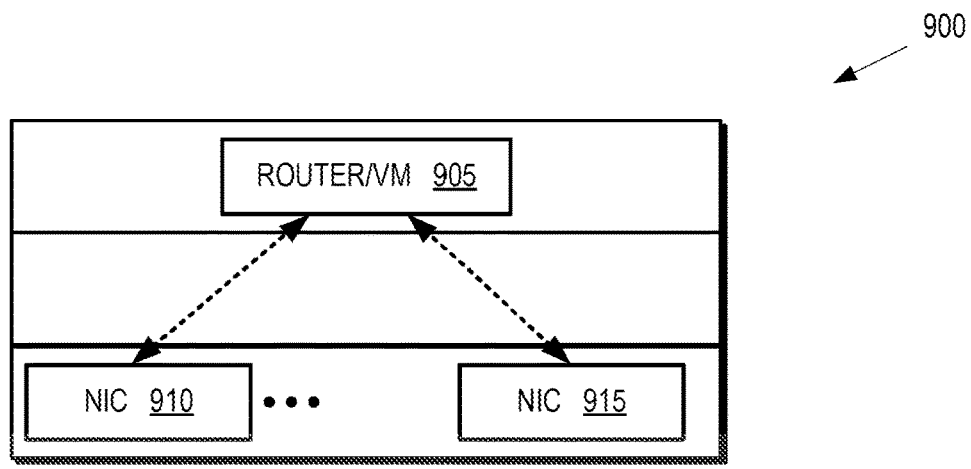
FIG. 9 is a block diagram of a non-chassis-based network function virtualization (NFV) router that runs as a VM on a hypervisor implemented on a physical server according to some embodiments.

FIG. 9 is a block diagram of a non-chassis-based network function virtualization (NFV) router 900 that runs as a VM on a hypervisor implemented on a physical server according to some embodiments. In the illustrated embodiment, a router 905 is hosted by a single VM that receives packets from ports on NICs 910, 915. The router 905 processes the received packets and forwards the process packets to relevant destinations via ports on the NICs 910, 915. In some embodiments, the NICs 910, 915 that are assigned to the router 905 are directly controlled by the router 905 using SR-IOV or PCI-Passthrough without requiring any mediation by the hypervisor on per packet basis. The control plane and the forwarding plane of the router reside within the single VM. Note that the NICs 910, 915 are Ethernet based, so the NFV router 905 supports only Ethernet as the data link layer. One issue with non-chassis-based approach is that the router 905 is hosted as single VM, so it is prone to single point of failure.

Figure 10:
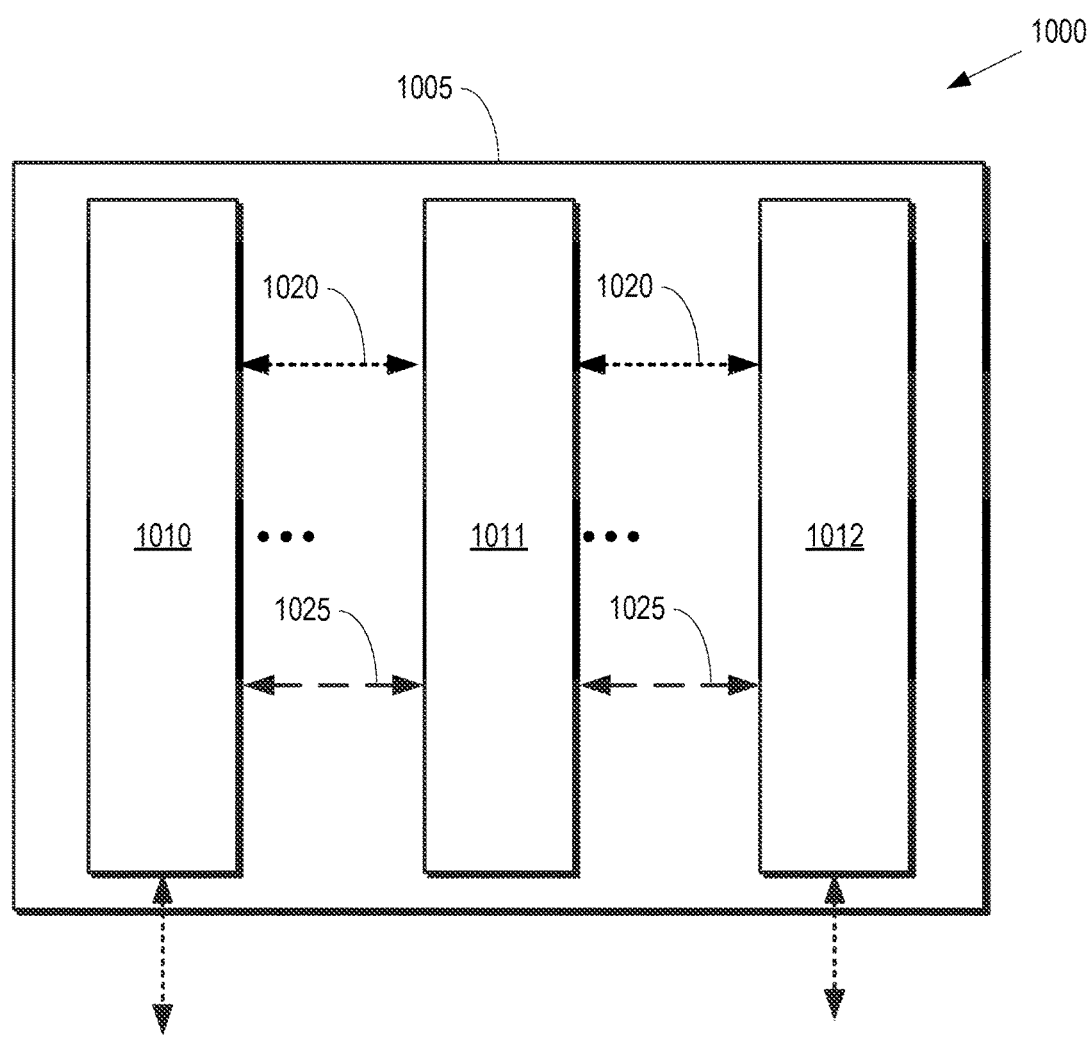
FIG. 10 is a block diagram of a chassis-based NFV router according to some embodiments.

FIG. 10 is a block diagram of a chassis-based NFV router 1000 according to some embodiments. A chassis 1005 includes a fixed number of slots and each slot hosts a card 1010, 1011, 1012. In the illustrated embodiment, card 1011 is a control plane card that operates the control plane of the router 1000. More than one control plane card could be included for redundancy purposes in some embodiments. The cards 1010, 1012, are forwarding plane cards that contain ports for packets that are transmitted and received by the router 1000. The control plane card 1011 programs the forwarding states into the forwarding plane cards 1010, 1012. The forwarding plane cards 1010, 1012 make the packet forwarding decisions based on the programmed forwarding states. The forwarding plane cards 1010, 1012 also sends the received packets targeted for the control plane to the control plane card 1011. The chassis 1005 includes or is associated with inter card communication (ICC) control channels 1020 and switch fabric channels 1025 that interconnects the cards 1010, 1011, 1012.

Figure 11:
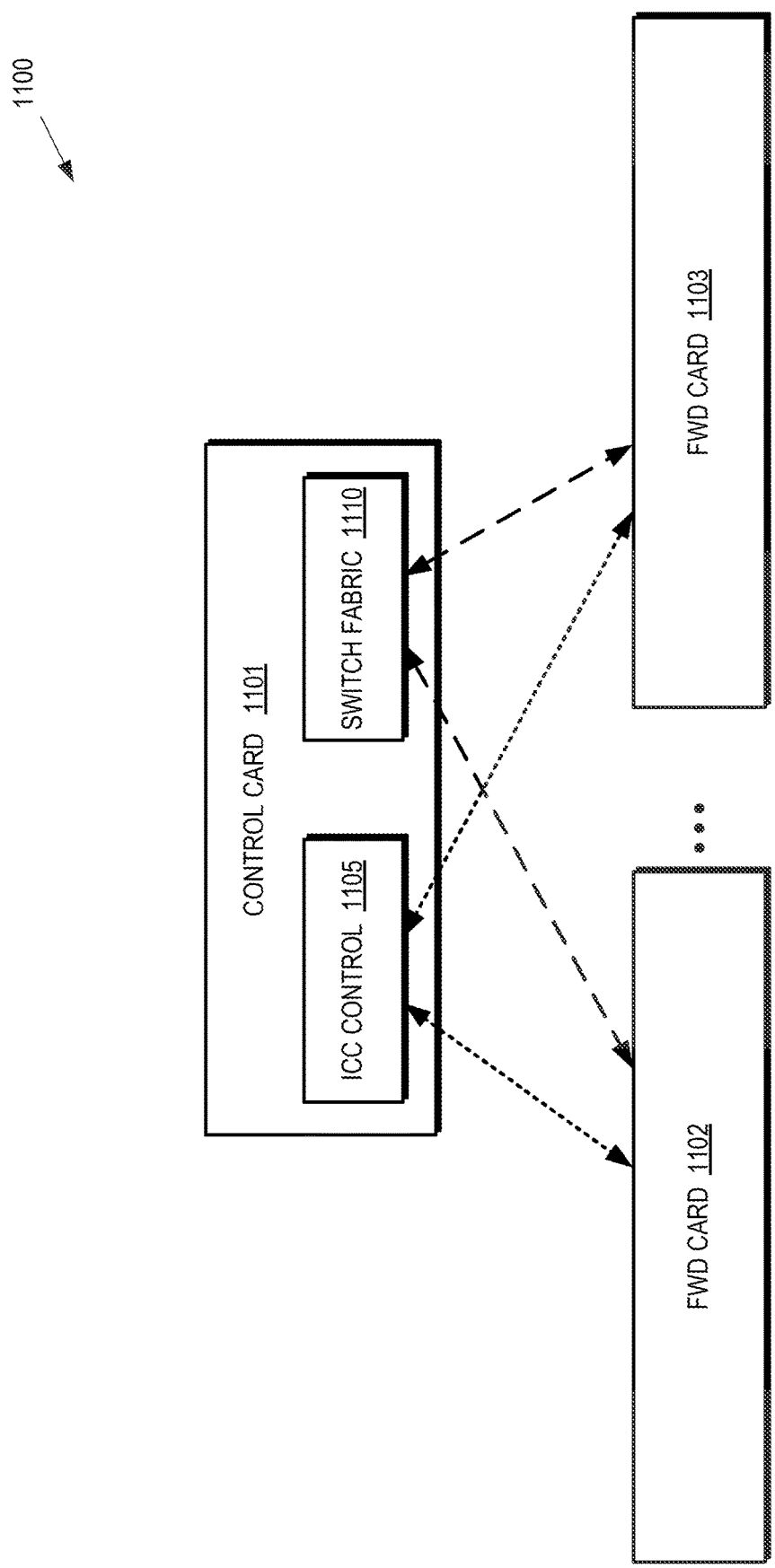
FIG. 11 is a block diagram of an expanded view of a chassis-based NFV router according to some embodiments.

FIG. 11 is a block diagram of an expanded view of a chassis-based NFV router 1100 according to some embodiments. The router 1100 includes a control card 1101 and multiple forwarding cards 1102, 1103 (only two forwarding cards shown in FIG. 11 in the interest of clarity). The router 1100 supports ICC control connections 1105 and switch fabric connections 1110. The switch fabric is hosted inside the control plane card, as indicated by the switch fabric connections 1110, but it is also possible to have a separate switch fabric card. If a packet arriving on a port the forwarding card 1102 needs to be sent out by a port in the forwarding card 1103 then after performing ingress processing, the forwarding card 1102 sends the packet to the channel to switch fabric via the switch fabric connection 1110. The switch fabric then relays the packet to the forwarding card 1103 for egress processing and final transmit. Every card is connected to the switch fabric through a switch fabric channel (a link in the switch fabric network). A forwarding card also sends the received packets targeted to the control plane to the control plane card through the switch fabric channel.

The root of ICC control is in the control plane, which is connected to every forwarding plane card by an ICC channel (a link in the ICC network), as indicated by the ICC connection 1105. The ICC network is used for all control and management messaging between the control plane and the forwarding planes. For example, configuration of the forwarding plane by the control plane is performed using the ICC network. Any alarms or alerts generated by a forwarding plane are notified to the control plane through ICC network. The heartbeats to check the connectivity between the cards are exchanged as ICC messages. One key point to note that, both the ICC and switch fabric networks are lossless, means packets/messages are reliably transported without any drop. In certain implementations, there could be more than two interconnect networks.

Figure 12:
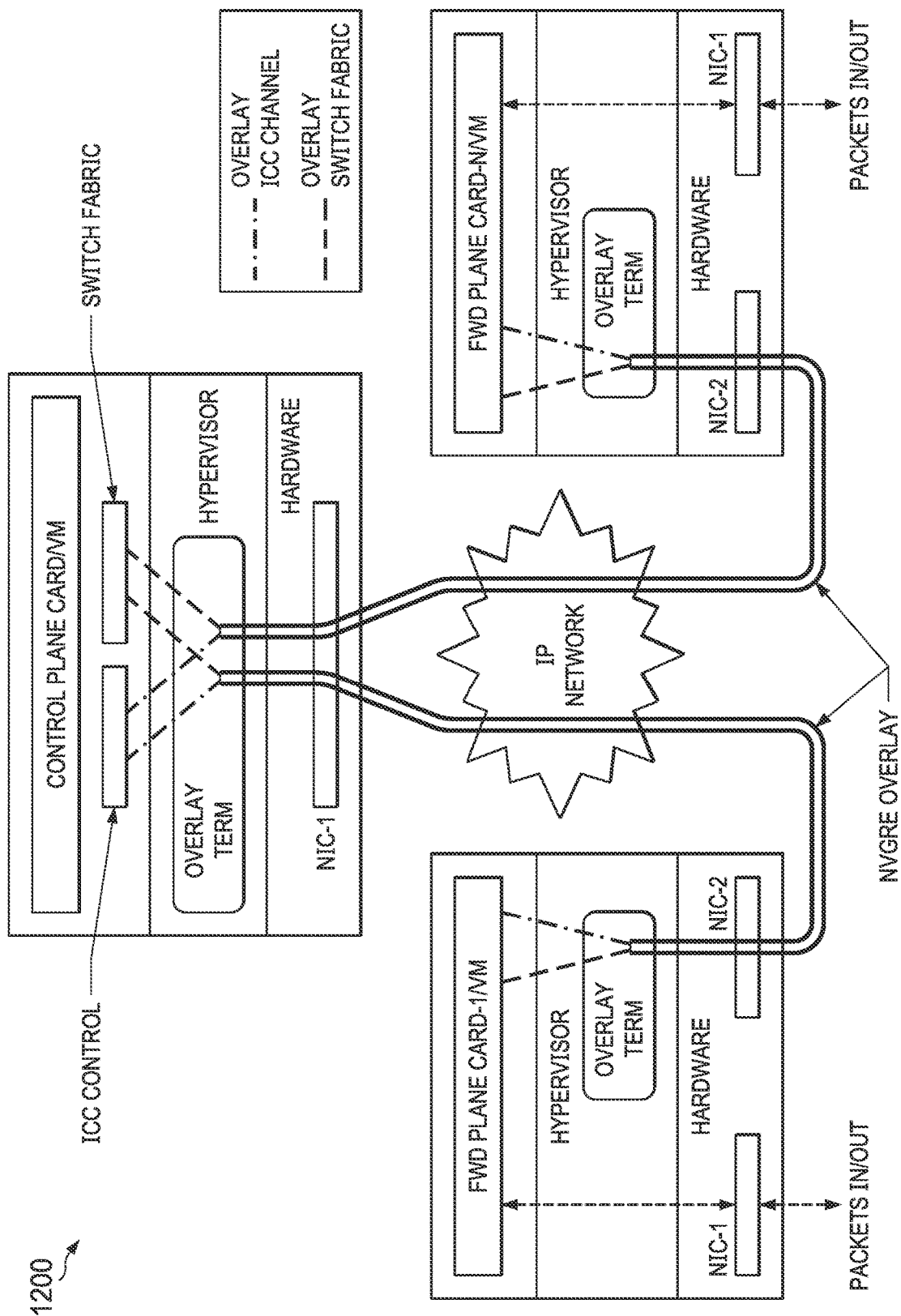
FIG. 12 is a set of servers that implement control plane cards and forwarding plane cards of a chassis-based NFV router according to some embodiments.

FIG. 12 is a set 1200 of servers that implement control plane cards and forwarding plane cards according to some embodiments. As used herein, the term "control plane server" refers to the physical server that hosts the VM for the control plane card and the term "forwarding plane server-x" refers to the physical server that hosts the VM for the forwarding plane card-x.

The control plane and the forwarding plane VMs are separated by an IP network. It is possible that the VMs are located within a LAN (Local Area Network), i.e within the same IP subnet. However, it is considered herein the separation by an IP network as it is the superset case that can also satisfy the requirements, if the VMs are connected within a LAN.

Each forwarding plane VM uses NIC-1 to emulate the ports for packet receive and transmit. For optimal performance, the NIC-1 is directly controlled by the forwarding plane VM, using SR-IOV or PCI-Passthrough without requiring any mediation by the hypervisor on per packet basis. Each forwarding plane server uses a port on NIC-2 to connect to the IP network interconnecting the physical servers. The control plane server uses a port on NIC-1 to connect to the IP network The ICC and switch fabric channels between the VMs are setup as NVGRE overlays across the IP network. Note that the channels carry non-Ethernet traffic since ICC and switch fabric packets are encapsulated in custom headers native to the chassis. Note that data packets forwarded between the forwarding plane cards through the switch fabric card could be ethernet or other type of standard protocol packet, but when the packets traverse the switch fabric channels, they are encapsulated by the switch fabric header. The NVGRE overlay termination points are in the hypervisors. There are two NVGRE overlays between each forwarding plane server and the control plane server—one for the ICC channel and another for the switch fabric channel. In the illustrated embodiment, the VSID used by the overlay for the ICC channel is 100 and VSID used by the overlay for the switch fabric channel is 200.

In order to create an IP underlay for the overlay, each overlay termination point creates an IP address on its respective port on the NIC connected to the IP network, such that the IP address is routable by the IP network. The IP address on the overlay termination point at forwarding plane server-x is referred to herein as "F-IPx" and the IP address on the overlay termination at the control plane server is referred to herein as "C-IP". Overlay termination points at each forwarding plane server are configured with one underlay tunnel and its destination IP address is referred to herein as C-IP. The overlay termination point at the control plane server is configured with N underlay tunnels, one to each forwarding plane server. For example, the destination IP addresses of the underlay tunnels to forwarding plane server-1, server-2, . . . server-N are F-IP1, F-IP2, . . . F-IPN respectively.

A forwarding plane VM connects to its local overlay termination point with two virtual ports—one for the ICC channel and another for the switch fabric channel. Within the overlay termination point, the port for the ICC channel is mapped to VSID 100 and the port for the switch fabric channel is mapped to VSID 200. Both the VSIDs are multiplexed on the IP underlay tunnel to the control plane server.

The control plane VM connects to its local overlay termination point with two virtual ports for each forwarding plane VM—one for the ICC channel and another for the switch fabric channel. So, there are total 2N virtual ports between the control plane VM and its local overlay termination point. Within the local overlay termination point:
- the port for the ICC channel to a forwarding plane VM is mapped to VSID 100 and the IP underlay tunnel to the forwarding plane server.
- the port for the switch fabric channel to a forwarding plane VM is mapped to VSID 200 and the IP underlay tunnel to the forwarding plane server.

The NVGRE overlays for the ICC and the switch fabric form two virtual networks, which is a case of NVO as disclosed herein.

In some embodiments, an ICC message from the forwarding plane VM emulating card-1 to control plane VM is first sent on its virtual port for the ICC channel. When the local overlay termination point receives the message, it pushes NVGRE header with VSID 100 and then the tunnel encapsulation with IP header's source IP address F-IP1 and destination IP address C-IP. Then the packet is sent to the IP network via the port in NIC-2. When overlay termination point in the control plane server receives the packet, it performs the following actions:
- identifies the source forwarding plane server based on the source IP address in the tunnel encapsulation
- removes the tunnel encapsulation.
- Then finds NVGRE header with VSID 100. Based on VSID 100 it demultiplexes the packet as containing an ICC message. It removes the NVGRE header.
- Based on the identified source forwarding plane server, it finds the virtual port to the control plane VM which is mapped for the ICC channel with the forwarding plane VM.
- Forwards the ICC message on the virtual port.

The ICC message is received by the ICC control module in the control plane VM. In some embodiments, packets that are to be sent on the switch fabric channel from the forwarding plane VM emulating card-1 to control plane VM would be first sent on its virtual port for the channel. When the local overlay termination point receives the message, it pushes NVGRE header with VSID 200 and then the tunnel encapsulation with IP header's source IP address F-IP1 and destination IP address C-IP. Then the packet is sent to the IP network via the port in NIC-2. When overlay termination point in the control plane server receives the packet, it performs the following actions
- identifies the source forwarding plane server based on the source IP address in the tunnel encapsulation
- removes the tunnel encapsulation.
- Then finds NVGRE header with VSID 200. Based on VSID 200 it demultiplexes the packet as containing a packet for the switch fabric. It removes the NVGRE header.
- Based on the identified source forwarding plane server, it finds the virtual port to the control plane VM which is mapped for the switch fabric channel with the forwarding plane VM.
- Forwards the packet on the virtual port.

The packet is received by the switch fabric in the control plane VM.

If the physical servers shown in FIG. 12 only host a single forwarding plane or control plane VM, then the overlay termination points may be also implemented within respective VMs to avoid context switching with the hypervisor while sending, receiving packets on the channels. In that case. the NIC-2 in the forwarding plane server would be directly controlled by the forwarding plane VM using SR-IOV, PCI passthrough, and the like. This would also be the case with NIC-1 in the control plane server.

However, the NVGRE overlays provide unreliable transport of the payload packets. So, the ICC or switch fabric packets can be dropped by the NICs (at both control plane server and the forwarding plane server) as well as within the IP network, which does not satisfy the requirement because these channels are lossless. This limitation generates the requirement for reliable NVGRE overlay.

Figure 13:
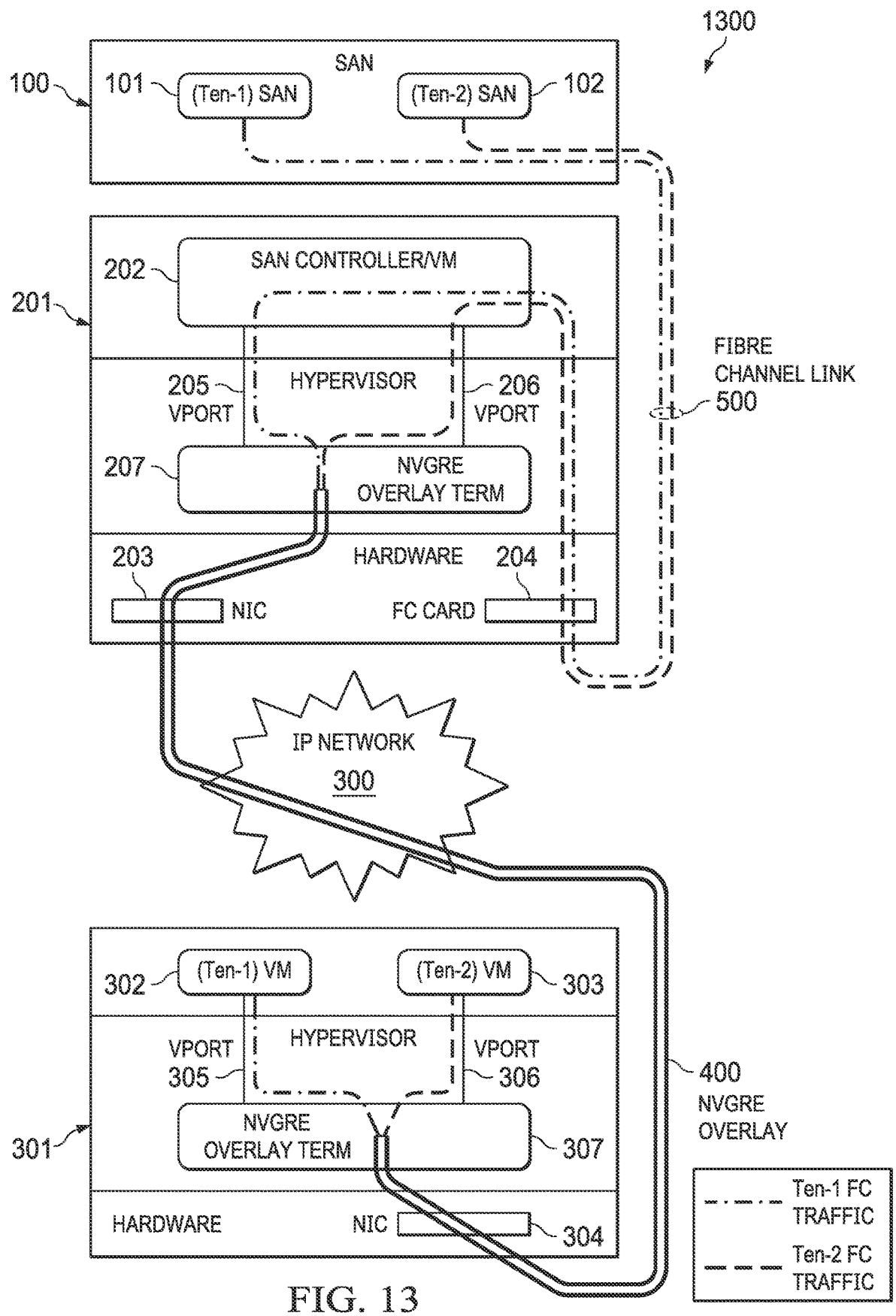
FIG. 13 is a communication system that supports the transport of fiber channel traffic on an NVGRE overlay in a multitenant data center according to some embodiments.

FIG. 13 is a communication system 1300 that supports the transport of fiber channel traffic on an NVGRE overlay in a multitenant data center according to some embodiments. Fiber Channel (FC) is a high-speed data transfer protocol providing in-order, lossless delivery of raw block of data, which is primarily used to connect computer data storage to servers in storage area networks (SAN) in data centers (DCs). A SAN is a network of a pool of block-based storage devices that can be accessed/shared by multiple servers connected to the SAN. The reliability in FC is provided by its data link layer which is referred to herein as FC-1 (FC-0 is the physical layer which is typically high-speed optical fiber).

In the illustrated embodiment, the communication system 1300 supports two tenants, Ten-1 and Ten-2. A physical server is directly attached to a SAN 100 via a FC link 500. Physical server 201 interfaces with the FC link 500 via a port on the FC Card 204. Physical server 201 hosts a VM that runs the function of the multi-tenant SAN controller 202. Any access request to the SAN 100 is made through the SAN controller 202. To enable multi-tenancy, SAN 100 is logically partitioned, so that it appears as multiple independent SANs. Logical SANs of Ten-1 and Ten-2 are mapped onto the SAN 100 as SAN 101 and SAN 102 respectively. The SAN controller maintains the mappings of tenant specific logical data blocks to the physical data blocks in the SAN. This logical partitioning and mapping are needed for security reasons so that any bad access by a tenant does not corrupt data of another tenant.

Physical server 301 hosts the VMs for Ten-1 and Ten-2, denoted as VM 302 and VM 303 respectively. The VMs run some tenant specific server applications. VM 302 accesses the SAN 101 and VM 303 accesses the SAN 102.

The VMs 302-303 and their respective SANs 101-102 are located in remote sites physically separated by an IP network 300. The physical separation is possible due to VM mobility (i.e VMs can move across remote sites over the virtual network that connects the VMs), remote disk access, tape backup, and live mirroring. In some embodiments, islands of multi-tenant FC SANs are interconnected over IP networks to form a unified SAN in a single FC fabric. The idea is to interconnect the VMs 302-303 to their respective SANs 101-102 by carrying FC traffic in such a manner that the FC fabric on SAN 100 and the FC devices are unaware of the presence of the IP network between them.

In order to emulate the direct connection of VMs 302-303 to their SANs 101-102, segments of the FC link between VMs 302-303 and the SAN controller 202 need to be virtualized. This virtualization is achieved as follows:

1. An NVGRE overlay is created between the hypervisors in server 201 and 301 that runs atop IP network 300. The hypervisors host the NVGRE overlay termination points and each termination point is configured with a unique IP address which is routable from the IP network 300. Hypervisor in server 201 hosts the termination point 207 and server 301 hosts the termination point 307. The termination points 207 and 307 access the IP network via their respective local NIC cards 203 and 304 respectively.
2. Each tenant is assigned a unique NVGRE VSID. For example, assume Ten-1 is assigned VSID 100 and Ten-2 is assigned VSID 200.
3. Ten-1 VM 302 is connected to the NVGRE overlay termination 307 via a virtual FC port 305, which is mapped to VSID 100 in the NVGRE overlay termination 307. Ten-2 VM 303 is connected to the NVGRE overlay termination 307 via a virtual FC port 306, which is mapped to VSID 200 in the NVGRE overlay termination 307.
4. The SAN controller 202 is connected to the NVGRE overlay termination 207 with two virtual FC ports—205 and 206 for Ten-1 and Ten-2 respectively. FC port 205 is mapped to VSID 100 and FC port 206 is mapped to VSID 200 in the NVGRE overlay termination 207.
5. VM 302 sends a FC packet to SAN 101 by virtual FC port 305. When the FC packet is received by NVGRE overlay termination 307, it pushes the NVGRE header with VSID 100 as demultiplexer for traffic belonging to Ten-1. Then the NVGRE packet is sent to remote NVGRE overlay termination 207, by adding the IP underlay encapsulation. When the packet reaches NVGRE overlay termination 207, It pops the IP underlay encapsulation as well as the NVGRE header with VSID 100 and forwards the resultant FC packet to the virtual FC port 205 which is mapped to VSID 100. SAN controller receives the FC packet on virtual FC port 205 which is assigned to Ten-1, so the controller sends the required FC packet to SAN 101 via FC link 500. In the same way VM 303 accesses the SAN 102.

In some cases, an FC packet may get dropped by any router in the IP network or by the NICs 203, 304. However, the FC requires a reliable link and NVGRE overlay schemes are based on unreliable delivery of datagrams.

The techniques disclosed herein can be implemented in other use cases. For example, Infiband is a competing protocol of FC that is used across storage systems. Similar to FC, Infiband is a reliable delivery protocol, so the use case disclosed herein is applicable to Infiband too. A PCIe (PCI Express) bus may be virtualized over an NVGRE overlay, wherein PCIe traffic need to be reliably transported. NVMe (Non-Volatile Memory express) is a protocol between services and storage made of solid-state drives. Similar to FC, NVMe can be sent over a NVGRE overlay to access storage based on solid state drives. All such applications could be generalized as multi-tenant distributed I/O in DCs that required reliable NVGRE overlays.

When a pool of VMs in a tenant form a cluster of servers (e.g grid computing) wherein the VMs are physically separated by an IP network, then the interconnections in the cluster/grid can be implemented as NVGRE overlays. The server cluster traffic needs to be reliably transported. In general, there could be several types of distributed applications spanning across the VMs of a tenant, wherein the application traffic needs to be reliably transmitted between the VMs over the NVGRE overlay.

Figure 14:
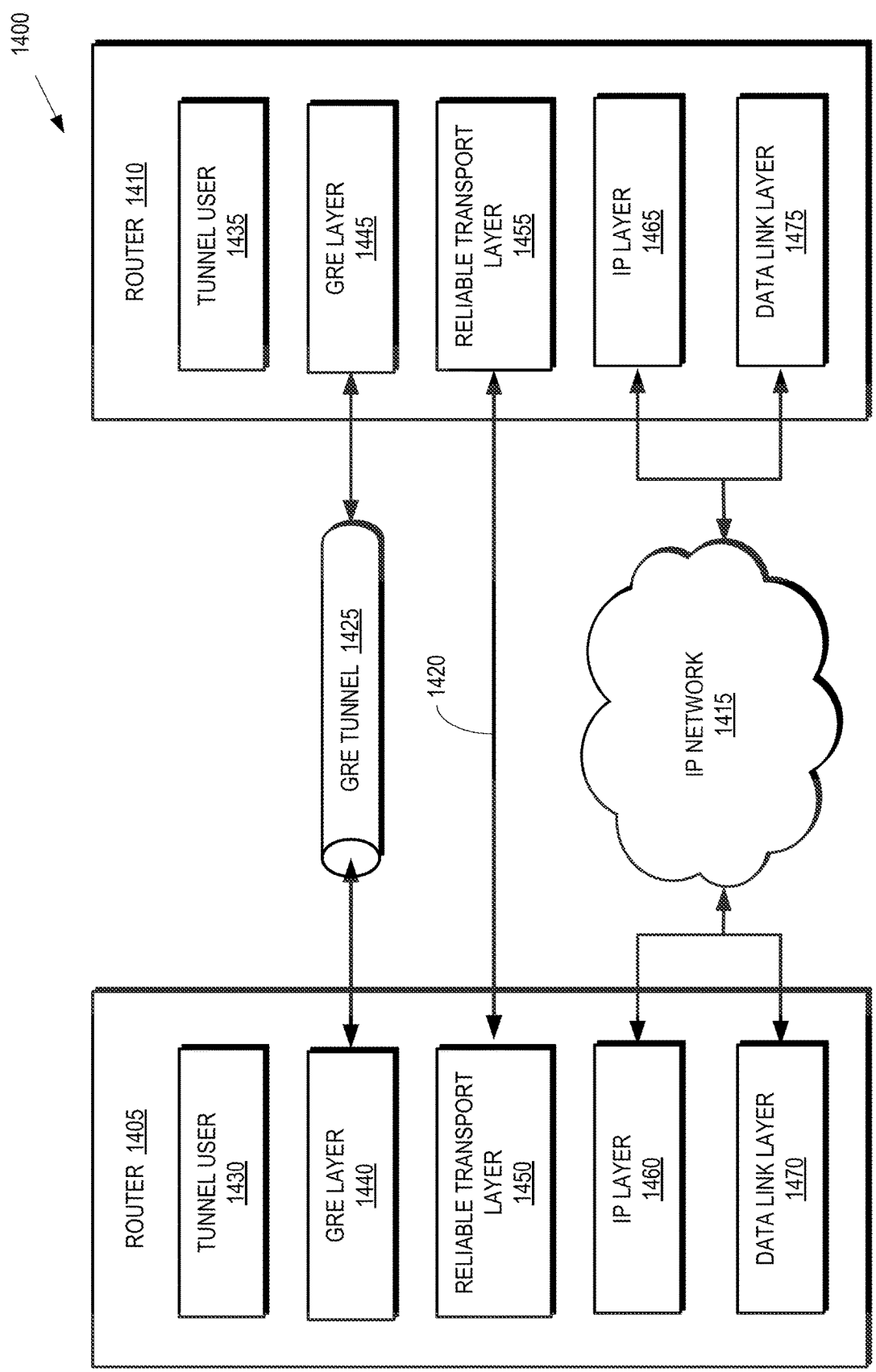
FIG. 14 is a block diagram of a communication system that is configured for reliable GRE tunneling according to some embodiments.

FIG. 14 is a block diagram of a communication system 1400 that is configured for reliable GRE tunneling according to some embodiments. The communication system 1400 includes routers 1405, 1410 that are interconnected by a network such as an IP network 1415. Note that herein the term "router" is used to generically refer to any device that can be connected to a network, such as a server or a router. The routers 1405, 1410 are configured with corresponding IP addresses that are used as the source or destination addresses by an IP underlay tunnel in the IP network 1415. A reliable transport layer connection 1420 is formed over the IP network 1415 for providing reliable transmission and reception of packets between the routers 1405, 1410. A GRE tunnel 1425 is then formed using the reliable transport layer connection 1420 to support tunneling packets of any protocol transparently over the IP network between the routers 1405, 1410, which are the endpoints of the GRE tunnel 1425.

The routers 1405, 1410 implement protocol stacks including layers that are used to form connections or tunnels between corresponding layers in the routers 1405, 1410. In the illustrated embodiment, GRE tunnel users 1430, 1435 (such as applications implemented in the routers 1405, 1410) generate payloads for transmission over the GRE tunnel 1425. GRE layers 1440, 1445 in the routers 1405, 1410 are configured to encapsulate payloads for transmission over the GRE tunnel 1425 and de-encapsulate packets that are received via the GRE tunnel 1425. Reliable transport layers 1450, 1455 sit between the GRE layers 1440, 1445 and IP layers 1460, 1465. The reliable transport layers 1450, 1455 provide reliable tunnelling of the GRE overlay packets via the reliable transport layer connection 1420. The reliable transport layer is connection-oriented and guarantees reliable delivery of GRE packets between a pair of source and destination addresses in the IP underlay tunnel, e.g., between the routers 1405, 1410. Some embodiments of the reliable transport layers 1450, 1455 perform flow control, congestion control, and other functions related to transporting packets via the reliable transport layer connection 1420.

IP layers 1460, 1465 in the routers 1405, 1410 are configured to encapsulate payloads in IP headers for transmission over the IP network 1415 and de-encapsulate packets received over the IP network 1415. Data link layers 1470, 1475 in the routers 1405, 1410 are configured to encapsulate payloads in data link layer headers for transmission using a network service and to de-encapsulate payloads that are received via the network service.

Figure 15:
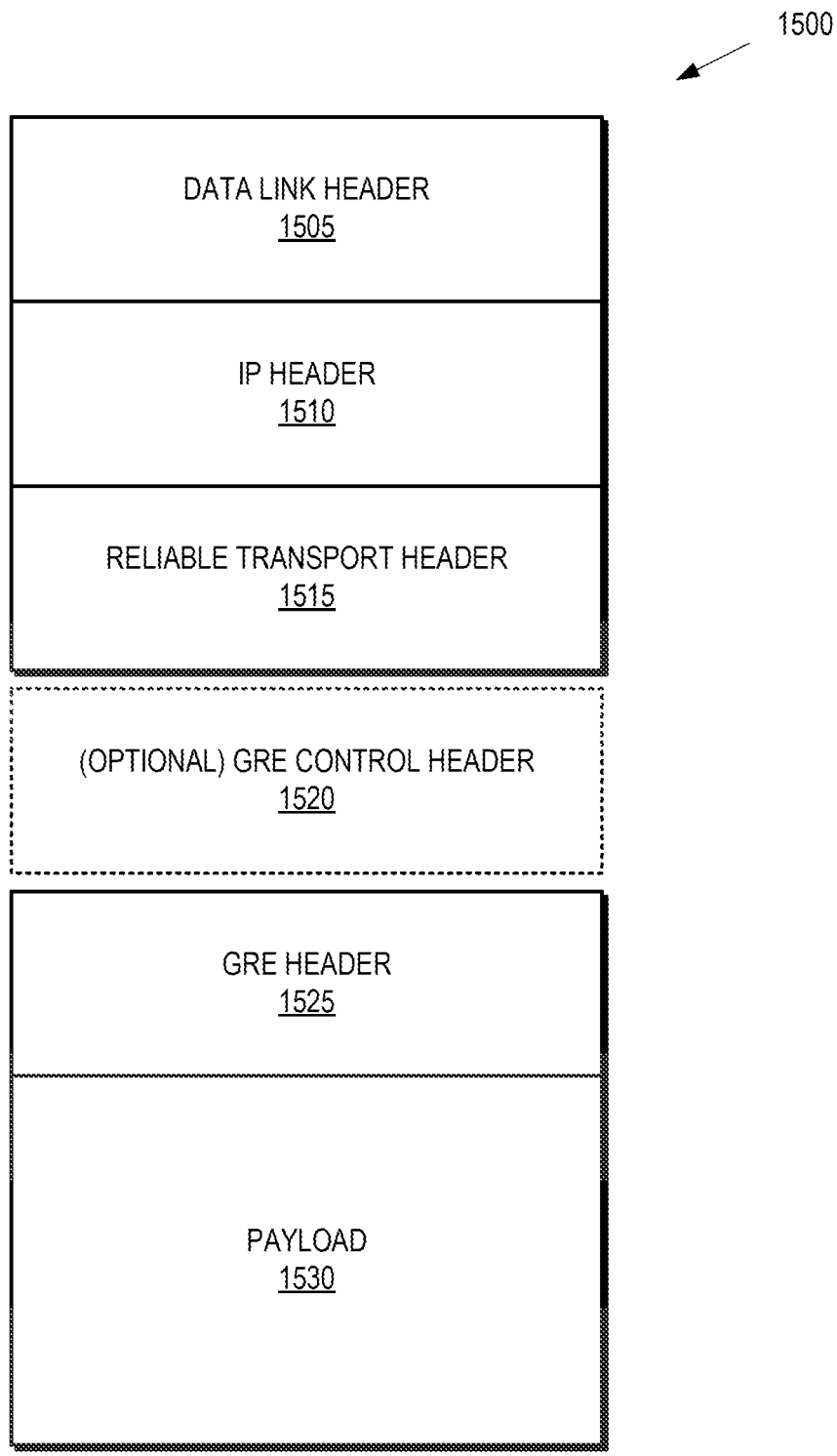
FIG. 15 is a block diagram of a packet that is encapsulated for reliable transmission over the GRE tunnel according to some embodiments.

FIG. 15 is a block diagram of a packet 1500 that is encapsulated for reliable transmission over the GRE tunnel according to some embodiments. The packet 1500 is generated by some embodiments of the routers 1405, 1410 shown in FIG. 14 for transmission over the reliable transport layer connection 1420 and the GRE tunnel 1425 shown in FIG. 14.

A data link header 1505 is the link layer header that is used to reach the immediate next-hop in the IP network. For example, for an Ethernet link from a router to the IP next-hop, this header is an Ethernet Header.

An IP header 1510 contains an IPv4 or an IPv6 datagram header. The source and destination addresses are set to addresses of the source and destination routers of the underlay IP tunnel, respectively. The IPv4 Protocol Number field or the IPv6 Next Header field in is set to a value of "47," indicating a GRE packet as the payload of IP.

The reliable transport header 1515 comprises of one or more headers from the reliable transport layer. Some embodiments of the packet 1500 include a GRE control header 1520 that is included when the reliable transport connection is stream-oriented, i.e., when the reliable transport connection transports streams of bytes. In that case, the receiving router needs to determine the boundaries of the GRE packets within the received byte stream. In order to demarcate the GRE packets in the byte stream, when a router sends a GRE packet, the router pushes the GRE control header 1520 atop the GRE header 1525 in the packet. Some embodiments of the GRE control header 1520 include a field that indicates the size of the GRE packet. The receiving router parses the first 4 octets (bytes) in the byte stream as the GRE control header 1520 and based on its length field, determines the ending byte of the GRE packet.

A GRE header 1525 contains the Protocol Type field that is set to the Ethertype value indicating the type of payload, e.g., the packet from the user of the GRE tunnel. In some embodiments, the GRE header 1525 is replaced by an NVGRE header to support one or more NVGRE overlay packets, as discussed herein.

A payload 1530 contains the packet from the user of the tunnel. The payload 1530 can include information of types such as Ethernet, IPv4, IPv6, MPLS or the like. The type of information included in the payload 1530 is indicated by the Protocol Type field.

The encapsulation represented by the data link header 1505, the IP header 1510, the reliable transport header 1515, the GRE control header 1520 (if present), and the GRE header 1525 causes user packets to be sent through the GRE tunnels using the reliable transport layer connection. When the receiving endpoint of the tunnel receives a packet, the receiving endpoint decapsulates the user packet by removing the IP header 1510, the reliable transport header 1515, the GRE header 215, and (if present) the GRE control header. The payload 1530 of the packet 1500 is then processed by the appropriate user application based on the Protocol Type specified in GRE header 1520.

Figure 16:
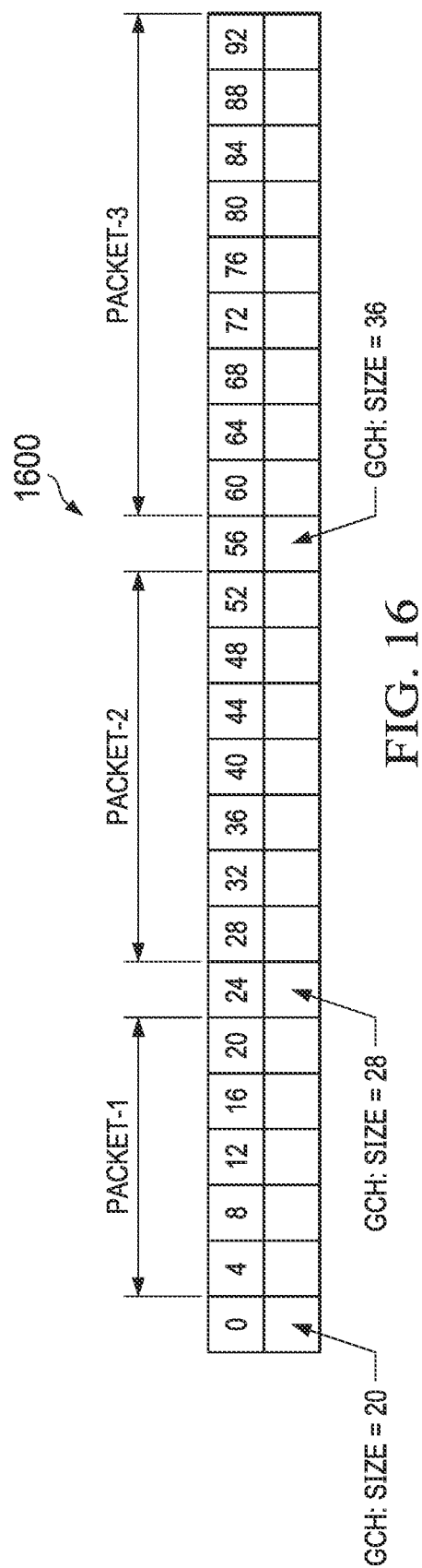
FIG. 16 is a byte stream including a sequence of 4-octet words according to some embodiments.

FIG. 16 is a byte stream 1600 including a sequence of 4-octet words according to some embodiments. In the illustrated embodiment, each word is indexed with the sequence number of its first octet. When a router receives this byte stream 1600 from the reliable transport connection, the router parses the word-0 as the GRE control header such as the GRE control header 1520 shown in FIG. 15. The size field indicates 20 octets. So, the words 4-20 constitutes the first GRE packet. Then word-24 is the GRE control header for the next packet and the size field indicates 28 octets. So, words-28-52 is the second GRE packet. Then word-56 is the GRE control header for the next packet, and so on.

In some embodiments, a GRE tunnel can carry traffic from different applications (tunnel users)—some requiring strict reliability from the tunnel whereas others do not require the same level of reliability. In such cases, the applications can be bound to two tunneling mechanisms—one with the state-of-the-art GRE tunneling methods for the applications that does not demand reliability (or has built in reliability within the application) and, another with the reliable GRE tunnel for the applications that require strict reliability from the overlay.

The reliable transport layer is implemented using one or more reliable transmission layer protocols including:
  Transmission Control Protocol (TCP) [TCP]. The reliable GRE tunnel that uses TCP as the reliable transport layer is denoted as "GRE-in-TCP". Herein, TCP is the "tunneling" layer of a GRE packet.
  Stream Control Transmission Protocol (SCTP) [SCTP]. The reliable GRE tunnel that uses SCTP as the reliable transport layer is denoted as "GRE-in-SCTP". Herein, SCTP is the "tunneling" layer of a GRE packet.
  QUIC [QUIC]. The reliable GRE tunnel that uses QUIC as the reliable transport layer is denoted as "GRE-in-QUIC". Herein, QUIC is the "tunneling" layer of a GRE packet.
  Transport Layer Security (TLS) [TLS]. The reliable GRE tunnel that uses TLS as the reliable transport layer is denoted as "GRE-in-TLS". Herein, TLS is the "tunneling" layer of a GRE packet.

To support the reliable transport protocols, each router (or GRE tunnel termination point) is configured to decapsulate GRE packet in the reliable transport protocol header by the remote router (or GRE tunnel termination point). The data-plane encapsulation techniques are disclosed herein. This capability can be either manually configured on each router or dynamically advertised.

Figure 17:
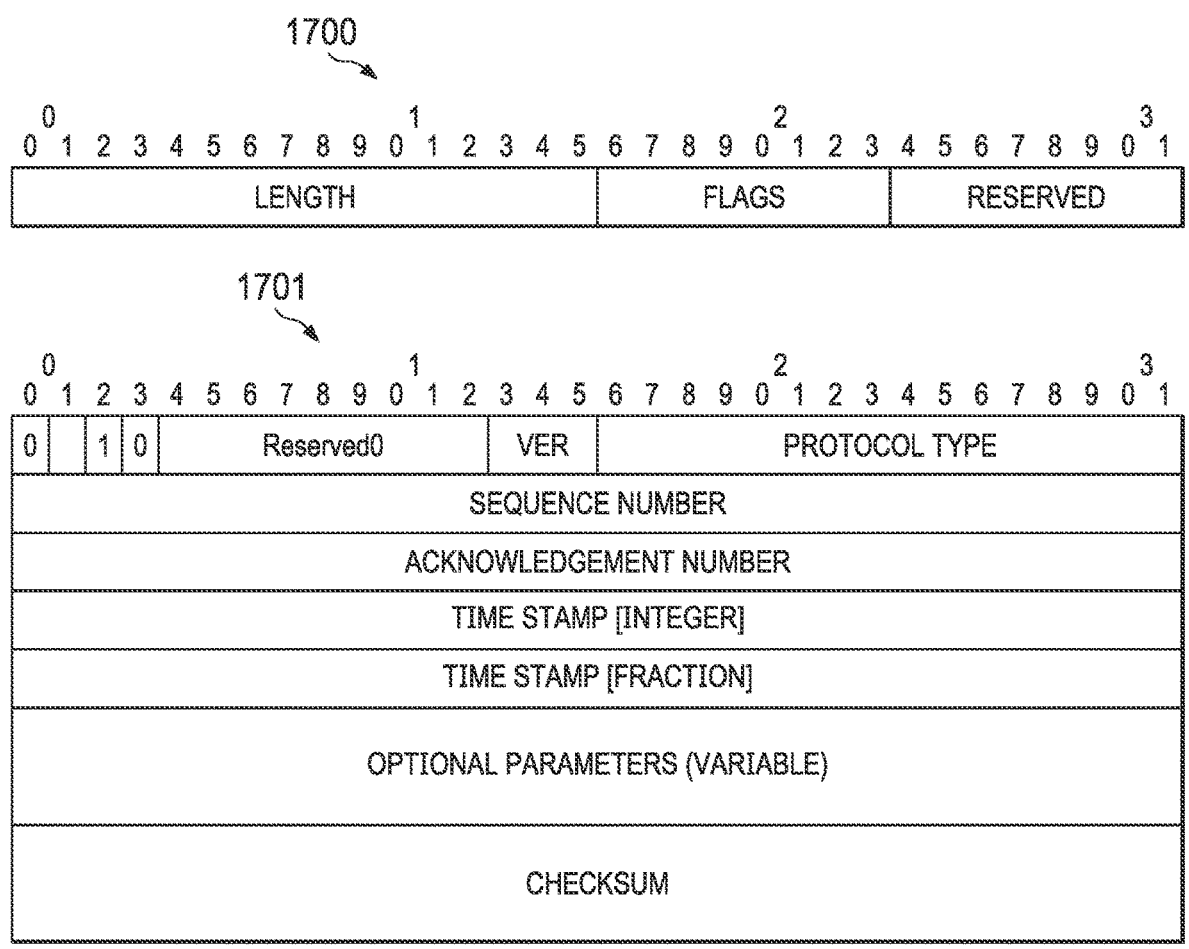
FIG. 17 illustrates a GRE control header and a GRE initial frame (GIF) according to some embodiments.

FIG. 17 illustrates a GRE control header 1700 and a GRE initial frame (GIF) 1701 according to some embodiments. The GRE control header 1700 is pushed atop the GRE packet before sending the packet on a stream-oriented reliable transport connection. The 4 octets that represent the fields in the GRE control header 1700 include:
  Length—16-bit field indicates length of the encapsulated GRE packet in terms of number of octets. This field can accommodate an GRE packet of size up to 65535B.
  Flags—8-bit field wherein each bit indicates a flag. No flag is defined in some embodiments. Sender sets this field to 0 and receiver ignores this field.
  Reserved—8-bit field reserved for future extensions. Sender sets this field to 0 and receiver ignores this field.

When a new transport connection is established, the GIF 1701 makes one round trip from the router that initiated the transport connection to the router receiving the connection request and back. Exchange of GIF is OPTIONAL to an implementation. GIF serves two functions:
  Conveyance of critical parameters (if any) at both routers.
  Sanity of the connection such as data integrity and measurement of performance such as delay, latency, and the like before sending GRE traffic.

The GIF 1701 starts with the common first 4-octets of GRE header. A new value for Protocol Type field is assigned as 0x6574, which indicates that this is GIF.

The other fields of the GIF 1701 include:
  Sequence Number: This is a random number sent out by the router that initiated GIF.

Acknowledgement Number: The router that receives GIF increments the Sequence Number by one and encode that value here.

Time Stamp: The timestamp inserted by the router that initiated GIF. The timestamp indicates the time of sending the GIF. This field is used to measure round-trip-time (RTT), latency etc of the GIF.

Optional Parameters: in some embodiments, the exact set of parameters is not specified, but this variable length field can be used to encode various optional parameters.

Checksum: Checksum of all the prior fields. The checksum is used to verify the sanity of the packet.

Some embodiments of the GIF 1701 also include other custom defined fields. If GIF 1701 is supported, then the administrator configures the requirements of the GIF 1701 in both routers participating in the connection.

Figure 18:
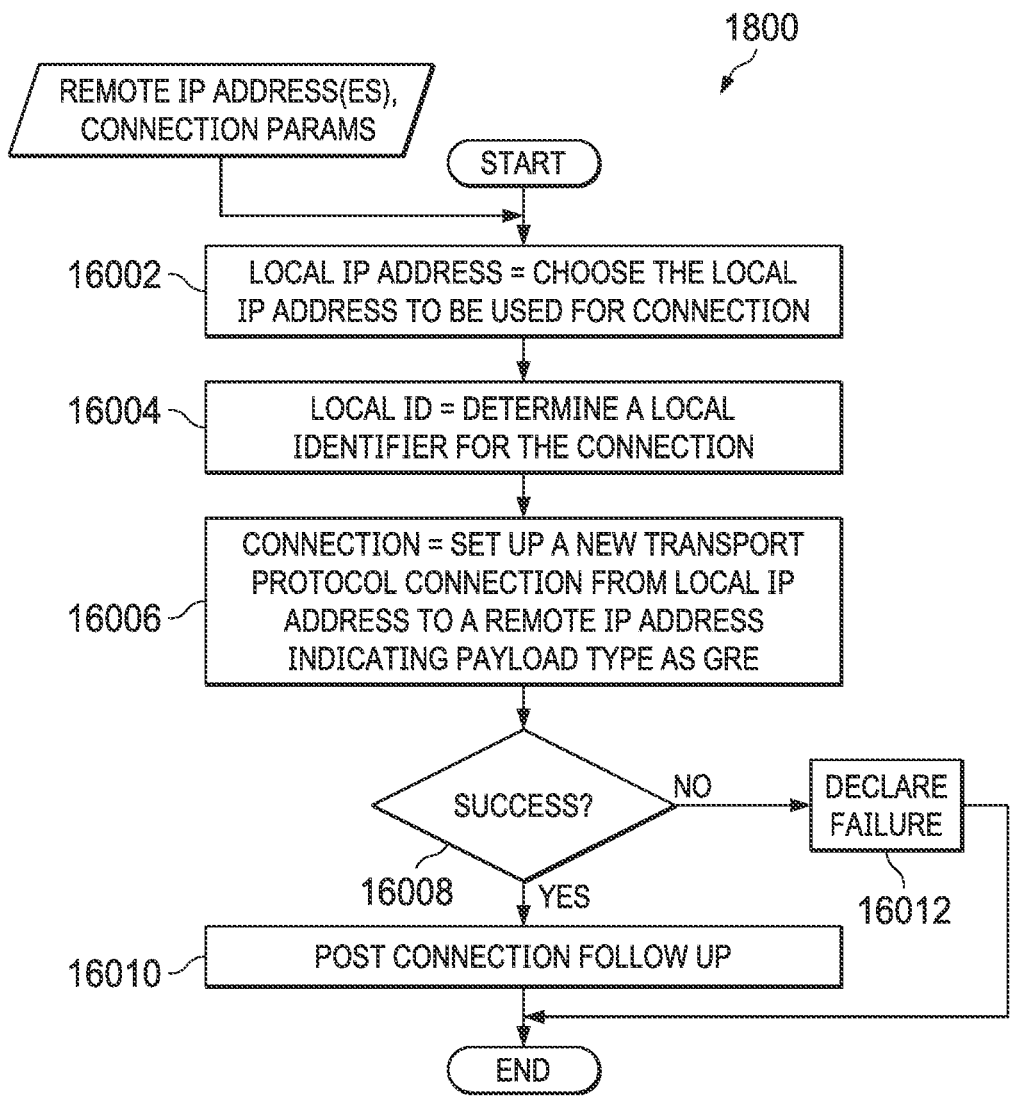
FIG. 18 is a flow diagram of a method of configuring reliable transport connection according to some embodiments.

FIG. 18 is a flow diagram of a method 1800 of configuring reliable transport connection according to some embodiments. If the transport protocol is designed to operate in a client-server paradigm, then the method 1800 is performed by the router that takes the role of the client. In client-server paradigms, the client initiates the connection set up and the server listens to incoming connection requests. The server then responds to the client by accepting or rejecting the request.

The inputs to the method are

One or more Remote IP addresses available for the connection, e.g., a set of IP addresses of the remote router configured to listen for connection requests.

Connection parameters, which define a set of parameters for the connection such as related to delay/timeouts, congestion, segmentation/reassembly of payload (GRE), and the like.

The method 1800 starts at step 16002. Step 16002 chooses a local IP address in the router that can be used for sending and receiving tunnel traffic. The method 1800 proceeds to step 16004. Step 16004 determines a local identifier to be used for the new connection, and then proceeds to step 16006. Step 16006 sets up a transport protocol connection with the local identifier from the local IP address to one of the remote IP addresses, specifying that the connection would carry GRE packets. Then the method 1800 proceeds to step 16008. Step 16008 checks if the connection succeeded. If yes, then proceeds to step 16010, else proceeds to step 16012. Step 16012 declares failure to configure the connection and then the method 1800 terminates.

Step 16010 performs certain follow up actions on the new connection such as initiating GIF etc. Now the transport connection is ready to be used by GRE packets. After step 16010, the method 1800 terminates.

Figure 19:
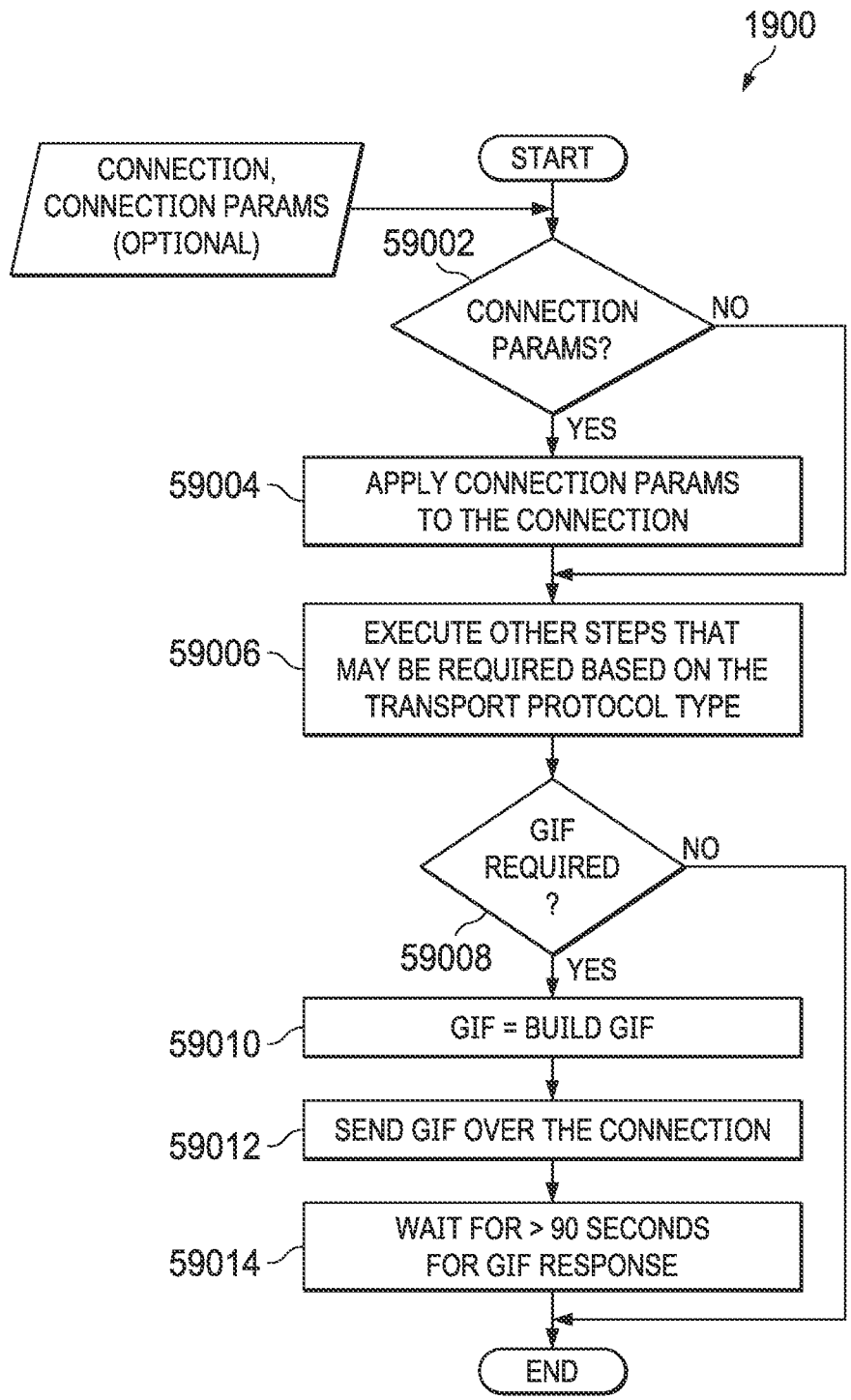
FIG. 19 is a flow diagram of a method of performing post-connection follow-up by initiating router according to some embodiments.

FIG. 19 is a flow diagram of a method 1900 of performing post-connection follow-up by initiating router according to some embodiments.

The inputs to the method are:

Connection, the transport connection that is operational

Connection parameters, which define a set of parameters for the connection such as related to delay/timeouts, congestion, segmentation/reassembly of payload (GRE) etc. Connection parameters are optional and may not be applicable to certain transport protocol types.

The method 1900 starts at step 59002. Step 59002 checks if connection parameters were provided. If yes, then proceeds to step 59004, else proceeds to step 59006. Step 59004 applies the input connection parameters to the new connection and then proceeds to step 59006. Step 59006 may execute various other actions based on the transport protocol type, such as further conditioning of the connection, and then proceeds to step 59008. Step 59008 checks if requirement of GIF is configured in the router. If yes, then proceeds to step 59010, else the method terminates.

Step 59010 builds a GIF and fills the necessary fields, and then proceeds to step 59012. Step 59012 sends the GIF over the transport connection and then proceeds to step 59014. Step 59014 waits for GIF response from peer router. It is recommended that an implementation wait for GIF response for at least 90 seconds. In order to wait, the router may start a timer for a duration within which it expects a GIF response and associates the timer with the transport connection. After this step, the method 1900 terminates.

Figure 20:
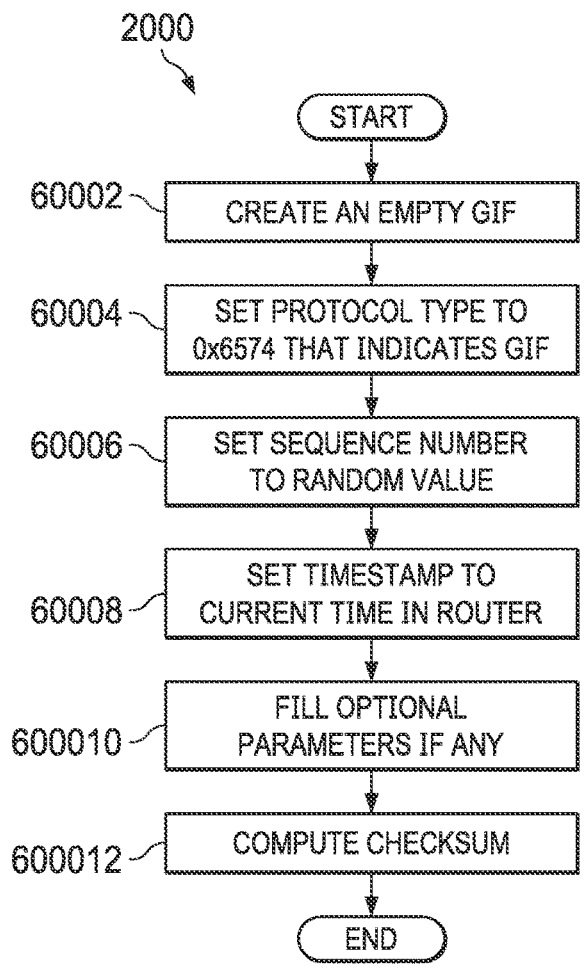
FIG. 20 is a flow diagram of a method of building a GIF by an initiating router according to some embodiments.

FIG. 20 is a flow diagram of a method 2000 of building a GIF by an initiating router according to some embodiments. Method 2000 may be used to implement block 59010 in FIG. 19.

The method 2000 begins at step 60002. Step 60002 creates an empty GIF, means GIF with all fields zeroed out. It proceeds to step 60004. Step 60004 sets the Protocol Type field as 0x6574 to indicate that the packet as GIF. Then it proceeds to step 60006. Step 60006 sets the Sequence Number field to a random value, and then proceeds to step 60008. Step 60008 sets the TimeStamp field to the current time in the router, and then proceeds to step 600010. Step 600010 fills the optional parameters if any; this step is specific to an embodiment. It proceeds to step 600012. Step 600012 computes the checksum of all prior fields in the GIF and fills the result into the CheckSum field. After this step, the method 2000 terminates.

Figure 21:
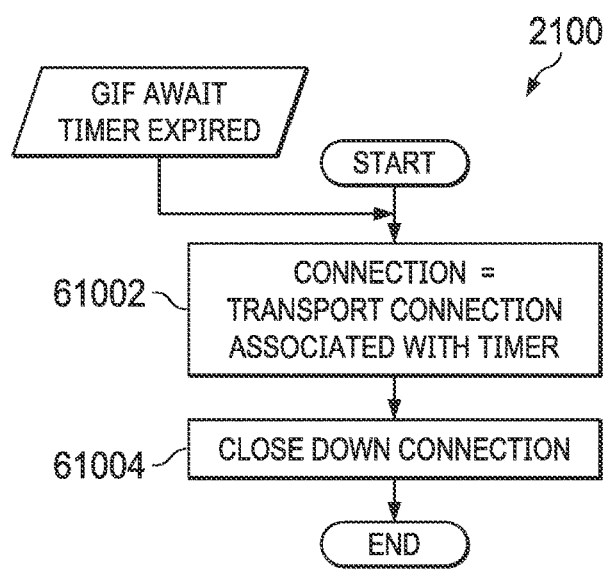
FIG. 21 is a flow diagram of a method of handling expiration of a GIF a wait timer by the initiating router according to some embodiments.

FIG. 21 is a flow diagram of a method 2100 of handling expiration of a GIF wait timer by the initiating router according to some embodiments.

The input to the method 2100 is the notification that GIF await timer expired. The method starts at step 61002. Step 61002 retrieves the transport connection associated with the timer and then proceeds to step 61004. Step 61004 closes the transport connection, and then the method 2100 terminates.

Figure 22:
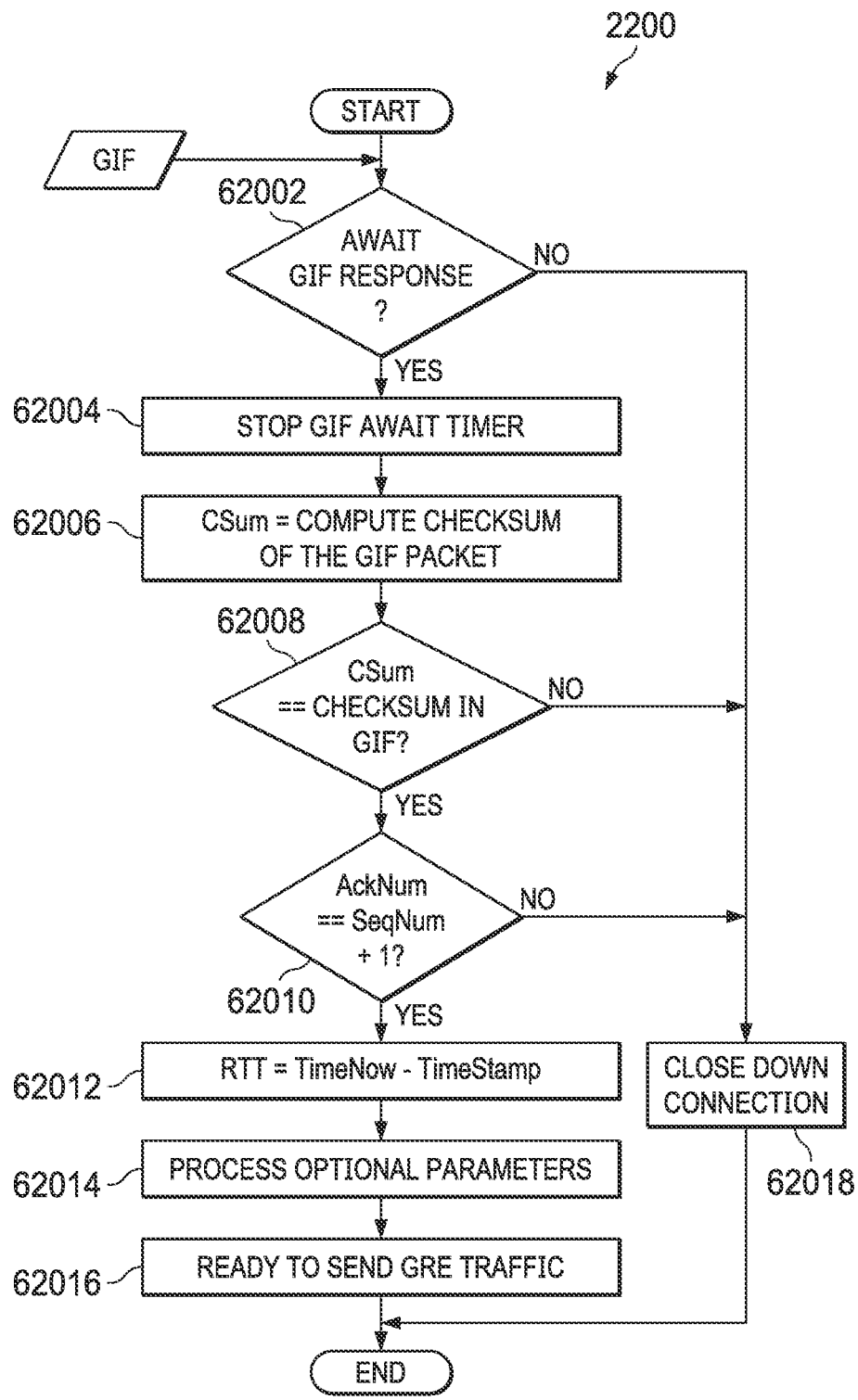
FIG. 22 is a flow diagram of a method of processing a GIF response by an initiating router according to some embodiments.

FIG. 22 is a flow diagram of a method 2200 of processing a GIF response by an initiating router according to some embodiments.

The input to the method is a GIF packet. Determination of a received packet as GIF is made as part general processing of GRE packets on the transport connection, as disclosed herein.

The method 2200 starts with step 62002. Step 62002 checks if the router has been waiting for GIF response from peering router, i.e if GIF await timer is running. If yes then proceeds to step 62004, else proceeds to step 62018 to handle as invalid packet. Step 62018 closes the transport connection.

Step 62004 stops the GIF await timer, and then proceeds to step 62006. Step 62006 computes the checksum of all fields in the GIF packet, except the checksum field. It proceeds to step 62008. Step 62008 checks if the computed checksum is equal to the value of checksum field in the packet. If yes, then proceeds to step 62010, else proceeds to step 62018 to handle erroneous GIF packet. Step 62018 closes the transport connection.

Step 62010 checks if the value in acknowledgement number field in GIF packet is equal to value in sequence number field+1. If no, then proceeds to step 62018 to handle as erroneous GIF packet, else proceeds to step 62012. Step 62018 closes the transport connection.

Step 62012 computes the RTT (Round Trip Time) of the GIF packet by decrementing the value in timestamp field in the GIF packet from the current timestamp in the router. The RTT provides an idea about the latency of the tunnel to remote router. It proceeds to step 62014. Step 62014 handles the optional parameters (if any) in the GIF packet, and then proceeds to step 62016. Step 62016 marks the connection as ready for tunneling GRE traffic, and then the method 2200 terminates.

Figure 23:
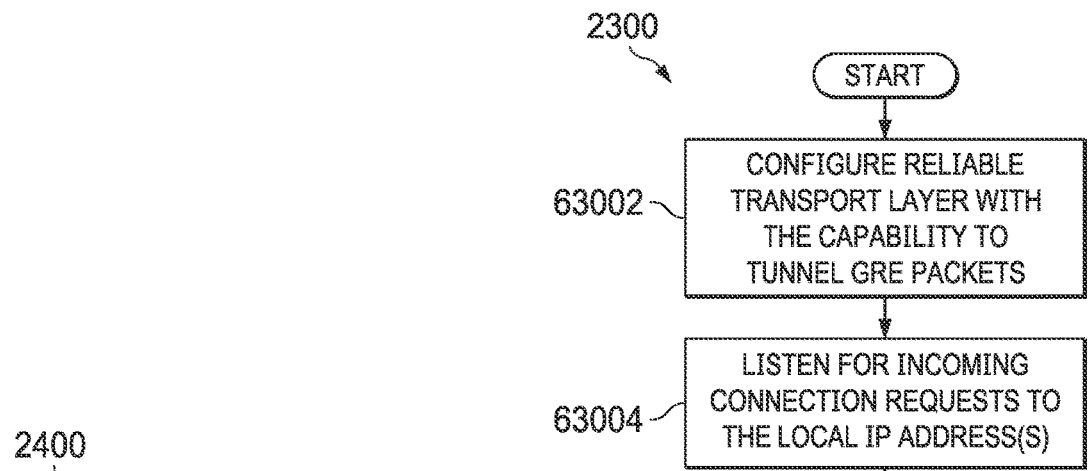
FIG. 23 is a flow diagram of a method for listening to incoming requests for a reliable transport layer connection according to some embodiments.

FIG. 23 is a flow diagram of a method 2300 of processing incoming requests for a reliable transport layer connection according to some embodiments. A router configures a reliable transport layer to listen to requests for incoming connections to be used for GRE tunnels. This is implemented by routers that configure reliable GRE tunnels.

The method 2300 starts at step 63002. This step configures the transport layer with the capability to tunnel GRE packets, and then proceeds to step 63004. Step 63004 starts listening to incoming connection requests to any IP address in a pool of local IP addresses (chosen administratively).

Figure 24:
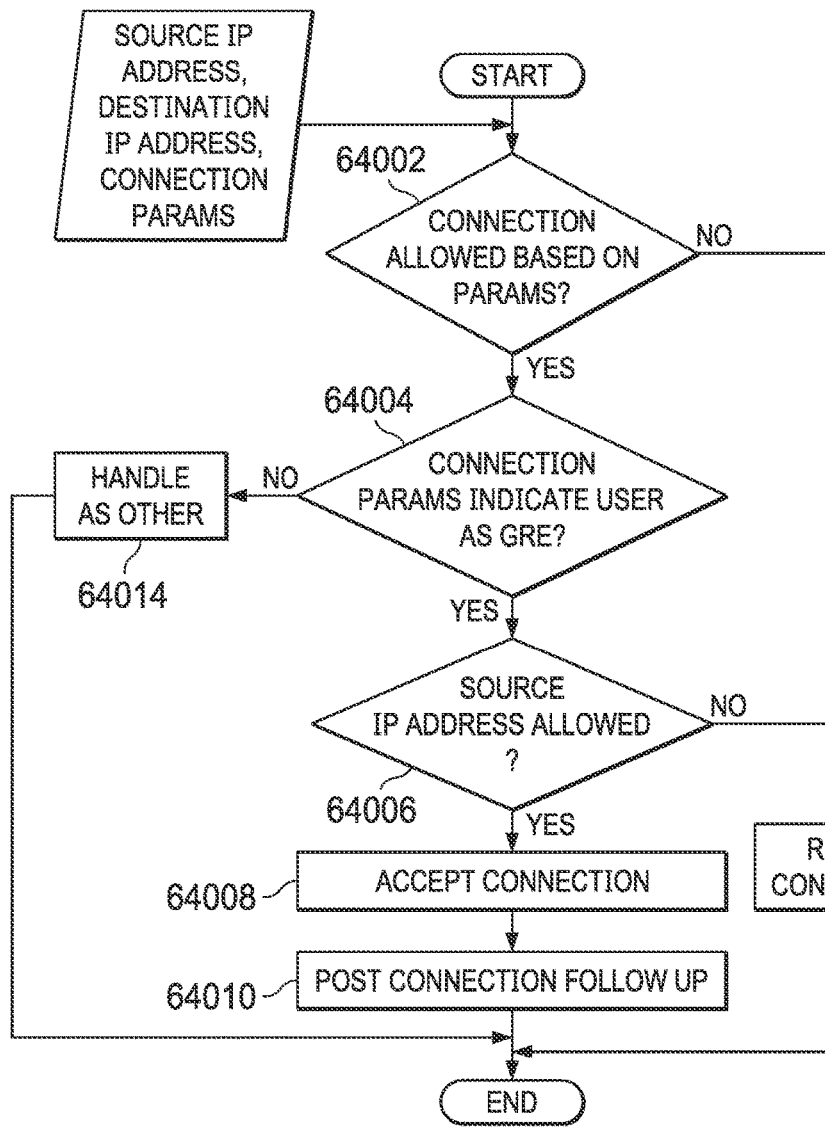
FIG. 24 is a flow diagram of a method a processing incoming connection requests according to some embodiments.

FIG. 24 is a flow diagram of a method 2400 for processing incoming connection requests according to some embodiments.

The input to the method is the connection request with the following parameters:
Source IP address, IP address of the remote router that sent the request
Destination IP address, a local IP address of this router.
Connection Parameters, the transport protocol specific parameters in the connection request.

The method 2400 begins at step 64002. Step 64002 evaluates the connection parameters to check if the connection can be allowed. If not allowed, then it proceeds to step 64012, else proceeds to step 64004. Step 64012 rejects the connection using appropriate methods in the transport layer, i.e rejection notification to remote router as per methods in the transport protocol. The method terminates after step 64012.

Step 64004 checks if connection parameters indicate the user as GRE. If not then proceeds to step 64014, else proceeds to step 64006. Step 64014 handles the connection request as per the associated user. After step 64014, the method 2400 terminates.

Step 64006 checks if a connection is allowed from the remote router, i.e from the source IP address. The factors that determine whether a router should allow an incoming connection or not discussed herein. For example, the router may employ a method to discover all potential remote routers that may participate in reliable GRE tunneling with the router. If connection is not allowed then proceeds to step 64012, else proceeds to step 64008. Step 64012 rejects the connection using appropriate methods in the transport layer, i.e rejection notification to remote router as per methods in the transport protocol. The method 2400 terminates after step 64012.

In Step 64008, the router accepts the connection request. It means the state for the connection is created based on the semantics of the transport layer (may use certain elements in connection parameters and may include source and destination IP address as well). It proceeds to step 64010. Step 64010 performs certain follow up actions on the new connection. After step 64010, the method 2400 terminates.

Figure 25:
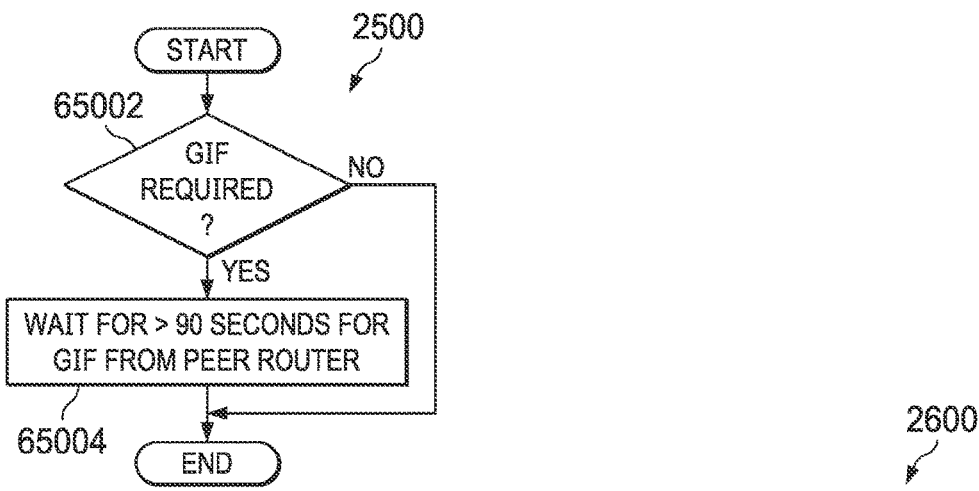
FIG. 25 is a flow diagram of a method of post-connection follow-up by the receiving router according to some embodiments.

FIG. 25 is a flow diagram of a method 2500 of post-connection follow-up by the receiving router according to some embodiments. Method 2500 may be used to implement block 64010 in FIG. 24.

The method 2500 starts with step 65002. Step 65002 checks if GIF is required by the router. If yes then proceeds to step 65004, else the method terminates. Step 65004 waits for GIF from peer router. It is recommended that an implementation wait for GIF response for at least 90 seconds. To wait, the router may start a timer for a duration within which it expects a GIF response and associates the timer with the transport connection. After this step, the method 2500 terminates.

If the router fails to receive a GIF within a predefined time period (i.e the timeout set at step 65004 in FIG. 65 expires), then the router executes techniques as disclosed herein.

Figure 26:
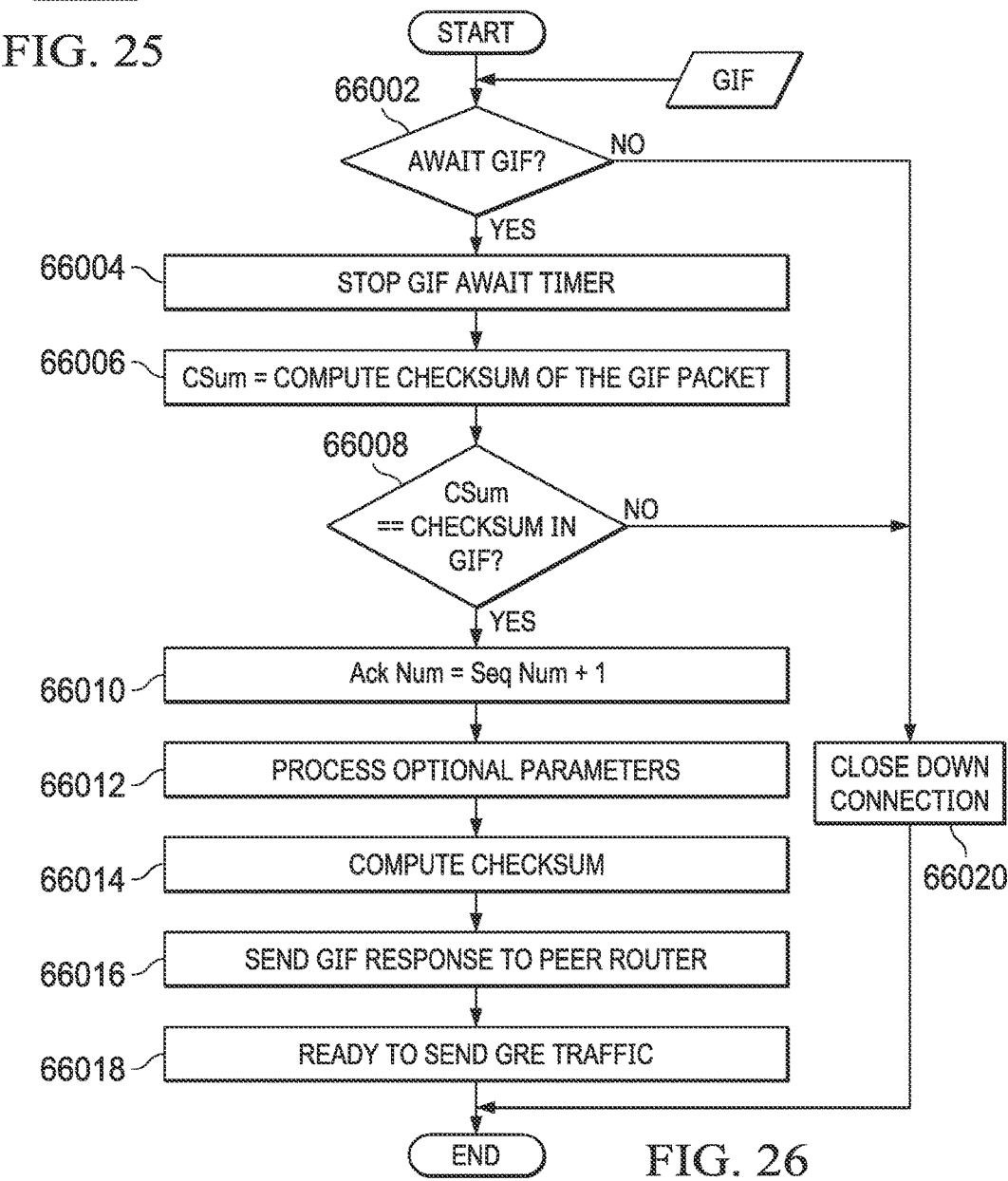
FIG. 26 is a flow diagram of a method of processing a GIF response by a receiving router according to some embodiments.

FIG. 26 is a flow diagram of a method 2600 of processing a GIF response by a receiving router according to some embodiments.

The input to the method is a GIF packet.

Determination of a received packet as GIF is made as part general processing of GRE packets on the transport connection, as disclosed herein.

The method 2600 starts with step 66002. Step 66002 checks if the router has been waiting for GIF response from peering router, i.e if GIF await timer is running. If yes then proceeds to step 66004, else proceeds to step 66020 to handle as invalid packet. Step 66020 closes the transport connection.

Step 66004 stops the GIF await timer, and then proceeds to step 66006. Step 66006 computes the checksum of all fields in the GIF packet, except the checksum field. It proceeds to step 66008. Step 66008 checks if the computed checksum is equal to the value of checksum field in the packet. If yes, then proceeds to step 66010, else proceeds to step 66020 to handle erroneous GIF packet. Step 66020 closes the transport connection.

Step 66010 sets the value in acknowledgement number field in GIF packet equal to value in sequence number field+1. Then it proceeds to step 66012.

Step 66012 handles the optional parameters (if any) in the GIF packet, and then proceeds to step 66014. Step 66014 computes the checksum of all prior fields in the GIF and updates the result into the CheckSum field, and then proceeds to step 66016. Step 66016 sends the updated GIF packet back to the peer router, and then proceeds to step 66018. Step 66018 marks the connection as ready for tunneling GRE traffic, and then the method 2600 terminates.

Figure 27:
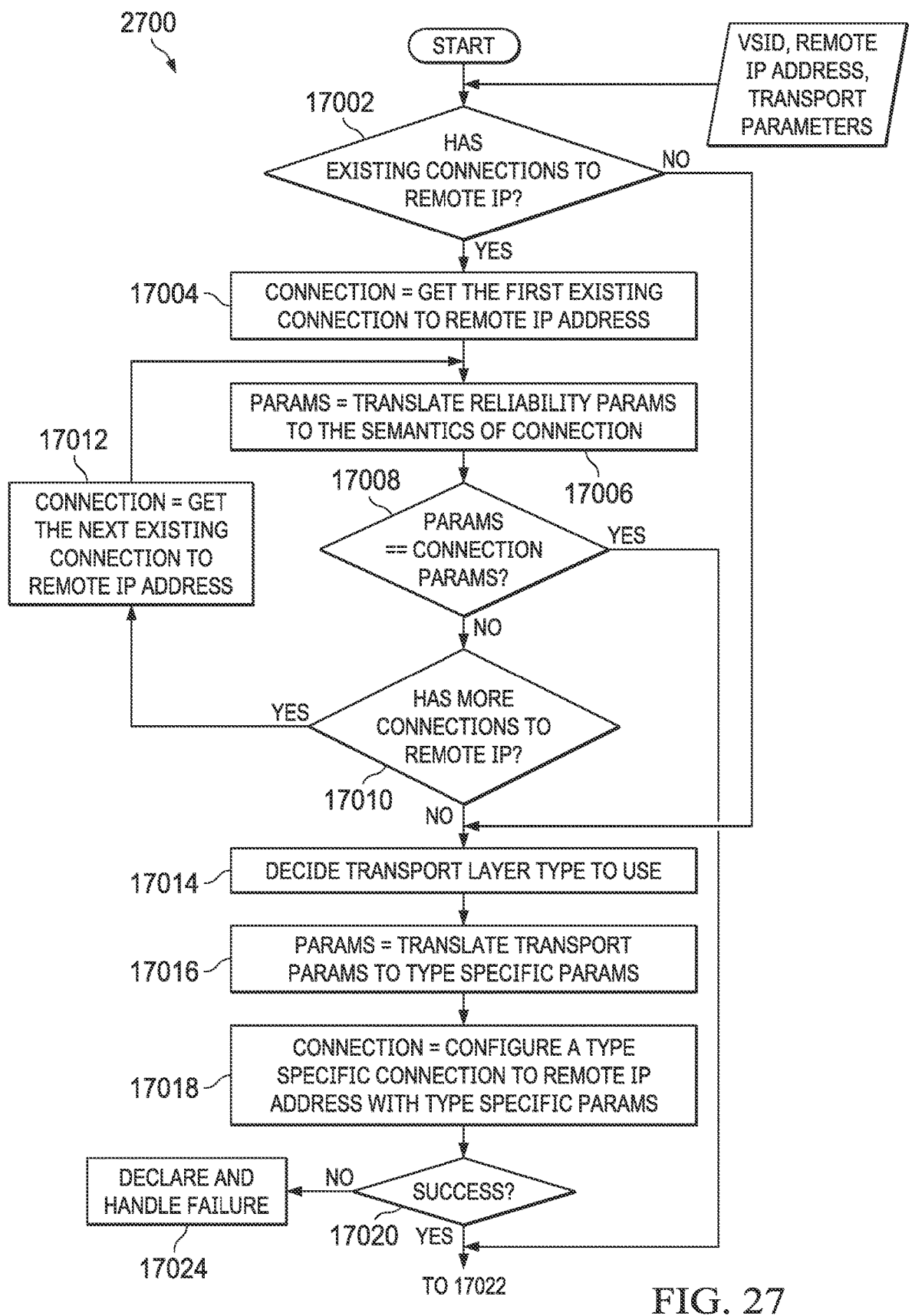
FIG. 27 is a flow diagram of a first portion of a method of configuring a reliable NVGRE overlay according to some embodiments.
Figure 28:
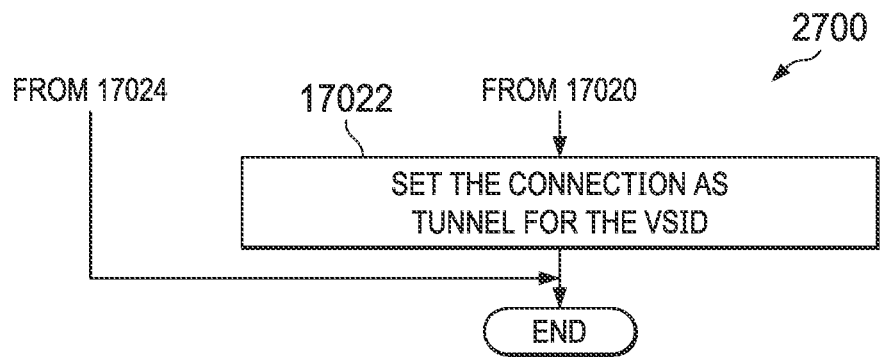
FIG. 28 is a flow diagram of a second portion of the method according to some embodiments.

FIG. 27 is a flow diagram of a first portion of a method 2700 of configuring a reliable NVGRE overlay and FIG. 28 is a flow diagram of a second portion of the method 2700 according to some embodiments.

The inputs to the method are
VSID of the NVGRE Overlay.
An IP address in the remote router of the overlay.Transport Parameters which define a set of parameters for the tunnel related to delay/timeouts, congestion, segmentation/reassembly, and the like as required by the overlay The method 2700 starts at step 17002. Step 17002 checks if there are existing reliable transport connections to the remote router, which is used by other NVGRE overlays. If none, then proceeds to step 17014, else proceeds to step 17004.

Step 17004 gets the first reliable transport connection to the remote router, which is used by other NVGRE overlays. It proceeds to step 17006. Step 17006 translates the input transport parameters to the equivalents configured in the connection, and then proceeds to step 17008. Step 17008 checks if the parameters requested by the overlay matches to the parameters of the connection. If matches then proceeds to step 17022, else proceeds to step 17010.

Step 17010 checks if there are more existing reliable transport connections to the remote router for NVGRE overlays. If has more connections then proceeds to step 17012, else proceeds to step 17014. Step 17012 gets the next reliable transport connection to remote router, and then returns to step 17006 to repeat subsequent steps for the next connection.

Step 17014 is reached when a new transport connection is required. Step 17014 determines the reliable transport layer type to use. For example, if the router supports multiple types of reliable transport layers that support NVGRE overlays that it may need to make a choice. Factors determining then choice are not discussed herein. Then it proceeds to step 17016. Step 17016 translates the transport parameters (input) to the semantics of the chosen transport layer (i.e connection parameters), and then proceeds to step 17018.

Step 17018 configures a new reliable transport connection to the remote router, to be used for NVGRE overlays. The transport connection is configured with the connection parameters. Then it proceeds to step 17020. Step 17020 checks if the connection has been set-up successfully. If not then proceeds to step 17024, else proceeds to step 17022. Step 17024 declares and handles failure to configure the NVGRE overlay. After step 17024, the method 2700 terminates.

Step 17022 sets the transport connection as the tunnel associated with the VSID. After step 17022, the method 2700 terminates.

Figure 29:
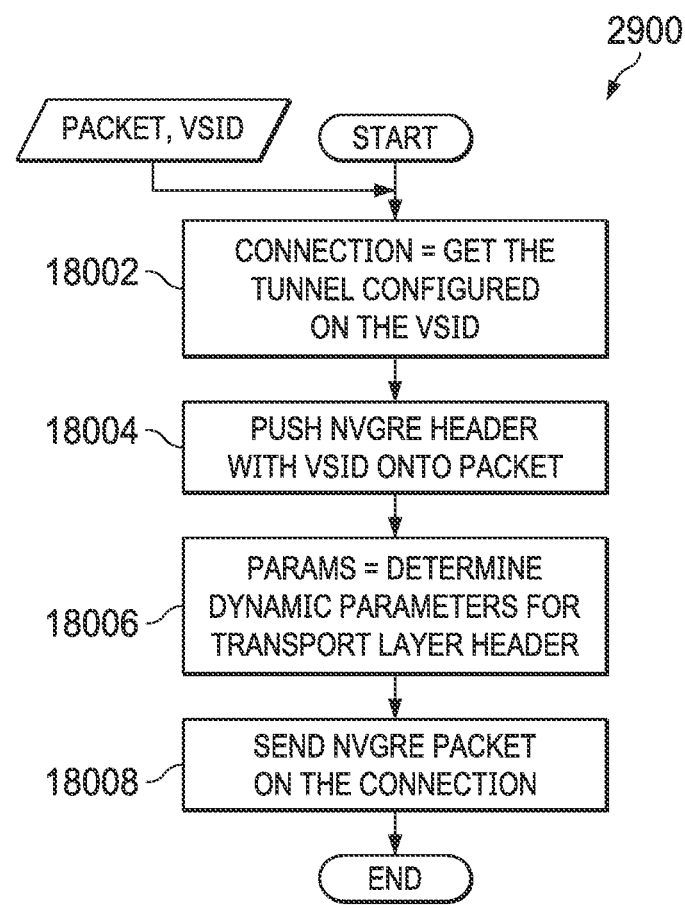
FIG. 29 is a flow diagram of a method of transmitting a packet on a reliable NVGRE overlay according to some embodiments.

FIG. 29 is a flow diagram of a method 2900 of transmitting a packet on a reliable NVGRE overlay according to some embodiments.

The inputs to the method are:
The packet to be transmitted (e.g an FC packet as described in section 3.2).
VSID that identifies the NVGRE overlay.

The method 2900 starts at step 18002. Step 18002 gets the tunnel configured for the VSID, which is the reliable transport layer connection. It proceeds to step 18004. Step 18004 encodes VSID into a NVGRE header and pushes it onto the packet, and then proceeds to step 18006. Step 18006 determines the dynamic parameters to be used by the connection while it pushes the transport header onto the packet. Such dynamic parameters can be entropy related fields in the transport header that may be used by transit router in IP network to compute the hash for load balancing packets on ECMP etc. Then it proceeds to step 18008. Step 18008 sends the NVGRE packet on the connection, with the dynamic parameters for the transport header. After step 18008, the method 2900 terminates.

Figure 30:
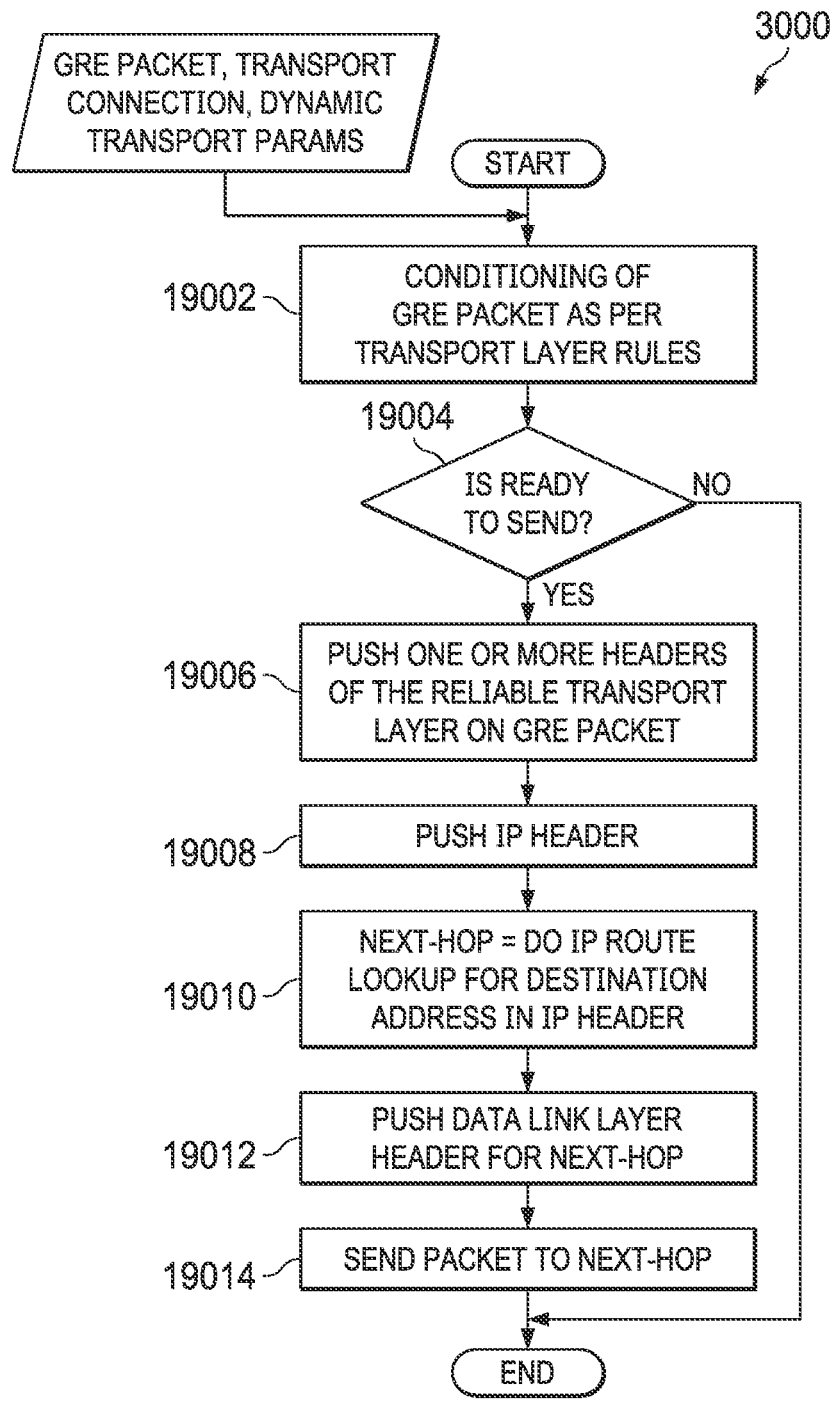
FIG. 30 is a flow diagram of method of transmitting NVGRE packets on a reliable connection according to some embodiments.

FIG. 30 is a flow diagram of method 3000 of transmitting NVGRE packets on a reliable connection according to some embodiments. Method 3000 may be used to implement the block 18008 in FIG. 29.

The inputs to the method are:
GRE packet to be transmitted
Transport Layer Connection on which to send the GRE packet
Dynamic parameters for the transport layer header(s)

The method 3000 starts at step 19002. Step 19002 conditions the GRE packet—which means the reliable transport layer prepares the packet as per the connection status, such as
If the packet needs to be segmented further, then the packet is segregated into multiple segments.
Applies congestion control, flow control on segments as necessary.

Then the method 3000 proceeds to step 19004. Step 19004 checks if the one or more segments of the packet are ready to be sent. For example, the segments may not be sent due to congestion, flow control, and the like. If not ready then the segments will be sent later when the congestion is cleared, so the method 3000 terminates for now. If ready to be sent, then proceeds to step 19006.

Step 19006 pushes the one or more headers of the transport layer. The fields in the headers are filled as per the connection parameters, such as the fields that indicate the payload type as GRE and the identifiers of the connection. The dynamic parameters (input) are populated into the header(s) as required. Then the method 3000 proceeds to step 19008.

Step 19008 pushes the IP header onto the packet. The source and destination addresses in the IP header are filled as per the local and remote IP addresses of the transport layer connection. Protocol field (if IPv4 Header) or the Next Header field (if IPv6 Header) is set to indicate the transport layer type. Then the method 3000 proceeds to step 19010.

Step 19010 performs route lookup for the destination address in the IP Header, which results in the next-hop for the packet. It proceeds to step 19012. Step 19012 pushes the Data Link Layer Header onto the packet which is required to send the packet on the link to the next-hop. Then it proceeds to step 19014. Step 19014 sends the packet to the next-hop, and then the method 3000 terminates.

Figure 31:
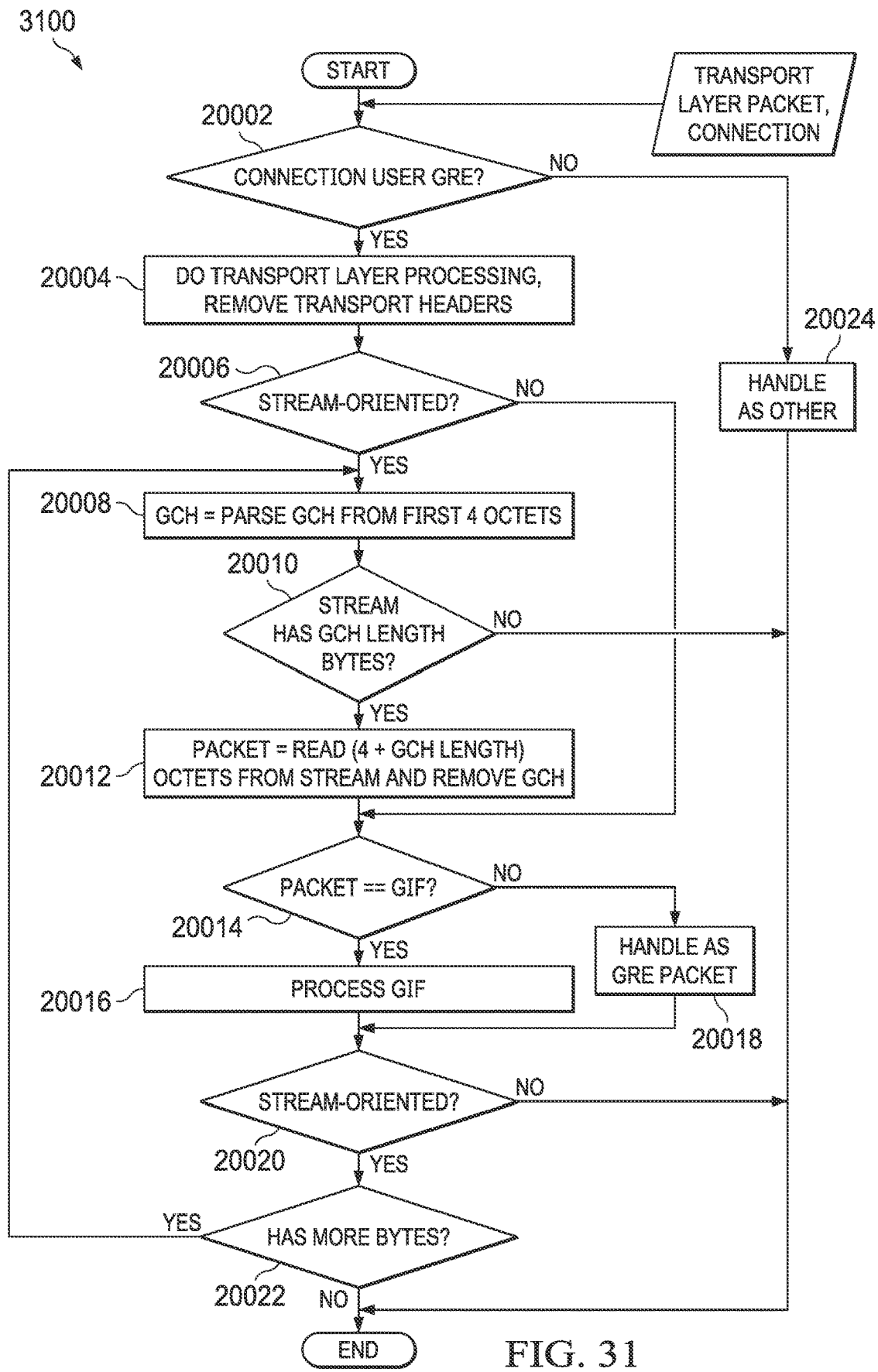
FIG. 31 is a flow diagram of a method of processing packets on reliable GRE tunnels according to some embodiments.

FIG. 31 is a flow diagram of a method 3100 of processing packets on reliable GRE tunnels according to some embodiments.

The inputs to the method are:
A transport layer packet on a connection, i.e received by the transport layer of the router with transport layer specific header(s) at the top.
The Connection The method begins at step 20002. Step 20002 checks if GRE is the user application of the connection. If not GRE then proceeds to step 20024, else proceeds to step 20004. Step 20024 handles the transport layer packet for non-GRE applications using state-of-the-art methods.

Step 20004 performs all required transport layer processing on the transport layer packet using as per the specification of the transport protocol. Then it proceeds to step 20006.

Step 20006 checks if the transport protocol is stream-oriented. In a stream-oriented protocol, the bytes of a whole GRE packet may not arrive together in the transport layer packet, i.e chunks of the packet may arrive on multiple transport packets. Otherwise a transport protocol can be datagram-oriented, so that the transport layer packet carries the entire GRE packet. When this method is implemented for a specific transport protocol, then step 20006 may not be needed since whether the protocol is stream-oriented or datagram-oriented is inherent to the protocol. If check in step 20006 results in stream-oriented then proceeds to step 20008, else proceeds to step 20012.

Step 20008 parses the first 4 octet of the received stream as GCH, and then proceeds to step 20010. Step 20010 checks if the received stream at least has the number of octets specified in the length field in the GCH, i.e at least has the whole of the next GRE packet. If the stream does not have whole packet then the method terminates, else proceeds to step 20012.

Step 20012 pulls from the received stream the number of octets specified in the length field of the GCH plus 4 octets, that constitutes the GRE packet encapsulated by GCH. It them removes the GCH to generate the GRE packet. Then it proceeds to step 20014.

Step 20014 checks if the GRE packet is GIF. If yes, then proceeds to step 20016, else proceeds to step 20018. Step 20016 handles the GIF packet. It proceeds to step 20020. Step 20018 handles the packet as GRE packet, and then proceeds to step 20020.

Step 20020 checks if the transport protocol is connection-oriented. This check is similar to step 20006, so refer to the details in that step. If yes, then proceeds to step 20022, else the method terminates (because the whole GRE packet was processed). Step 20022 checks if more bytes are pending to be processed in the payload of transport layer protocol. If yes, then returns to step 20008 to process the next GRE packet if any. If no, then the method 3100 terminates.

In some embodiments, transmission control protocol (TCP) is used as the reliable transport layer for tunnelling of GRE packets.

Figure 32:
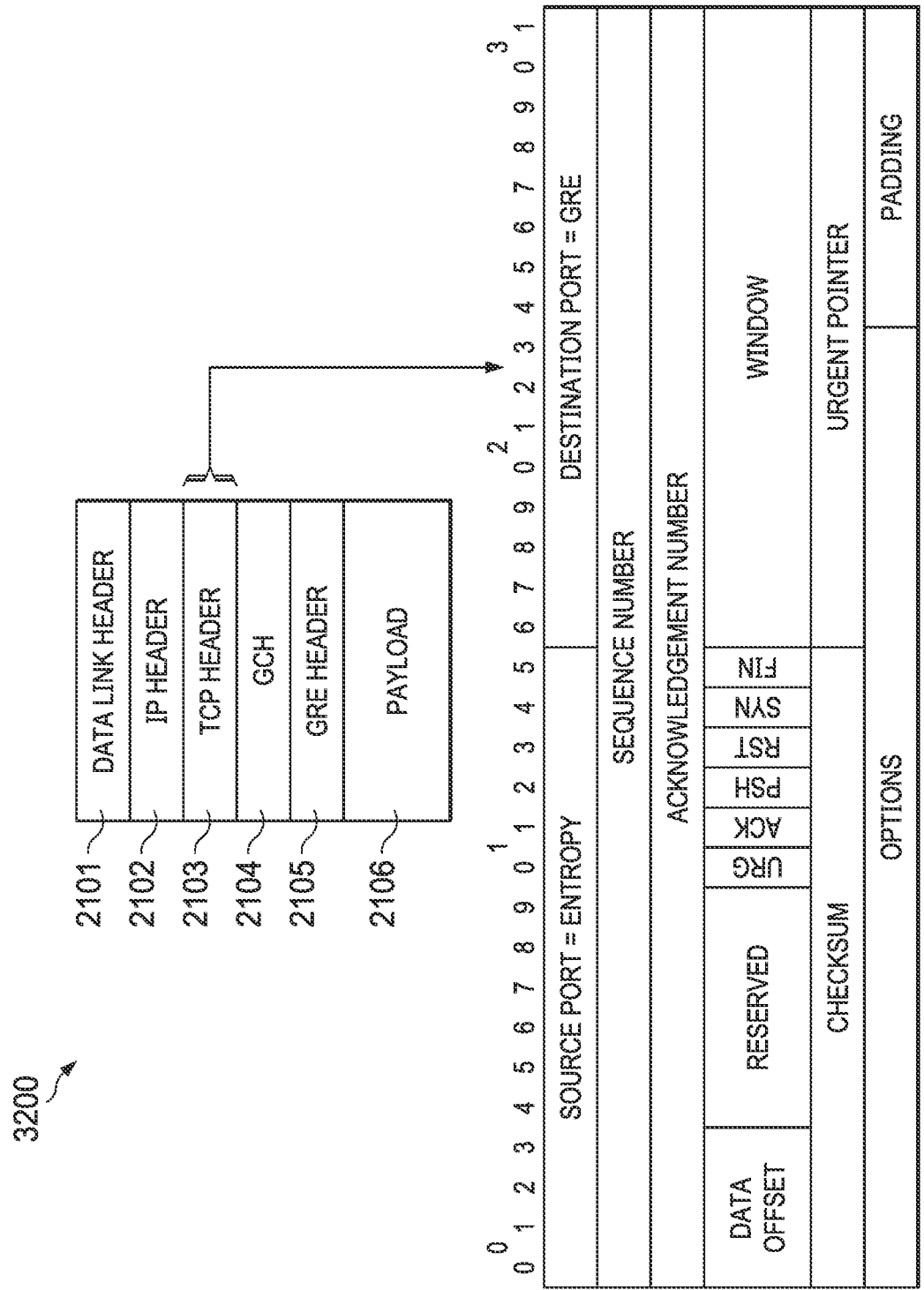
FIG. 32 is a packet encoding of a GRE-in-TCP encapsulation format according to some embodiments.

FIG. 32 is a packet encoding 3200 of a GRE-in-TCP encapsulation format according to some embodiments.

Semantics of headers 2101, 2102, 2105 and payload 2106 are disclosed herein.

Header 2103 is the TCP Header for the TCP connection used by the GRE packets as tunnel.

The Source Port indicates the identifier of the TCP connection at the sender of the TCP packet and the Destination Port number indicates the identifier of the TCP connection at the receiver of the TCP packet. TCP operates in the client-server paradigm. The server listens for incoming connections on a TCP port assigned for a specific payload type. To initiate a TCP connection to a server, a client allocates a locally unique TCP port number. The client initiates a TCP connection request to the server, wherein in the TCP packet carrying the connection request is encoded with the Source Port field in 2103 as the local TCP port and the Destination Port field in 2103 as the TCP port being listened by the server.

For transporting GRE-in-TCP packets, TCP is assigned a novel port number to indicate that the TCP tunnel payload is an GRE packet. For example, the value "6638" can be used to indicate that the payload of the TCP tunnel is an GRE packet. For standardization in IETF then the value can be reserved in TCP port number registry maintained by IANA. An implementation may use any unused alternate port number to indicate the payload as GRE packet. For example, a port number in TCP may be administratively configured across the routers participating in GRE overlays to indicate the payload as GRE packet. A server would listen on TCP port 6638 for incoming TCP connection requests for GRE-in-TCP.

Remaining fields in 2103 are to be set as per the configuration and dynamic parameters of the TCP connection.

Since TCP is a stream-oriented protocol, so the GRE packet is encapsulated by GCH 2104.

Figure 33:
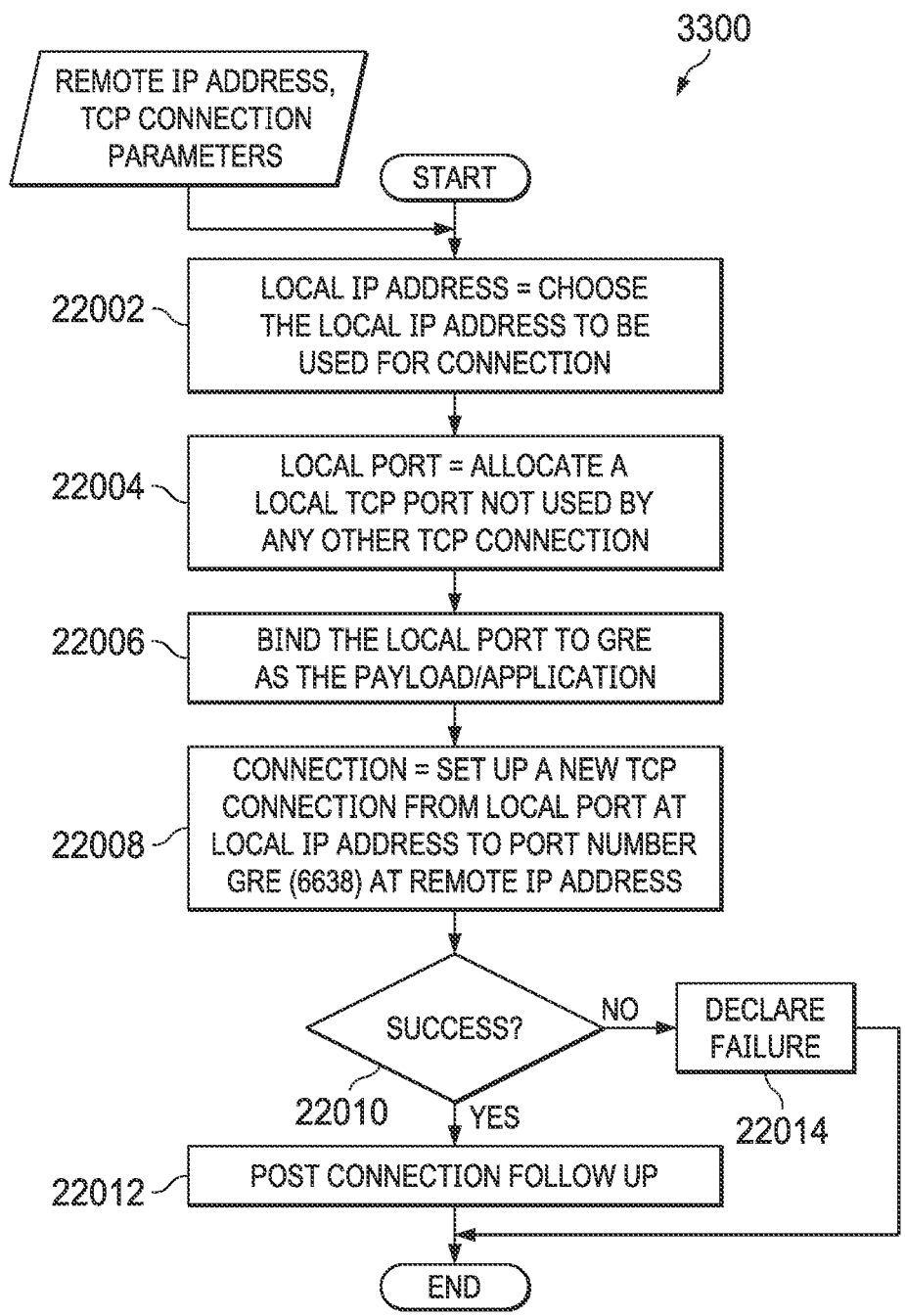
FIG. 33 is a flow diagram of a method of configuring a TCP connection forward GRE-in-TCP according to some embodiments.

FIG. 33 is a flow diagram of a method 3300 of configuring a TCP connection for GRE-in-TCP according to some embodiments. When a router discovers that a new TCP connection needs to be established to tunnel GRE packets, it first determines the IP address of the remote router to which the TCP connection is to be made. Then the router determines the following information about the new connection in addition to the IP address:

TCP Connection Parameters

Quality of Service (QoS) information.

The method 3300 starts at step 22002. Step 22002 chooses a configured local IP address that can be used for sending and receiving tunnel traffic. It proceeds to step 22004. Step 22004 allocates a local TCP port number to be used for the new connection, such that the number is not currently used by an existing TCP connection. Then it proceeds to step 22006. Step 22006 binds the local TCP port to GRE as its payload/application, and then proceeds to step 22008.

Step 22008 generates a TCP connect request [TCP] from the local port at the local IP address to port number GRE (6638) at the remote IP address. If the TCP connect request is rejected, then the router should act to limit unnecessary repetition attempts to establish the connection. For example, the router might wait 60 seconds before trying to re-establish the connection. It proceeds to step 22010. Step 22010 checks if the TCP connect request is accepted by remote router (means success). If success then proceeds to step 22012, else proceeds to step 22014. Step 22014 declares failure to configure the connection, and then the method 3300 terminates. Step 22012 performs post connection follow ups and then the method 3300 terminates.

Figure 34:
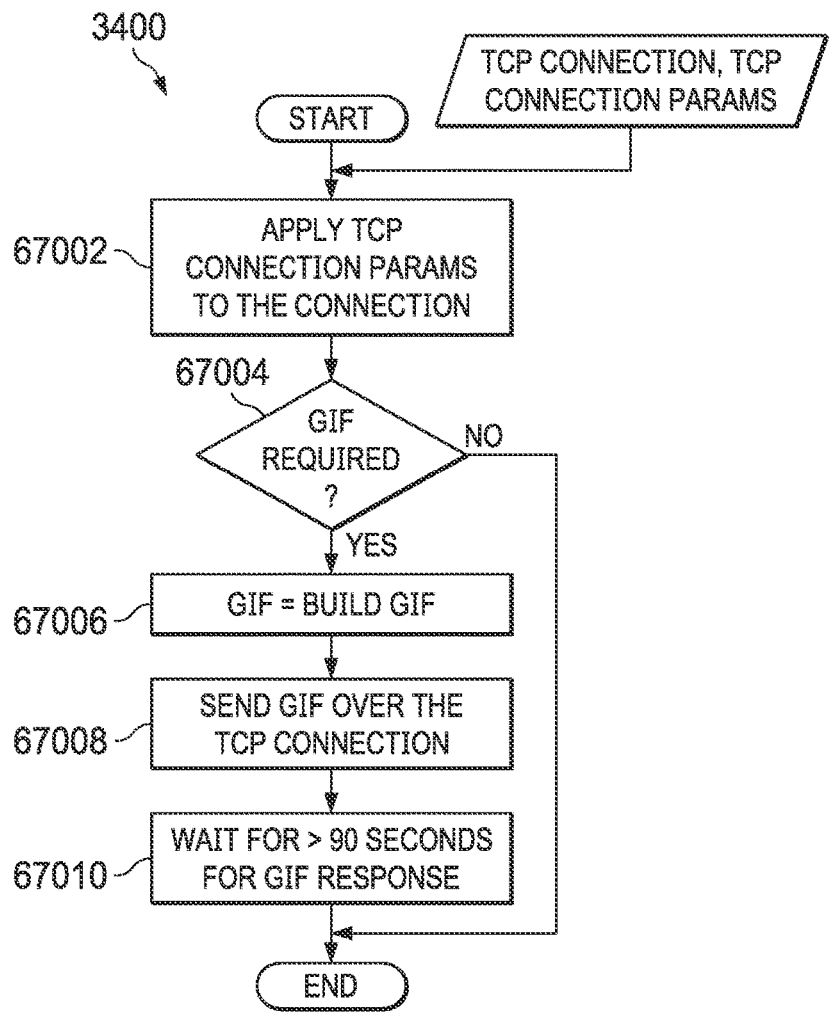
FIG. 34 is a flow diagram of a method of post connection follow up by initiating router for a TCP connection according to some embodiments.

FIG. 34 is a flow diagram of a method 3400 of post connection follow up by initiating router for a TCP connection according to some embodiments.

The inputs to the method are:

TCP Connection that is operational.

TCP Connection parameters

The method 3400 starts at step 67002. Step 67002 applies the input TCP connection parameters to the new connection and then proceeds to step 67004. Step 67004 checks if requirement of GIF is configured in the router. If yes, then proceeds to step 67006, else the method 3400 terminates.

Step 67006 builds a GIF and fills the necessary fields. It proceeds to step 67008. Step 67008 sends the GIF over the TCP connection and then proceeds to step 67010. Step 67010 waits for GIF response from peer router. It is recommended that an implementation wait for GIF response for at least 90 seconds. In order to wait, the router may start a timer for a duration within which it expects a GIF response and associates the timer with the TCP connection. After this step, the method 3400 terminates.

Determination of a received packet on the connection as GIF is made as part general processing of NVGRE overlay packets on the connection, as disclosed herein.

Figure 35:
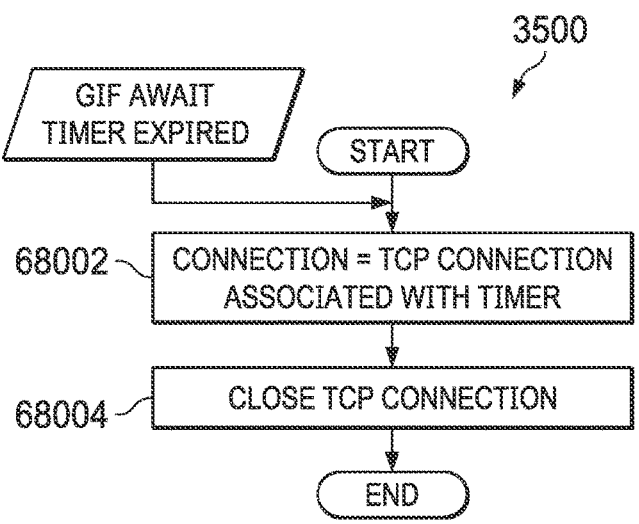
FIG. 35 is a flow diagram of a method of handling expiration of a GIF a wait timer by initiating router when the initiating router fails to receive a GIF response according to some embodiments.

FIG. 35 is a flow diagram the method 3500 of handling expiration of a GIF a wait timer by initiating router when the initiating router fails to receive a GIF response according to some embodiments.

The input to the method 3500 is the notification that GIF await timer expired. The method starts at step 68002. Step 68002 retrieves the TCP connection associated with the timer and then proceeds to step 68004. Step 68004 closes the TCP connection, and then the method 3500 terminates.

In order to provide efficient exchange of GRE-in-TCP packets, consideration of the following TCP Connection parameters is performed in some embodiments.

TCP Selective Acknowledgement Option

The Selective Acknowledgement option allows the receiver to acknowledge multiple lost packets in a single ACK, enabling faster recovery. A router MAY negotiate use of TCP SACK on a TCP connection for GRE and use it for faster recovery from lost packets and holes in TCP sequence number space.

TCP Window Scale Option

The TCP Window Scale option allows TCP window sizes larger than 16-bit limits to be advertised by the receiver. It is necessary to allow data in long fat networks to fill the available pipe. This also implies buffering on the TCP sender that matches the (bandwidth*delay) product of the TCP Connection. A router uses locally available mechanisms to set a window size that matches the available local buffer resources and the desired throughput.

Protection Against Sequence Number Wrap in some embodiments, a router implements protection against wrapped sequence numbers (PAWS). It is quite possible that within a single connection, TCP sequence numbers wrap within a timeout window.

TCP_NODELAY Option

A router should disable the Nagle Algorithm, e.g., by setting the TCP_NODELAY option in the TCP connection.

Figure 36:
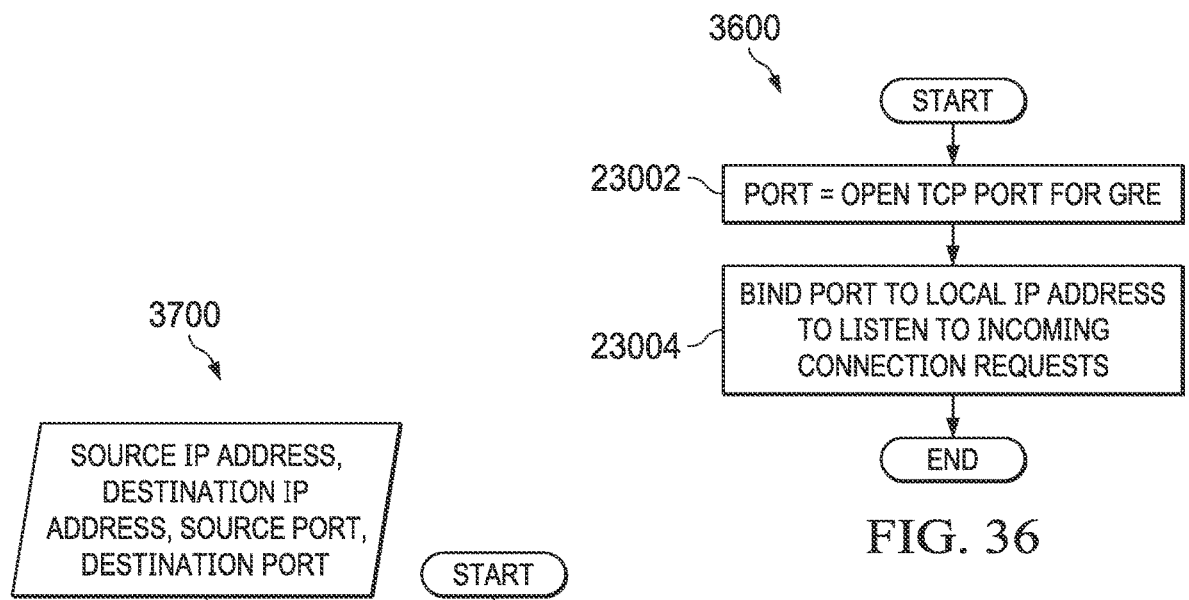
FIG. 36 is a flow diagram of a method of listening to incoming TCP connection request for a GRE-in-TCP connection according to some embodiments.

FIG. 36 is a flow diagram of a method 3600 to configure listener of incoming TCP connection requests for a GRE-in-TCP according to some embodiments. A router listens for new TCP Connection requests on the Well-Known Port for GRE (6638). A router may also accept and establish TCP Connections to a TCP port number other than the Well-Known Port, as configured by the network administrator for GRE.

The method 3600 begins at step 23002. Step 23003 opens the TCP port for GRE (e.g 6638), and then proceeds to step 23004. Step 23004 binds the port to the local IP address in the router and then starts listening to incoming connection requests to the port on the address. After step 23004, the method terminates.

Figure 37:
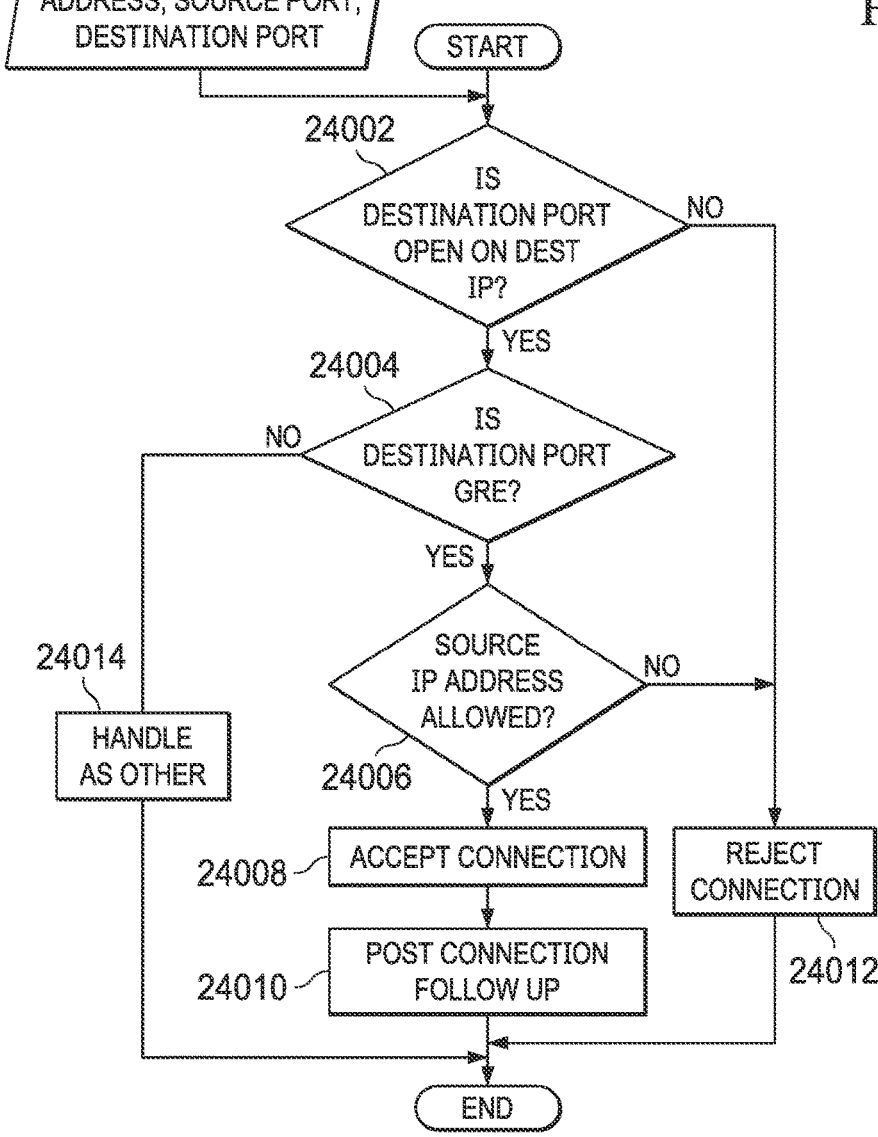
FIG. 37 is a flow diagram of a method for processing incoming TCP connection requests for GRE-in-TCP according to some embodiments.

FIG. 37 is a flow diagram of a method 3700 for processing incoming TCP connection requests for GRE-in-TCP according to some embodiments.

The input to the method is the connection request with the following parameters:
Source IP address, IP address of the remote router that sent the request
Destination IP address, a local IP address of this router.
Source Port, TCP port for the connection at the remote router.
Destination Port, TCP port at this router to which connection is attempted.

The method 3700 begins at step 24002. Step 24002 checks if the destination port is open in TCP in this router. If not open, then it proceeds to step 24012, else proceeds to step 24004. Step 24012 rejects the connection using appropriate TCP means, i.e ejection notification to remote router as per methods in TCP. The method terminates after step 24012.

Step 24004 checks if the TCP destination port is GRE (6638). If not then proceeds to step 24014, else proceeds to step 24006. Step 24014 handles the connection request as per the type associated with the port. After step 24014, the method 3700 terminates.

Step 24006 checks if a connection is allowed from the remote router, i.e from the source IP address. The factors that determine whether a router should allow an incoming connection is not discussed herein. For example, the router may employ a method to discover all potential remote routers that may participate in GRE tunneling with the router. If connection is not allowed then proceeds to step 24012, else proceeds to step 24008. Step 24012 rejects the connection using appropriate TCP means, i.e rejection notification to remote router as per methods in TCP. The method 3700 terminates after step 24012.

In Step 24008, the router accepts the TCP connection request. It means the state for the TCP connection is created with the key as the tuple {Source IP Address, Destination IP Address. Source port, Destination port}. It proceeds to step 24010. At step 24010, the router performs post connection follow ups and then the method 3700 terminates.

Step 24010 is implemented by a method that makes the router wait for GIF from peer router, if configured to receive a GIF. Determination of a received packet on the connection as GIF is made as part general processing of GRE packets on the connection, which is disclosed herein.

If router fails to receive a GIF within a predefined time period (i.e the timeout set at step 65004 expires), then the router executes the method in FIG. 35 so that handling is common in both initiating and receiving routers.

If two routers send simultaneous TCP connection requests to each other, then two TCP connections are formed. Connection setup proceeds as disclosed herein on both connections, and the steps described therein properly result in the formation of two TCP tunnels between the routers. This is not an error.

Figure 38:
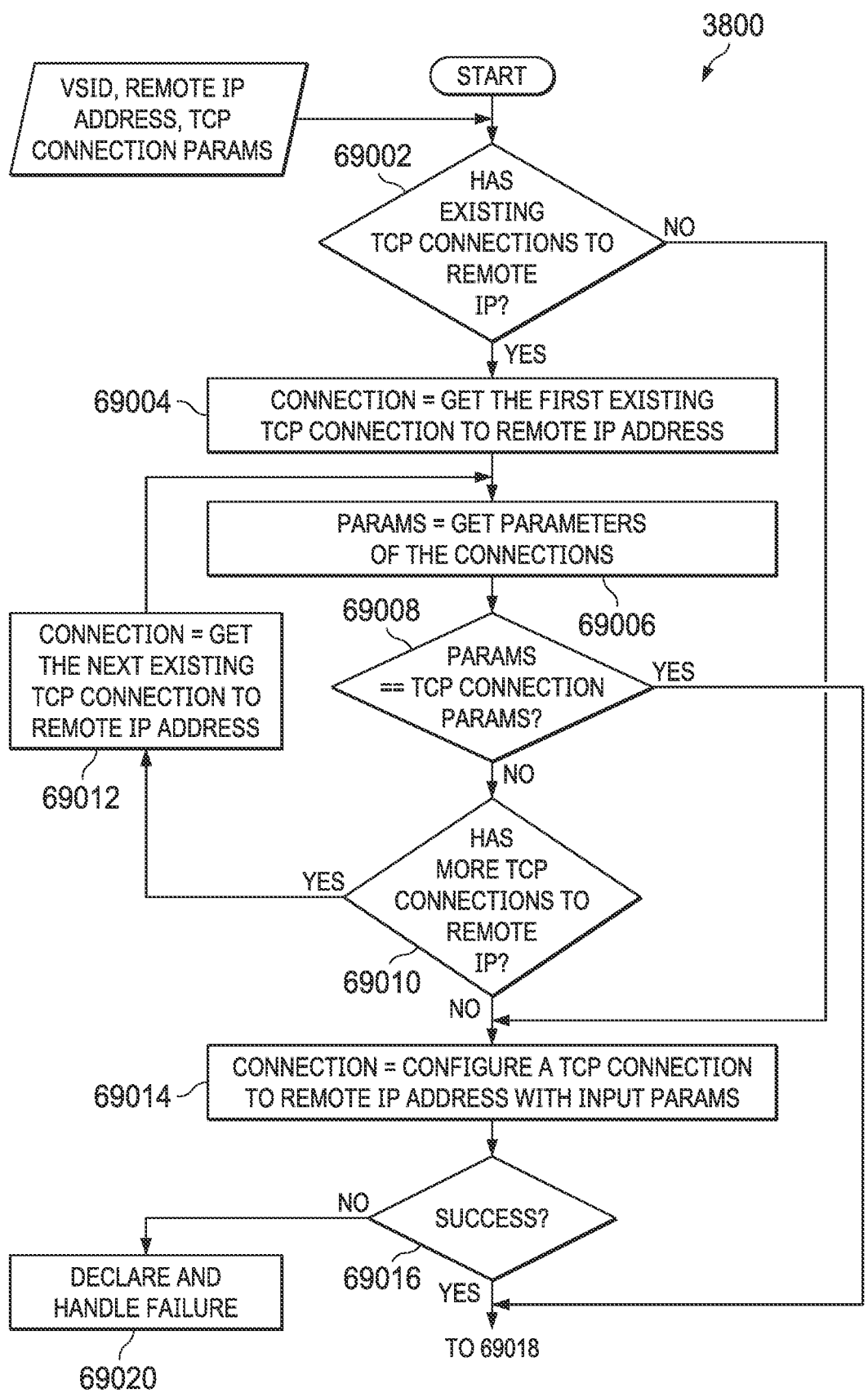
FIG. 38 is a flow diagram of a first portion of a method of configuring a GRE-in-TCP based NVGRE overlay according to some embodiments.
Figure 39:
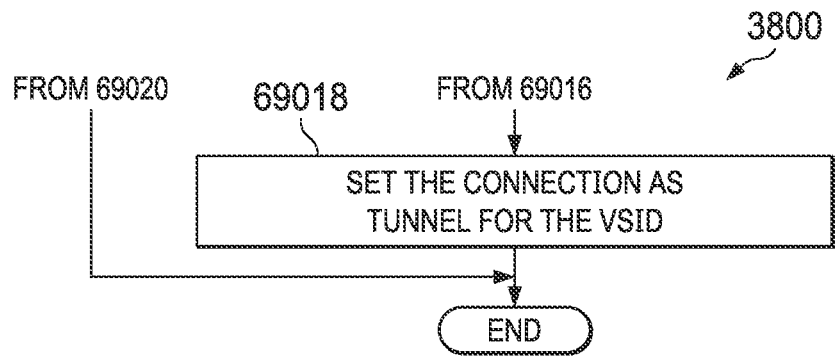
FIG. 39 is a flow diagram of a second portion of the method according to some embodiments.

When a router needs to setup a NVGRE overlay using GRE-in-TCP to a remote router, it determines the IP address of the remote router to which the TCP connection needs to be made. Then it determines the following information about the required connection
TCP connection parameters
Quality of service information FIG. 38 is a flow diagram of a first portion of a method 3800 of configuring a GRE-in-TCP based NVGRE overlay according to some embodiments and FIG. 39 is a flow diagram of a second portion of the method 3900 according to some embodiments.

The inputs to the method are
VSID of the NVGRE Overlay.
An IP address in the remote router of the Overlay.
TCP connection parameters as required by the overlay The method 3800 starts at step 69002. Step 69002 checks if there are existing TCP connections to the remote router for tunneling GRE packets. If none, then proceeds to step 69014, else proceeds to step 69004.

Step 69004 retrieves the first TCP connection to the remote router, which is setup for tunneling GRE packets. It proceeds to step 69006. Step 69006 retrieves the TCP connection parameters of the connection, and then proceeds to step 69008. Step 69008 checks if the parameters requested by the overlay matches to the parameters of the connection. If matches then proceeds to step 69018, else proceeds to step 69010.

Step 69010 checks if there are more existing TCP connections to the remote router for tunneling GRE packets. If has more connections then proceeds to step 69012, else proceeds to step 69014. Step 69012 gets the next TCP connection to remote router that has been set-up for tunneling GRE packets, and then returns to step 69006 to repeat subsequent steps for the next connection.

Step 69014 is reached when a new TCP connection is required. Step 69014 configures a new TCP connection to the remote router, to be used for tunneling GRE packets. The TCP connection is configured with the input TCP connection parameters. Step 69014 is implemented as disclosed herein. Then it proceeds to step 69016. Step 69016 checks if the connection has been set-up successfully. If not then proceeds to step 69020, else proceeds to step 69018. Step 69020 declares and handles failure to configure the reliable GRE tunnel. Step 69018 sets the TCP connection as the tunnel associated with the VSID. After step 69018, the method 3800 terminates.

Figure 40:
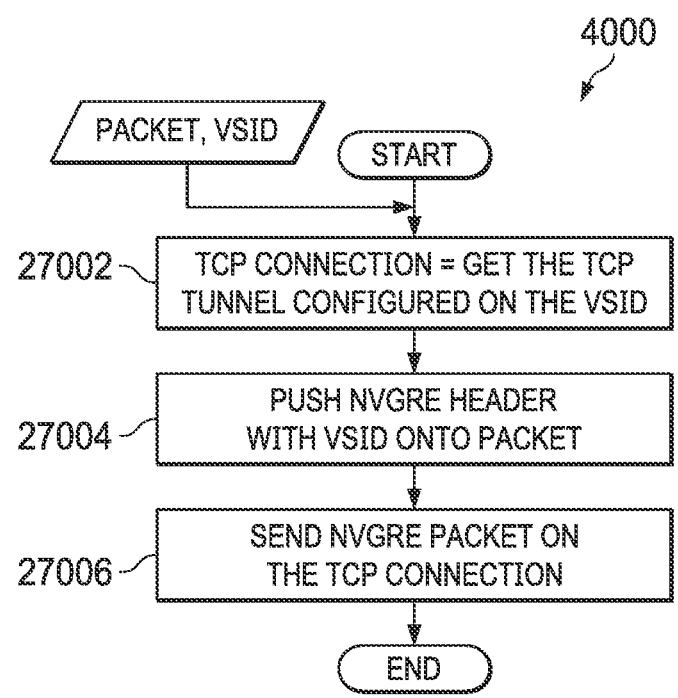
FIG. 40 is a flow diagram of a method of transmitting a packet for an NVGRE overlay as GRE-in-TCP according to some embodiments.

FIG. 40 is a flow diagram of a method 4000 of transmitting a packet for an NVGRE overlay as GRE-in-TCP according to some embodiments. Some embodiments of the method 4000 are implemented in a router.

The inputs to the method are:
The packet to be transmitted (e.g an FC packet as described in section 3.2).
VSID that identifies the NVGRE overlay.

The method 4000 starts at step 27002. Step 27002 retrieves the TCP tunnel configured for the VSID, which is the reliable transport layer connection. It proceeds to step 27004. Step 27004 encodes the VSID into NVGRE header and pushes the NVGRE header onto the packet, and then proceeds to step 27006. Step 27006 sends the NVGRE packet on the TCP connection. After step 27006, the method 4000 terminates.

Figure 41:
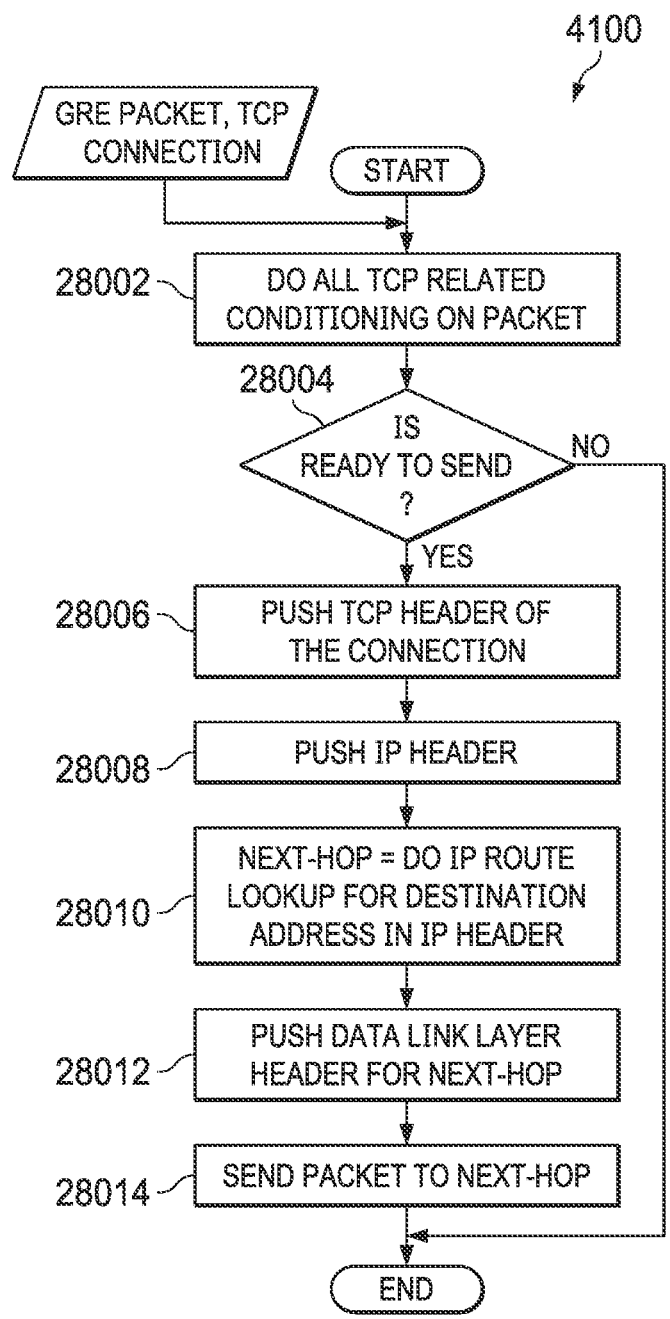
FIG. 41 is a flow diagram of a method of transmitting an NVGRE packet on a TCP connection for GRE-in-TCP communication according to some embodiments.

FIG. 41 is a flow diagram of a method 4100 of transmitting a GRE packet on a TCP connection for GRE-in-TCP communication according to some embodiments. Method 4100 may be used to implement step 27006 in FIG. 27.

The inputs to the method are:
GRE packet to be transmitted
TCP connection on which to send the GRE packet The method 4100 starts at step 28002. Step 28002 performs conditioning of the GRE packet—which means that TCP layer prepares the packet as per the connection status, such as:
If the packet needs to be segmented further, then the packet is segregated into multiple TCP segments.
Applies TCP congestion control, flow control on the segments as necessary.

Then the method 4100 proceeds to step 28004. Step 28004 checks if the one or more TCP segments of the packet are ready to be sent. For example, the TCP segments may not be sent immediately due to congestion, flow control etc. If not ready then the TCP segments will be sent later when the congestion is cleared, so the procedure terminates for now. If ready to be sent, then proceeds to step 28006.

Step 28006 pushes the TCP header to the segment(s). The Source Port and Destination Port fields in the TCP header are filled as per the connection parameters. Then it proceeds to step 28008.

Step 28008 pushes the IP header onto the packet. The source and destination addresses in the IP header are filled as per the local and remote IP addresses of the TCP connection (the addresses are provided by step 28006). Protocol field (if IPv4 Header) or the Next Header field (if IPv6 Header) is set to 6 to indicate the payload as TCP. Then it proceeds to step 28010.

Step 28010 performs IP route table lookup for the destination address in the IP Header, which results in the next-hop for the packet. It proceeds to step 28012. Step 28012 pushes the Data Link Layer Header onto the packet which is required to send the packet on the link to the next-hop. Then it proceeds to step 28014. Step 28014 sends the packet on the wire to the next-hop, and then the method 4100 terminates.

Figure 42:
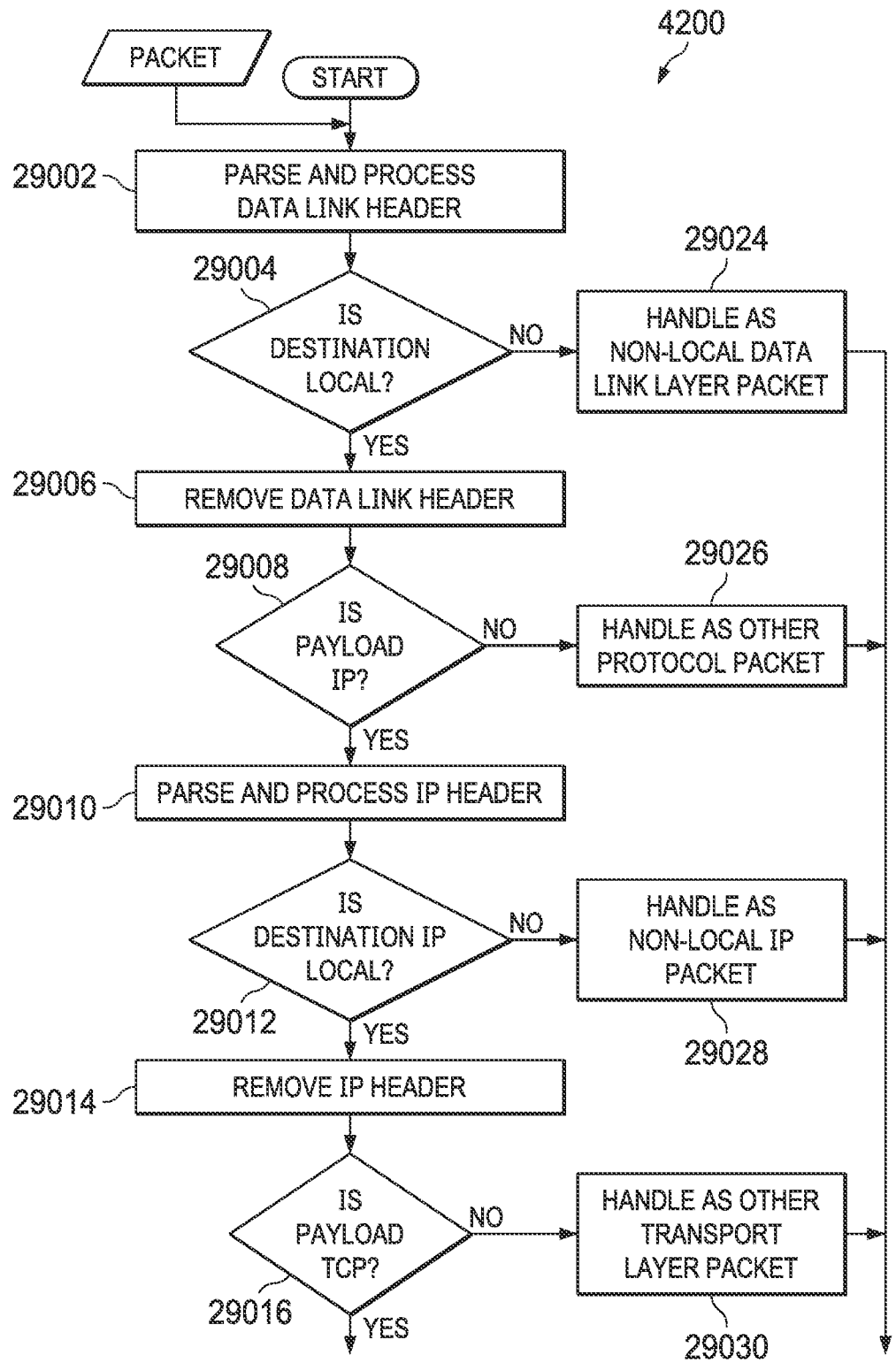
FIG. 42 is a flow diagram of a first portion of a method of receiving and processing GRE-in-TCP packets received by a router according to some embodiments.
Figure 43:
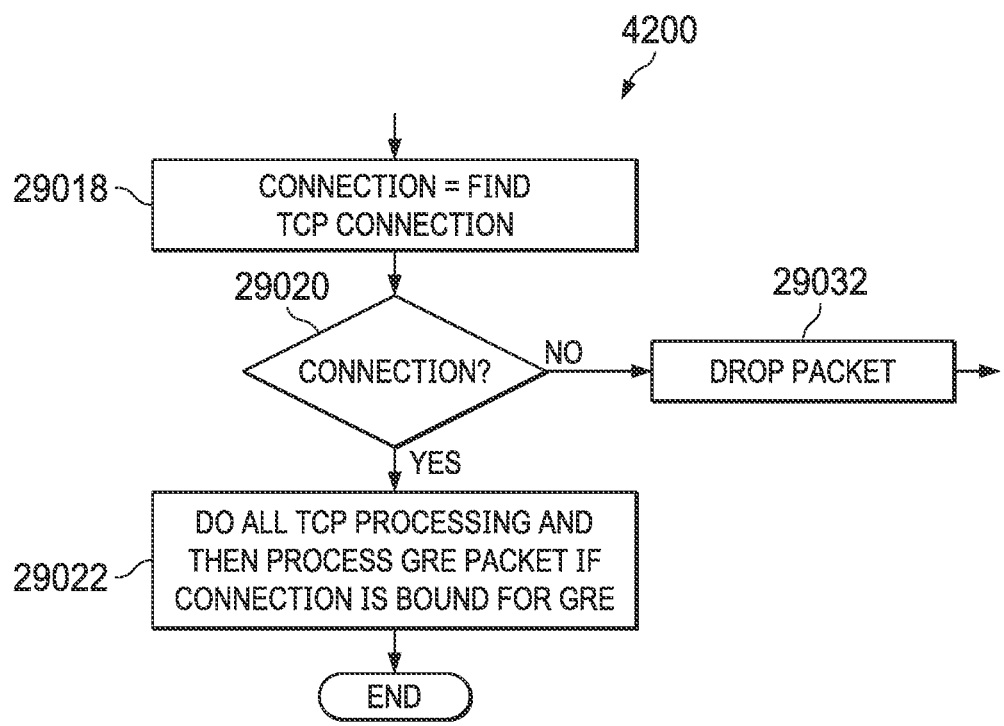
FIG. 43 is a flow diagram of a second portion of the method of receiving and processing the GRE-in-TCP packets according to some embodiments.

FIG. 42 is a flow diagram of a first portion of a method 4200 of receiving and processing GRE-in-TCP packets received by a router according to some embodiments and FIG. 43 is a flow diagram of a second portion of the method 4200 of receiving and processing the GRE-in-TCP packets according to some embodiments.

The input to the method 4200 is a packet received on the wire. The method 4200 starts at step 29002. Step 29002 parses and processes the data link header at the top of the packet, and then proceeds to step 29004. Step 29004 checks if data link layer determined at step 29002 the packet to be local, means this router is the termination point of the data link on which the packet arrived. For example, if the data link header is an Ethernet header and if the destination MAC address in the Ethernet header is local to the router then the Ethernet link terminates on the router. If the packet is local at the data link layer then this step proceeds to step 29006, else proceeds to step 29024. Step 29024 performs required handling of the packet at the data link layer as a non-local packet, which may result in forwarding of the packet further at the data link layer. After step 29024, the method 4200 terminates.

Step 29006 removes the data link header from the packet as the router is the end of the data link. It proceeds to step 29008. Step 29008 checks if the payload indicated by the data link header is IP. For example, if data link header is an Ethernet header then its Ethertype field indicates the payload type. If the Ethernet header has VLAN tags, then the Ethertype field in the last VLAN tag indicates the payload type. If the payload is IP, then proceeds to step 29010, else proceeds to step 29026. Step 29026 handles the packet as non-IP packet and then the method 4200 terminates.

Step 29010 processes the IP packet in the IP layer based on its IP header. For example, the destination address of the IP header is looked up in IP route table to make a forwarding decision on the IP packet etc. Then it proceeds to step 29012. Step 29012 checks if the destination address is local, e.g IP route table lookup matched destination address as a locally configured IP address in router. If not local, then proceeds to step 29028, else proceeds to step 29014. Step 29028 handles the packet as non-local IP packet, such as forwarding to the next-hop associated with the matching route entry from the IP route table lookup etc. After step 29028, the method 4200 terminates.

Step 29014 removes the IP header from the IP packet, as it is a local IP packet and then proceeds to step 29016. Step 29016 checks if the packet is a TCP segment, i.e if IP header was IPv4 then if protocol field in the IPv4 header was set to 6 (TCP) or if was IPv6 and then if the next-header field in the IPv6 header was set to 6 (TCP). If not TCP segment, then proceeds to 29030, else proceeds to step 29018. Step 29030 handles the packet for the respective IP protocol type and then the method 4200 terminates.

Step 29018 finds the TCP connection associated with the TCP segment based on source and destination IP addresses in the IP header (the addresses were passed along the flow since the removal of the IP header in step 29014) and, source and destination ports in the TCP header.

The method 4200 proceeds to step 29020. Step 29020 checks if a matching TCP connection is found. If no matching connection then proceeds to step 29032, else proceeds to step 29022. Step 29032 drops the packet as erroneous packet and then the method 4200 terminates.

Step 29022 performs all TCP layer processing on the TCP segment and if the TCP connection is bound to GRE then processes GRE packets from the byte stream received in the connection. After this step, the method 4200 terminates.

Figure 44:
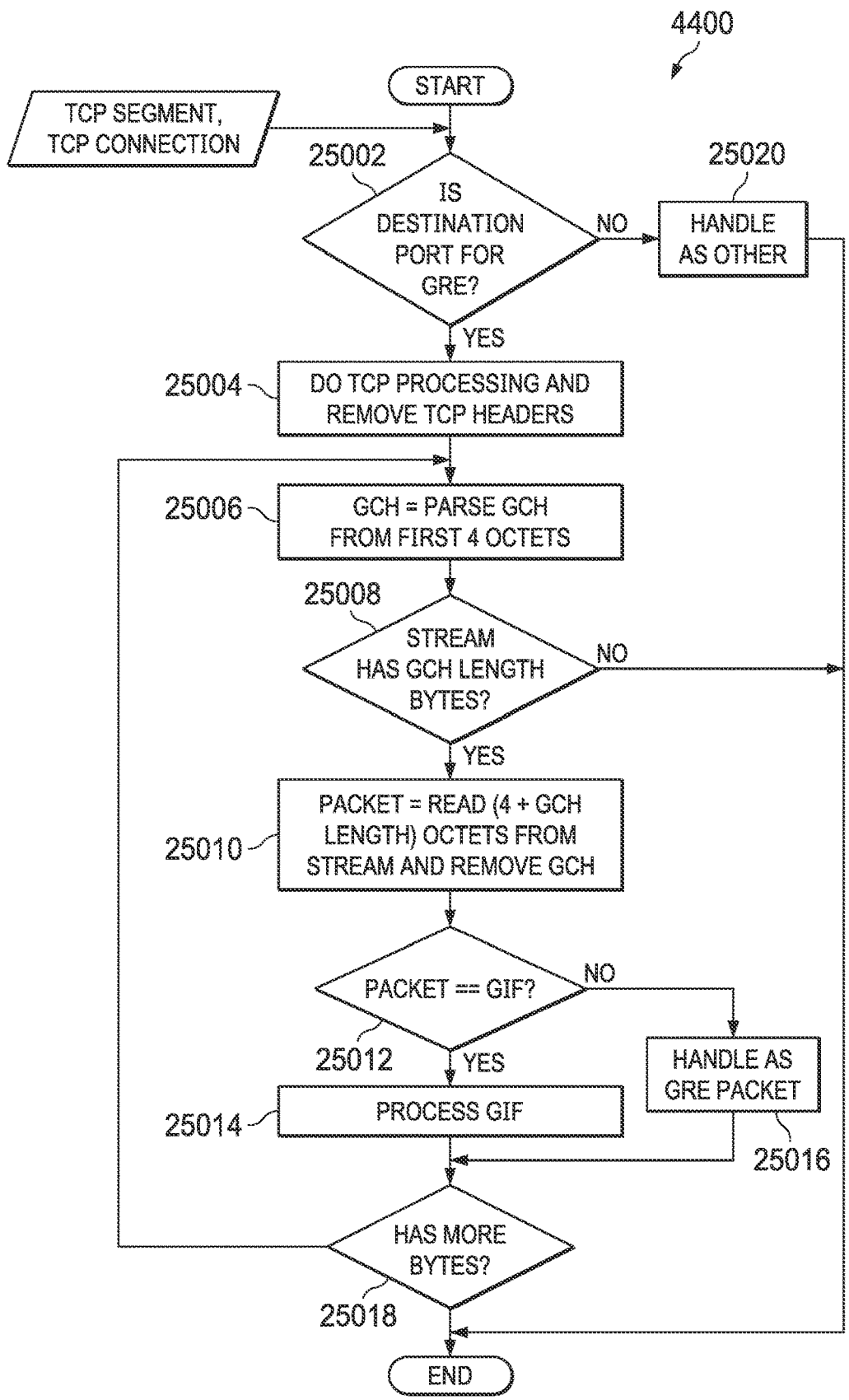
FIG. 44 is a flow diagram of a method of processing GRE-in-TCP packets from a byte stream or TCP segment of a TCP connection according to some embodiments.

FIG. 44 is a flow diagram of a method 4400 of processing GRE-in-TCP packets from a byte stream or TCP segment of a TCP connection according to some embodiments. Method 4400 may be used to implement step 29022 in FIG. 43.

The inputs to the method 4400 are:
A TCP segment received on a TCP connection, i.e received by the TCP layer of the router with TCP Header at the top. Note that TCP is stream-byte oriented protocol, so the bytes of a whole packet may not arrive together in the connection, i.e chunks of the packet may arrive on multiple TCP segments.
The TCP Connection, which is indicated by the tuple {Source IP Address in IP Header, Destination IP Address in IP Header, Source Port in TCP Header, Destination Port in TCP Header}.

The method 4400 begins at step 25002. Step 25002 checks if the Destination port of the TCP connection is bound to GRE. If not GRE then proceeds to step 25020, else proceeds to step 25004. Step 25020 handles the TCP segment for non-GRE applications using state-of-the-art methods.

Step 25004 performs all required TCP related processing on the TCP segment using state-of-the-art methods. For example, if this is not the next TCP segment expected by the connection then queues the segment internally till all preceding segments are received and processed, sends ACKs for the processed segments etc. For simplicity, it is assumed here that the input TCP segment is the next segment expected by the connection etc. TCP header is removed from the segment and its payload is appended to the received byte stream. Then it proceeds to step 25006.

Step 25006 parses the first 4 octet of the received stream as GCH, and then proceeds to step 25008. Step 25008 checks if the received stream at least has the number of octets specified in the length field in the GCH, i.e at least has the whole of the next GRE packet. If the stream does not have whole packet then the method terminates, else proceeds to step 25010.

Step 25010 pulls from the received stream the number of octets specified in the length field of the GCH plus 4 octets, that constitutes the GRE packet encapsulated by GCH. It them removes the GCH to generate the GRE packet. Then it proceeds to step 25012.

Step 25012 checks if the packet is GIF. If yes, then proceeds to step 25014, else proceeds to step 25016. Step 25016 handles the packet as GRE packet and proceeds to step 25018.

Step 25014 process the GIF and then proceeds to step 25018.

Step 25018 checks if there are more bytes to read in the TCP segment. If yes, then returns to step 25006 to process the next GRE packet in its payload, else the method terminates.

Intermediate routers, upon receiving these TCP encapsulated packets, could load balance these packets across multiple paths (next-hops) based on the hash of the five-tuple (source IP address, destination IP address, source port, destination port, and protocol) of TCP packets. Since all GRE packets multiplexed on a TCP tunnel shares the same five-tuple, so packets across various contexts cannot be load balanced. For example, all NVGRE overlays multiplexed on a TCP tunnel shares the same five-tuple, so packets across the overlays cannot be load balanced.

If load balancing is desirable, then it is recommended to use Multi-path TCP as the reliable transport layer. MP-TCP is an ongoing effort of the Internet Engineering Task Force's (IETF) Multipath TCP working group, that aims at allowing a Transmission Control Protocol (TCP) connection to use multiple paths to maximize resource usage and increase redundancy. Basically, it uses multiple IP addresses at both ends to set-up multiple TCP sessions underneath, which are termed as sub-flows. The application (e.g NVGRE overlays) is agnostic of the sub-flows and thinks it is still interacting with regular TCP. In January 2013, the IETF published the Multipath specification as an Experimental standard.

In some embodiments, SCTP (Stream Control Transmission Protocol) is used as the reliable transport layer for tunnelling of GRE packets. SCTP is a computer networking communications protocol which operates at the transport layer and serves a role similar to TCP. SCTP is standardized by IETF.

SCTP is characterized as message-oriented, meaning it transports a sequence of messages (each being a group of bytes), rather than transporting an unbroken stream of bytes as does by TCP. As in UDP, in SCTP a sender sends a message in one operation, and that exact message is passed to the receiving application process in one operation. In contrast, TCP is a stream-oriented protocol, transporting streams of bytes reliably and in order.

SCTP applications submit their data to be transmitted in messages (groups of bytes) to the SCTP transport layer. SCTP places messages and control information into separate chunks (data chunks and control chunks), each identified by a chunk header. SCTP can fragment a message into a number of data chunks, but each data chunk contains data from only one message. SCTP bundles the chunks into SCTP packets. The SCTP packet, which is submitted to the IP layer, consists of a packet header, SCTP control chunks (when necessary), followed by SCTP data chunks (when available).

In SCTP, a connection between two endpoints is referred as "association", so this standard terminology is used throughout this disclosure. The term "stream" in SCTP refers to the capability of SCTP to transmit several independent streams of the application in parallel, for example transmitting web page images together with the web page text. In essence, multi-streaming capability of SCTP involves bundling several independent data streams within an application into a single SCTP connection. Independent streams of chunks can be bundled together in a single SCTP message wherein the payload of a stream can be packed into on one or more data chunks in the message. Each data chunk is encoded with a Stream Identifier (ID) based on which the stream of its payload is identified.

In SCTP, an endpoint can use multiple IP addresses which enables spraying of SCTP packets across multiple available paths between the endpoints.

Figure 45:
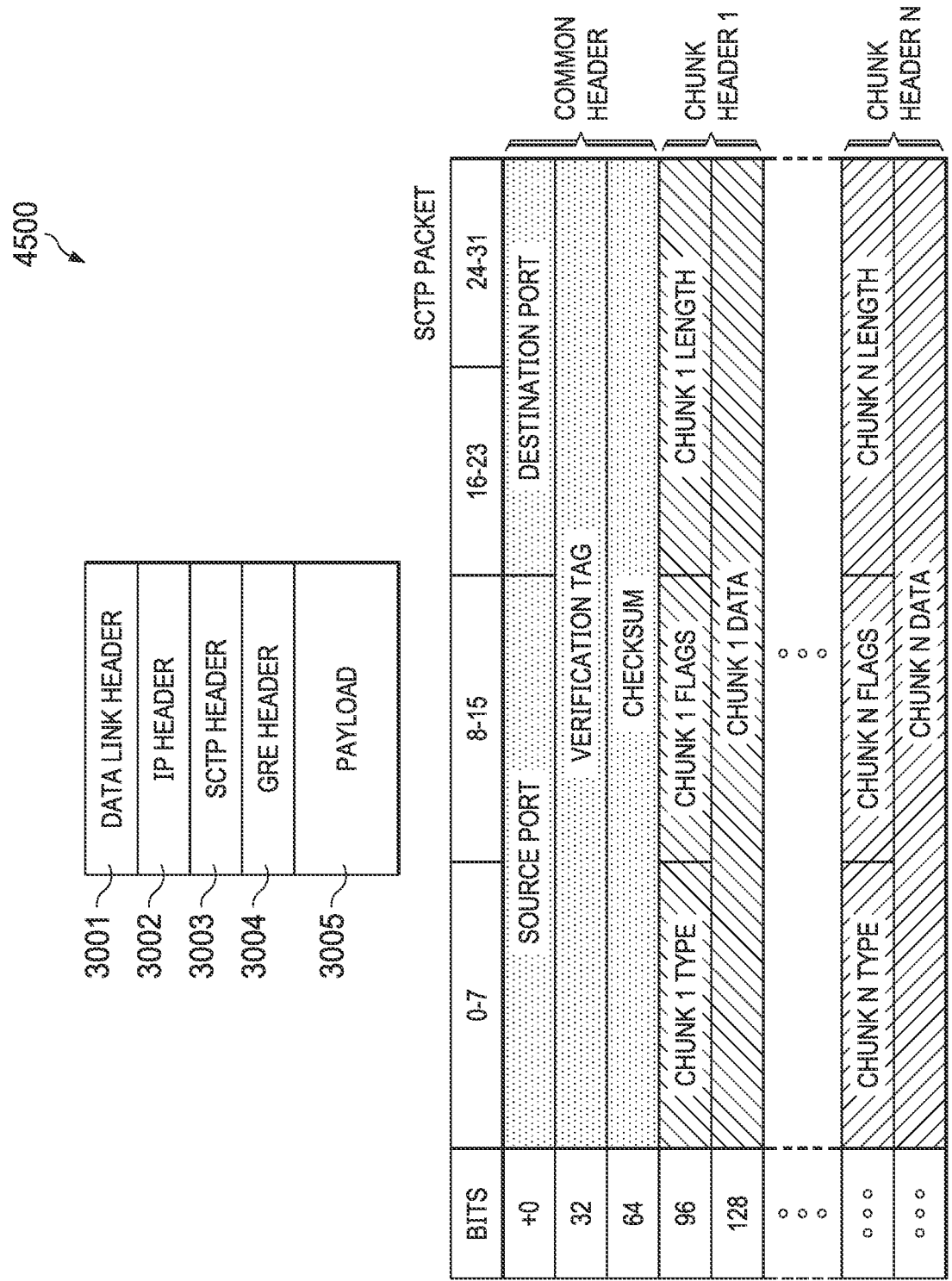
FIG. 45 is a block diagram of a packet including that is used for GRE-in-SCTP encapsulation according to some embodiments.

FIG. 45 is a block diagram of a packet 4500 that is used for GRE-in-SCTP encapsulation according to some embodiments.

Semantics of headers 3001, 3002, 3004 and payload 3005 are same as disclosed herein for other reliable transport layer protocols. Since SCTP is a datagram-oriented protocol, there is no need to encapsulate GRE payloads by GCH. Consequently, GCH is not part of the stack shown in FIG. 45.

Header 3003 is the SCTP Header for the SCTP association used by the GRE packets. The SCTP packet is described in conceptual form only. There is no single SCTP Header, rather there are several SCTP specific headers interspersed within the SCTP packet. Headers 3003-3005 comprise the "SCTP Packet" for reliable tunneling of GRE packets.

In general, a SCTP packet consists of two basic sections:
  The Common Header, which occupies the first 12 bytes and is highlighted in blue.
  Stack of chunks, which occupy the remaining portion of the packet including a first chunk and the last of N chunks (Chunk N).

The Common Header consists of Source Port, Destination Port, Verification Tag and Checksum fields. Source Port is the sender's port number which is used by the receiver in combination with the source IP address to identify the SCTP association to which this SCTP packet belongs to. Destination port is the receiver's port number to demultiplex the STCP packet to the correct application of SCTP (i.e the upper layer of SCRP). Verification Tag is negotiated between the peers during the set-up of SCTP association to validate the sender of the packet. Checksum uses the CRC32 algorithm on the SCTP packet for data integrity.

Figure 46:
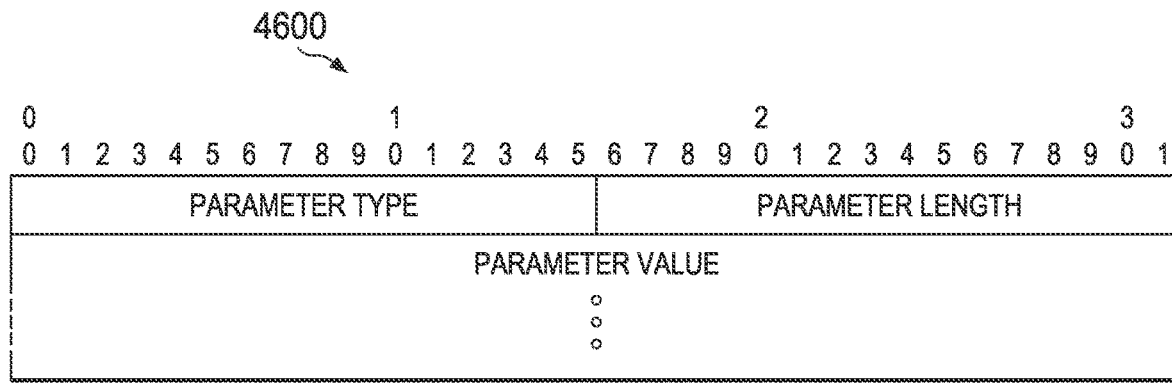
FIG. 46 is an SCTP control chunk header according to some embodiments.

Each chunk starts with a Chunk Header that consists of with a one byte type identifier, with 15 chunk types defined by [SCTP], and at least 5 more defined by additional extensions, Eight flag bits, a two-byte length field and the data compose the remainder of the chunk. The chunk types can be broadly classified into Control Chunks and Data Chunks FIG. 46 is an SCTP control chunk header 4600 according to some embodiments. A Control Chunk 4600 carries the control information related to the SCTP packet and it follows the TLV (Type Length Value) format. The Parameter Type field indicates the type of control information and the corresponding lengths and values.

Figure 47:
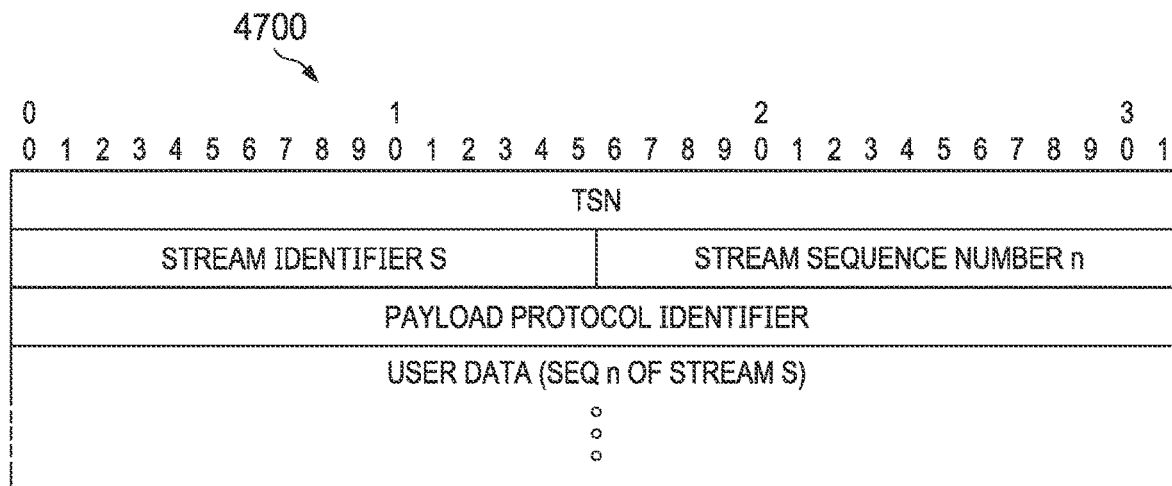
FIG. 47 is an SCTP data chunk header according to some embodiments.

FIG. 47 is an SCTP data chunk header 4700 according to some embodiments. The Data Chunk carries the actual data from the application (upper layer) that uses the SCTP. Ability to carry multiple chunks in a single SCTP packet enables multiplexing of multiple streams within the user application. Payload from a stream can be sent in one or more chunks in a SCTP packet. The key field in the Data Chunk Header is the Stream Identifier which is used to demultiplex the data chunks in a SCTP packet to the streams in the user application.

Some embodiments of the techniques disclosed herein use the following definitions in SCTP for reliable delivery tunneling of GRE packets on SCTP:

SCTP requires a novel port number to indicate that the SCTP tunnel payload is a GRE packet. SCTP operates in client-server paradigm. The server would listen on the novel port number for incoming associations requests for GRE-in-SCTP. This disclosure defines the value 6642 (currently unassigned in SCTP port numbers registry by IANA) to be used to indicate that the payload of the SCTP tunnel is a GRE packet. If the techniques disclosed herein are standardized in IETF then the value needs to be reserved in Service Name and Transport Protocol Port Number Registry maintained by IANA. An implementation may use any unused alternate port number to indicate the payload as GRE packet. For example, a port number in SCTP may be administratively configured across the routers participating in GRE tunneling to indicate the payload as GRE packet.

Each GRE tunnel user over an SCTP association may be assigned a unique stream identifier (ID) by a router. In that case, all packets from a GRE tunnel user may be sent as an independent data chunk within an SCTP packet. That means packets from multiple GRE tunnel users can be multiplexed on a single SCTP packet. Since each GRE tunnel user is independent of each other, so configuring each user as independent stream also eliminates head-of-the-line (HOL) blocking among users that share the SCTP association. For example, this is particularly pertinent for reliable NVGRE overlays. Since each NVGRE overlay is independent of each other, so configuring each overlay as independent stream also eliminates head-of-the-line (HOL) blocking among overlays that share the SCTP association Note that Stream ID space is local to a router, so each router can independently allocate an unused Stream ID from its local space. The router that sends an NVGRE overlay packet over the SCTP association uses its assigned Stream ID in corresponding data chunks in SCTP packet.

For a receiving router, there is no correlation between the Stream ID of a received data chunk to corresponding NVGRE overlay since the router identifies the overlay based on the VSID of the NVGRE header of the packet in the payload of data chunk.

Stream ID value 0 is not be used to transport packets for an NVGRE overlay. It should be reserved by both routers for bulk management of all NVGRE overlays multiplexed on the SCTP association. One usage of bulk management is the GIF. The GIF is sent in a data chunk with Stream ID 0.

When a router discovers that a new SCTP association needs to be established to a remote router to tunnel GRE packets, it first determines an IP address of the remote router to which the SCTP connection is to be made. Then the router determines the following information in addition to the IP address:

Quality of Service (QoS) information. The QoS information is used for appropriate QoS markings in the IP header that encapsulates an SCTP packet.

Figure 48:
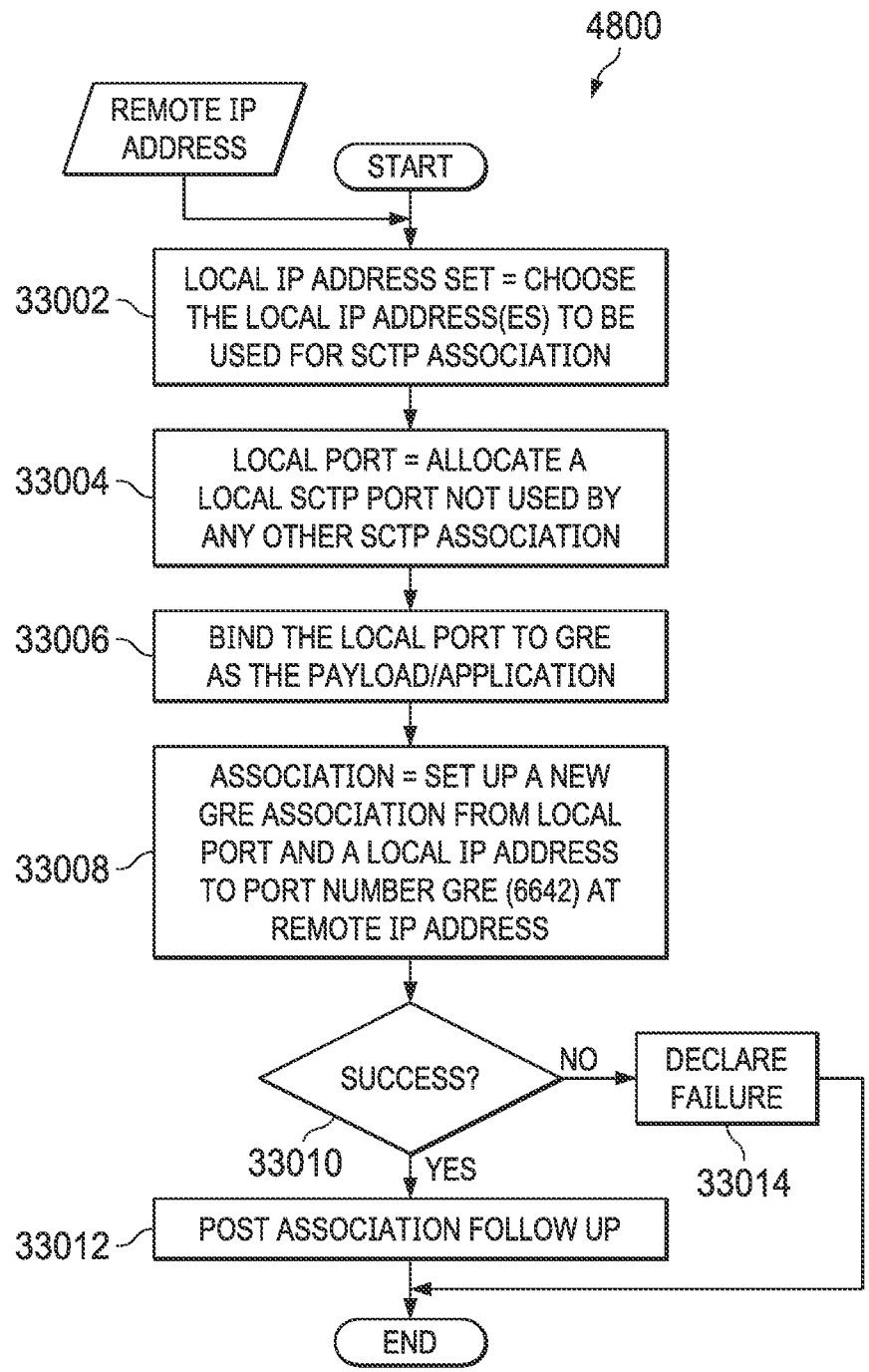
FIG. 48 is a flow diagram of a method of configuring an SCTP association for GRE-in-SCTP according to some embodiments.

FIG. 48 is a flow diagram of a method 4800 of configuring an SCTP association for GRE-in-SCTP according to some embodiments.

The method 4800 starts at step 33002. Step 33002 chooses one or more configured local IP addresses that can be used for sending and receiving tunnel traffic. It proceeds to step 33004. Step 33004 allocates a local SCTP port number to be used for the new association, such that the number is not currently used by an existing SCTP association. Then it proceeds to step 33006. Step 33006 binds the local SCTP port to GRE as its payload/application, and then proceeds to step 33008.

Step 33008 generates a SCTP association request from the local port and one of the local IP addresses to port number GRE (6642) at the remote IP address. The SCTP association request is a message that carries an INIT chunk [SCTP]. The INIT chunk primarily contains maximum number of inbound streams and outbound streams for the connection, and the list of local IP addresses to be used for the connection. The maximum number of inbound or outbound streams is set to the maximum number of GRE tunnel user (e.g NVGRE overlays) to be tunneled over the SCTP connection. If the maximum number of GRE tunnel users to be supported in not known in priori then both the number of inbound streams field and number of outbound streams field should be set to the maximum allowable value, i.e 65535 (because fields are of 16-bits size).

If the SCTP association request is rejected by remote router, then the router should act to limit unnecessary repetition attempts to establish an association. For example, the router might wait 60 seconds before trying to re-establish the association. It proceeds to step 33010. Step 33010 checks if the SCTP association request is accepted by remote router (means success). If success, this router would receive INIT ACK [SCTP] from remote router. If success then proceeds to step 33012, else proceeds to step 33014. Step 33014 declares failure to configure the association, and then the method terminates. Step 33012 performs the post association follow ups as necessary. After step 33012, the method 4800 terminates.

Figure 49:
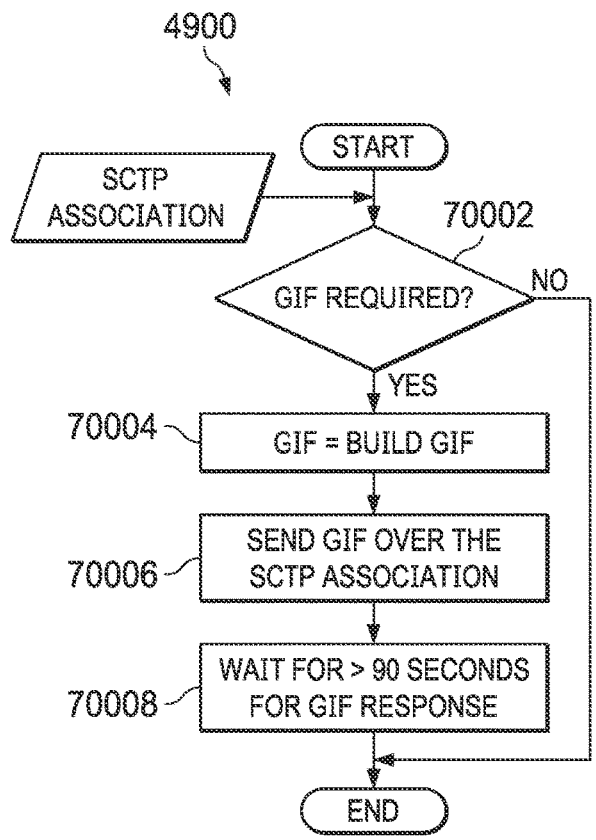
FIG. 49 is a flow diagram of a method of performing post connection follow-up by initiating router according to some embodiments.

FIG. 49 is a flow diagram of a method 4900 of performing post connection follow-up by initiating router according to some embodiments. Method 4900 may be used to implement step 33012 in FIG. 33.

The input to the method 4900 is that SCTP association that has become operational.

The method 4900 starts at step 70002. Step 70002 checks if requirement of GIF is configured in the router. If yes, then proceeds to step 70004, else the method terminates.

Step 70004 builds a GIF and fills the necessary fields. This step is implemented as disclosed herein. The method 4900 proceeds to step 70006. Step 70006 sends the GIF over the SCTP association. The GIF is sent as payload of a data chunk in a SCTP packet, wherein the data chunk is encoded with Stream ID 0. Then it proceeds to step 70008. Step 70008 waits for GIF response from peer router. It is recommended that an implementation wait for GIF response for at least 90 seconds. In order to wait, the router may start a timer for a duration within which it expects a GIF response and associates the timer with the SCTP association. After this step, the method 4900 terminates.

When the initiating router receives a GIF response from the peer router, then it executes embodiments of the methods disclosed herein. Determination of a received packet on the connection as GIF is made as part general processing of GRE packets on the association, as disclosed herein.

Figure 50:
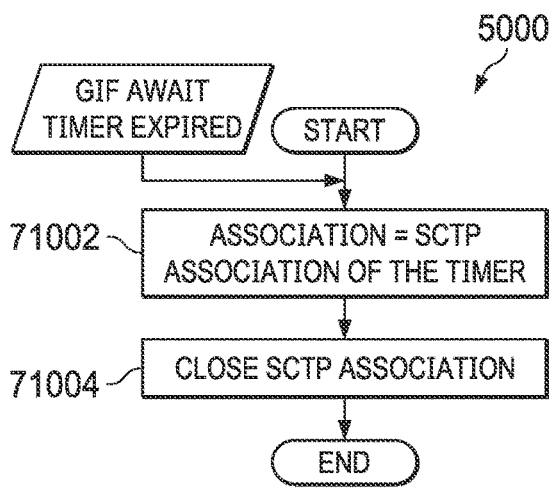
FIG. 50 is a flow diagram of a method of handling expiration of a GIF wait timer by initiating router according to some embodiments.

FIG. 50 is a flow diagram of a method 5000 of handling expiration of a GIF wait timer by initiating router according to some embodiments.

The input to the method 5000 is the notification that GIF await timer expired. The method starts at step 71002. Step 71002 retrieves the SCTP association associated with the timer and then proceeds to step 71004. Step 71004 closes the SCTP association, and then the method 5000 terminates.

Some embodiments of the router listen for new SCTP association requests on the SCTP well-known Port assigned for GRE (6642). A router may also accept and establish SCTP associations to a SCTP port number other than the well-known port, as configured by the network administrator for GRE.

Figure 51:
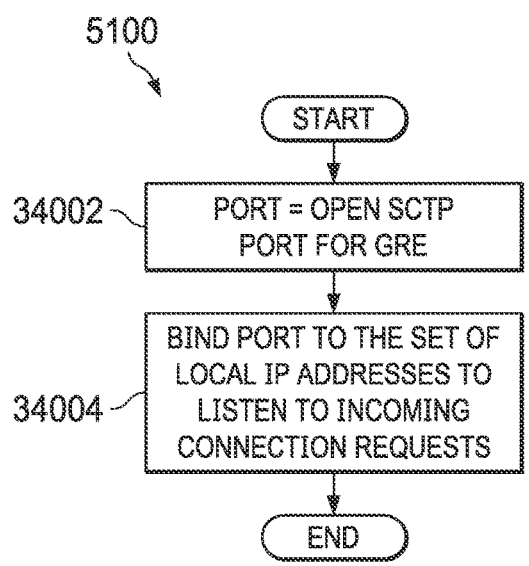
FIG. 51 is a flow diagram of a method of configuring a listening router for incoming SCTP association requests for GRE-in-SCTP according to some embodiments.

FIG. 51 is a flow diagram of a method 5100 of configuring a listening router for incoming SCTP association requests for GRE-in-TCP according to some embodiments.

The method 5100 begins at step 34002. Step 34002 opens the SCTP port for GRE (e.g 6642), and then proceeds to step 34004. Step 34004 binds the port to the set of local IP addresses in the router chosen for SCTP association and then starts listening to incoming association requests (i.e SCTP messages with INIT chunk) to the port on any one of the IP addresses. After step 34004, the method 5100 terminates.

Figure 52:
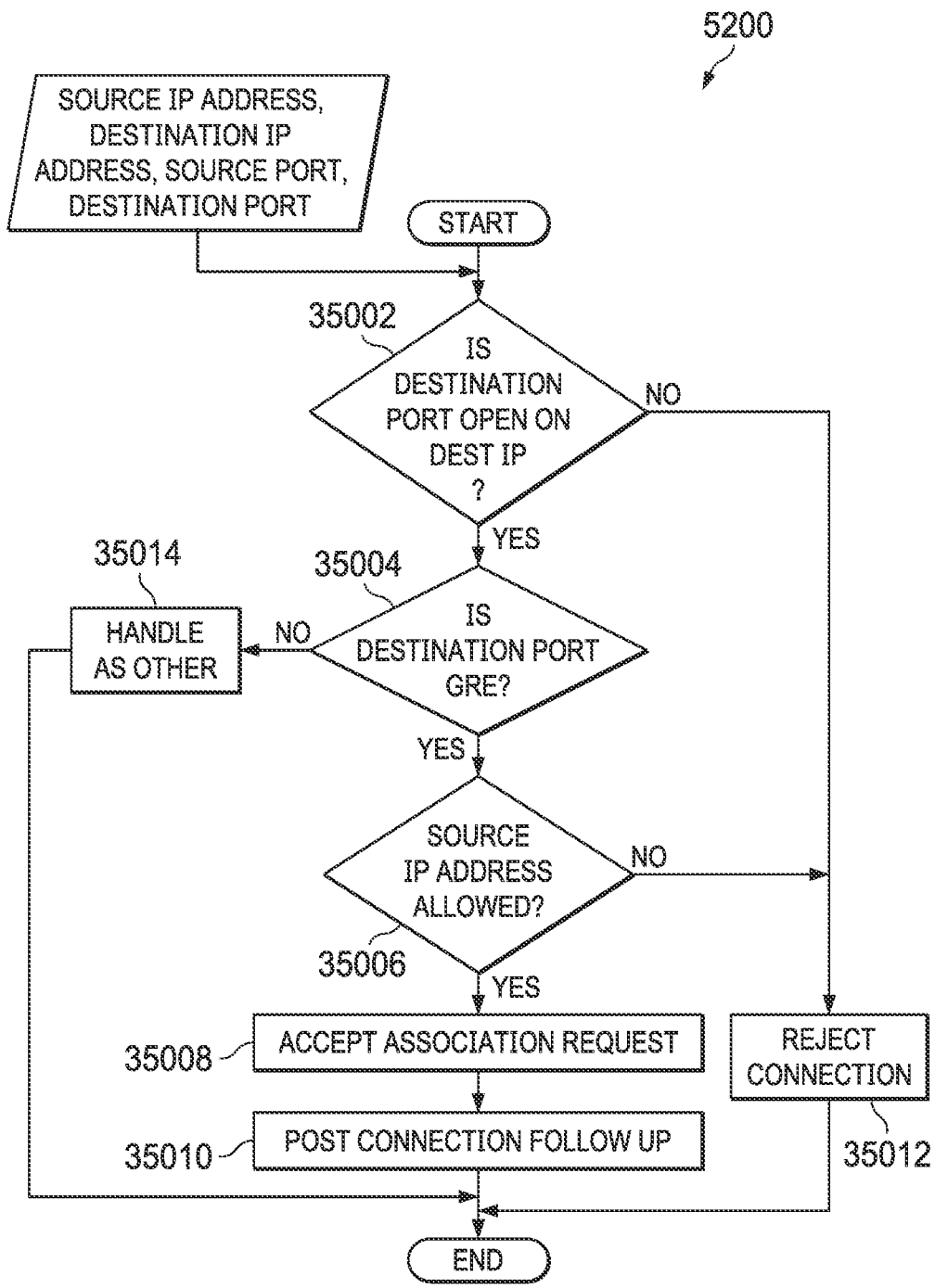
FIG. 52 is a flow diagram of a method of processing and incoming association requests on an SCTP port for GRE according to some embodiments.

FIG. 52 is a flow diagram of a method 5200 of processing and incoming association requests on an SCTP port for GRE according to some embodiments.

The input to the method is the association request (SCTP message with INIT chunk) with the following associated parameters:

Source IP address, IP address of the remote router that sent the request

Destination IP address, a local IP address of this router.

Source Port, SCTP port for the connection at the remote router.

Destination Port, SCTP port at this router to which connection is attempted.

The method 5200 begins at step 35002. Step 35002 checks if the destination port is open in SCTP in this router. If not open, then it proceeds to step 35012, else proceeds to step 35004. Step 35012 rejects the association request using appropriate SCTP means, i.e rejection notification to remote router as per methods in SCTP. For example, the router may send SCTP message back to the sender with ABORT chunk to reject the association request. The method 5200 terminates after step 35012.

Step 35004 checks if the SCTP destination port is GRE (6642). If not then proceeds to step 35014, else proceeds to step 35006. Step 35014 handles the association request as per the type associated with the port. After step 35014, the method 5200 terminates.

Step 35006 checks if an association request is allowed from the remote router, i.e from the source IP address. The factors that determine whether a router should allow an incoming association is not discussed herein. For example, the router may employ a method to discover all potential remote routers and sets of their local IP addresses that may participate in reliable GRE tunneling with the router. If association request is not allowed then proceeds to step 35012, else proceeds to step 35008. Step 35012 rejects the association request using appropriate SCTP means, i.e rejection notification to remote router as per methods in SCTP such as sending back an SCTP message to sender with ABORT control chunk. The method 5200 terminates after step 35012.

In Step 35008, the router accepts the SCTP association request. It means the state for the SCTP association is created with the key as the tuple {Remote IP Address Set, Local IP Address Set. Source port, Destination port}. It proceeds to step 35010. At step 35010, the router performs post association follow ups if any. After step 35010, the method 5200 terminates.

Step 35010 is implemented by the method disclosed herein, which makes the router wait for GIF from peer router, if configured to receive a GIF. Determination of a received packet on the connection as GIF is made as part general processing of GRE packets on the association, as disclosed herein.

If router fails to receive a GIF within a predefined time period as discussed herein, then the router executes some embodiments of the methods disclosed herein so that handling is common in both initiating and receiving routers.

In some embodiments, a router can configure a GRE-in-SCTP-based NVGRE overlay to a remote router. The configuration requires the router to assign the NVGRE overlay a unique non-zero stream ID on a SCTP association to the remote router. Note that Stream ID space is local to router, so each router can independently allocate an unused Stream ID from its local space. The router that sends an NVGRE overlay packet over the SCTP association uses its assigned Stream ID in corresponding data chunks in SCTP packet. For a receiving/remote router, there is no correlation between the Stream ID of a received data chunk to corresponding NVGRE overlay since the router identifies the overlay based on the VSID in the NVGRE header of the packet in the payload of data chunk.

Figure 53:
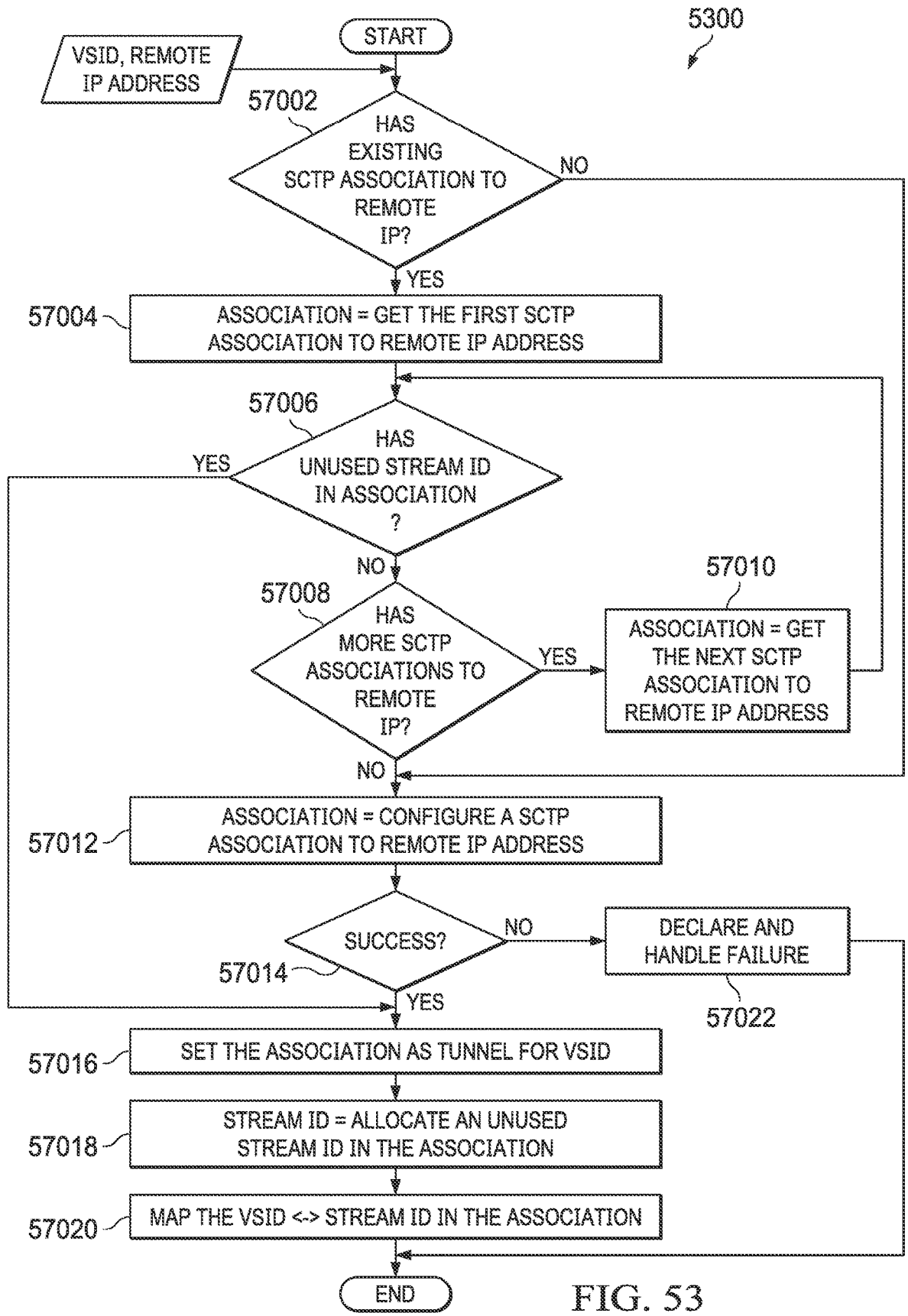
FIG. 53 is a flow diagram of a method of configuring GRE-in-SCTP-based NVGRE overlays according to some embodiments.

FIG. 53 is a flow diagram of a method 5300 of configuring GRE-in-SCTP-based NVGRE overlays according to some embodiments.

The inputs to the method are

VSID of the NVGRE Overlay.

An IP address in the remote router of the Overlay.

The method 5300 starts at step 57002. Step 57002 checks if there is an existing SCTP association to the remote router for GRE-in-SCTP. If none, then proceeds to step 57012, else proceeds to step 57004. Step 57004 retrieves the first SCTP association to remote router for GRE-in-SCTP, and then proceeds to step 57006. Step 57006 checks if there is at least one unused non-zero Stream ID available in the association. If Stream ID is available then this association can be used for the overlay and proceeds to step 57016, else cannot used this association and proceeds to step 57008. Step 57008 checks if there are more SCTP connections to the remote router for GRE-in-SCTP. If yes, then proceeds to step 57010, else proceeds to step 57012. Step 57012 retrieves the next SCTP association to remote router for GRE-in-SCTP, and then returns to step 57006 to evaluate feasibility of the next association as tunnel for the overlay. Step 57012 configures a new SCTP association to the remote router for GRE-in-SCTP. Then it proceeds to step 57014. Step 57014 checks if the association has been set-up successfully. If not then proceeds to step 57022, else proceeds to step 57016. Step 57022 declares and handles failure to configure the NVGRE overlay.

Step 57016 sets the SCTP association as the tunnel associated with the VSID, and then proceeds to step 57018. Step 57018 allocates an unused Stream ID in the association as the identifier for the stream to be used to exchange packets for the overlay. It proceeds to step 57020. Step 57020 creates a mapping between VSID and the Stream ID of the overlay. After step 57020, the method 5300 terminates.

Figure 54:
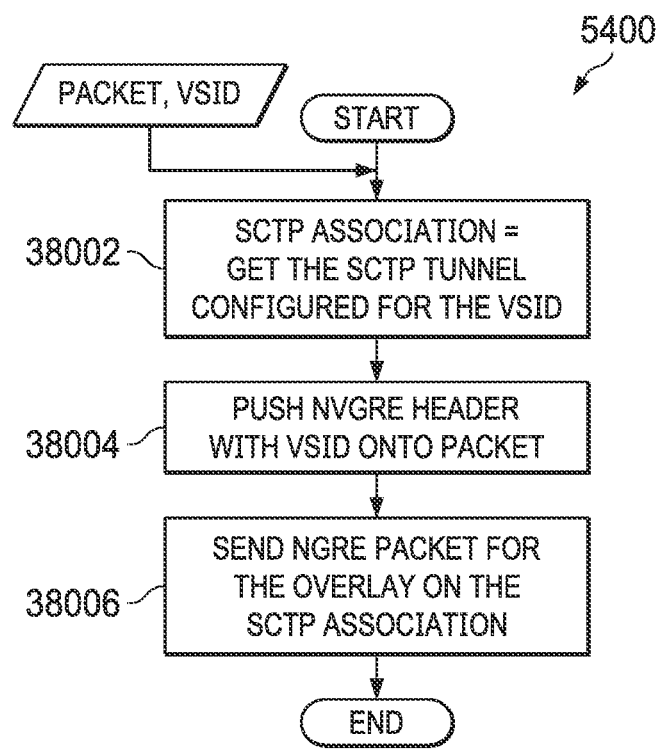
FIG. 54 is a flow diagram of a method of transmitting GRE-in-SCTP-based NVGRE overlay packets according to some embodiments.

FIG. 54 is a flow diagram of a method 5400 of transmitting GRE-in-SCTP-based NVGRE overlay packets according to some embodiments.

The inputs to the method 5400 are:
The packet to be transmitted (e.g an FC packet as described in section 3.2).
VSID of the NVGRE overlay The method 5400 starts at step 38002. Step 38002 retrieves the SCTP tunnel configured for the VSID. It proceeds to step 38004. Step 38004 encodes a NVGRE header with the input VSID and pushes the NVGRE header onto the packet, and then proceeds to step 38006. Step 38006 sends the NVGRE packet on the SCTP association. After step 38006, the method 5400 terminates.

Figure 55:
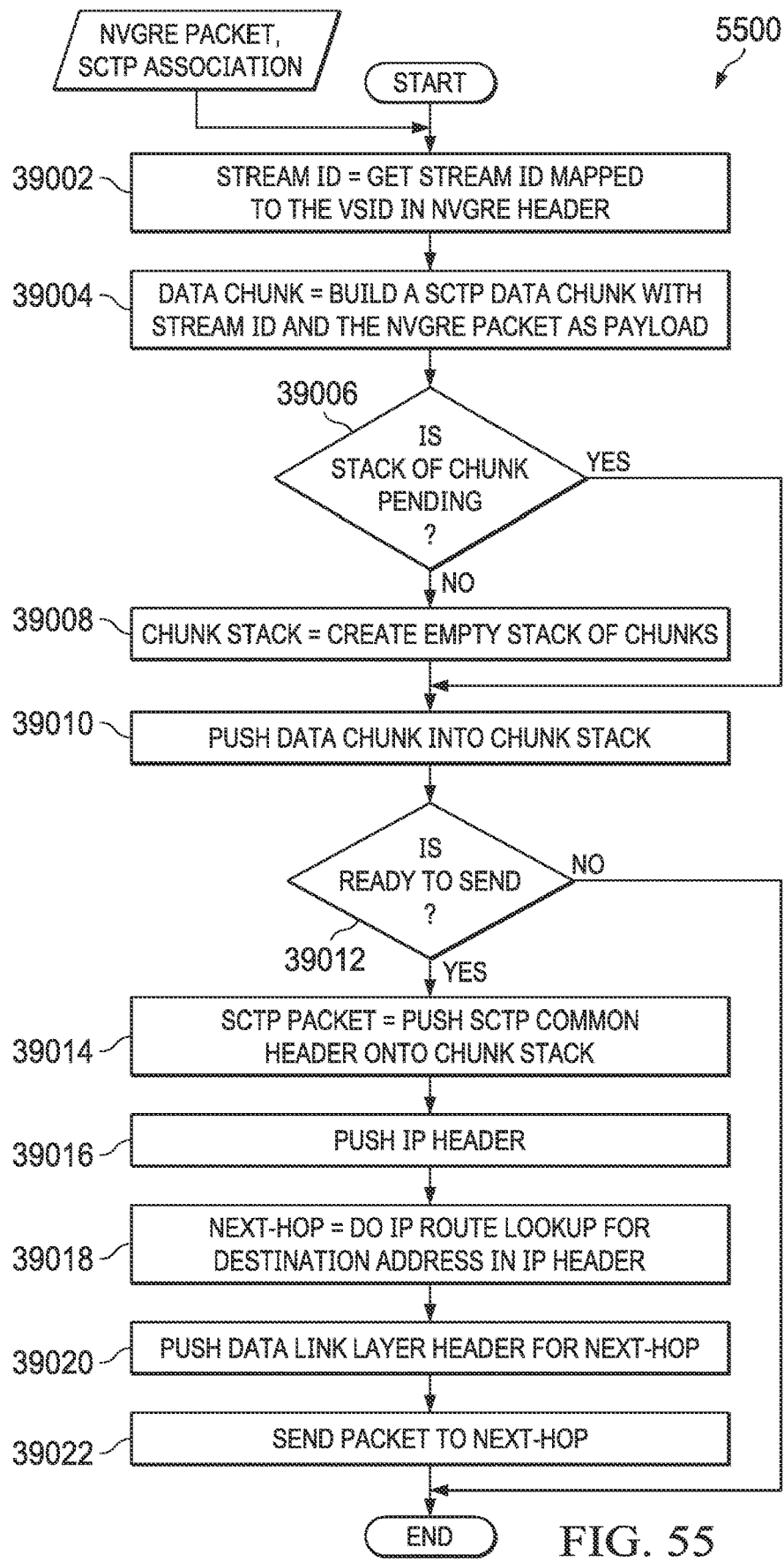
FIG. 55 is a flow diagram of a method of transmitting an NVGRE packet on an SCTP association according to some embodiments.

FIG. 55 is a flow diagram of a method 5500 of transmitting an NVGRE packet on an SCTP association according to some embodiments. Method 5500 may be used to implement step 38006 in FIG. 54.

The inputs to the method are:
the NVGRE packet to be transmitted.
SCTP association on which to send the NVGRE packet.

The method 5500 starts at step 39002. Step 39002 gets the Stream ID mapped to the VSID encoded in the NVGRE header, and then proceeds to step 39004. Step 39004 builds a SCTP data chunk for the Stream ID with the GRE packet as its payload and then proceeds to step 39006. Step 39006 checks if the one or more chunks are pending to be sent on the SCTP association. Since SCTP may bundle multiple chunks on a single SCTP packet, so it is possible that previous chunks may have been queue up and yet to be sent. Secondly, previous chunks may be pending due to congestion, flow control etc. If no chunks are pending then proceeds to step 39008, else proceeds to step 39010. Step 39008 creates an empty stack of SCTP chunks and then proceeds to step 39010. Step 39010 pushes the data chunk (containing the GRE packet) into the stack of SCTP chunks, and then proceeds to step 39012.

Step 39012 checks if the stack of SCTP chunks is ready to be sent over the SCTP association. It is possible that the stack may not be sent immediately due to congestion, flow control etc or could be waiting for more chunks within a time window to send an optimally sized SCTP packet. If not ready to be sent yet then the stack of SCTP chunks will be sent later when ready, so the method terminates for now. If the stack of chunks is ready to be sent, then proceeds to step 39014.

Step 39014 pushes the SCTP Common Header for the association onto the stack of SCTP chunks. This results in a complete SCTP packet. The Source Port and Destination Port fields in the SCTP Common Header are filled as per the corresponding parameters in the association. Then it proceeds to step 39016.

Note that steps 39004-39014 are performed by the SCTP layer in the router.

Step 39016 pushes the IP header onto the packet. The source and destination address in the IP header are filled as per a pair of local and remote IP addresses in the SCTP association (the addresses are provided by step 39014). Protocol field (if IPv4 Header) or the Next Header field (if IPv6 Header) is set to 132 to indicate the payload as SCTP. Then it proceeds to step 39018.

Step 39018 performs IP route table lookup for the destination address in the IP Header, which results in the next-hop for the packet. It proceeds to step 39020.

Steps 39016-39018 may be performed by the IP layer in the router.

Step 39020 pushes the Data Link Layer Header onto the packet which is required to send the packet on the link to the next-hop. Then it proceeds to step 39022. Step 39022 sends the packet on the wire to the next-hop, and then the method 5500 terminates.

Figure 56:
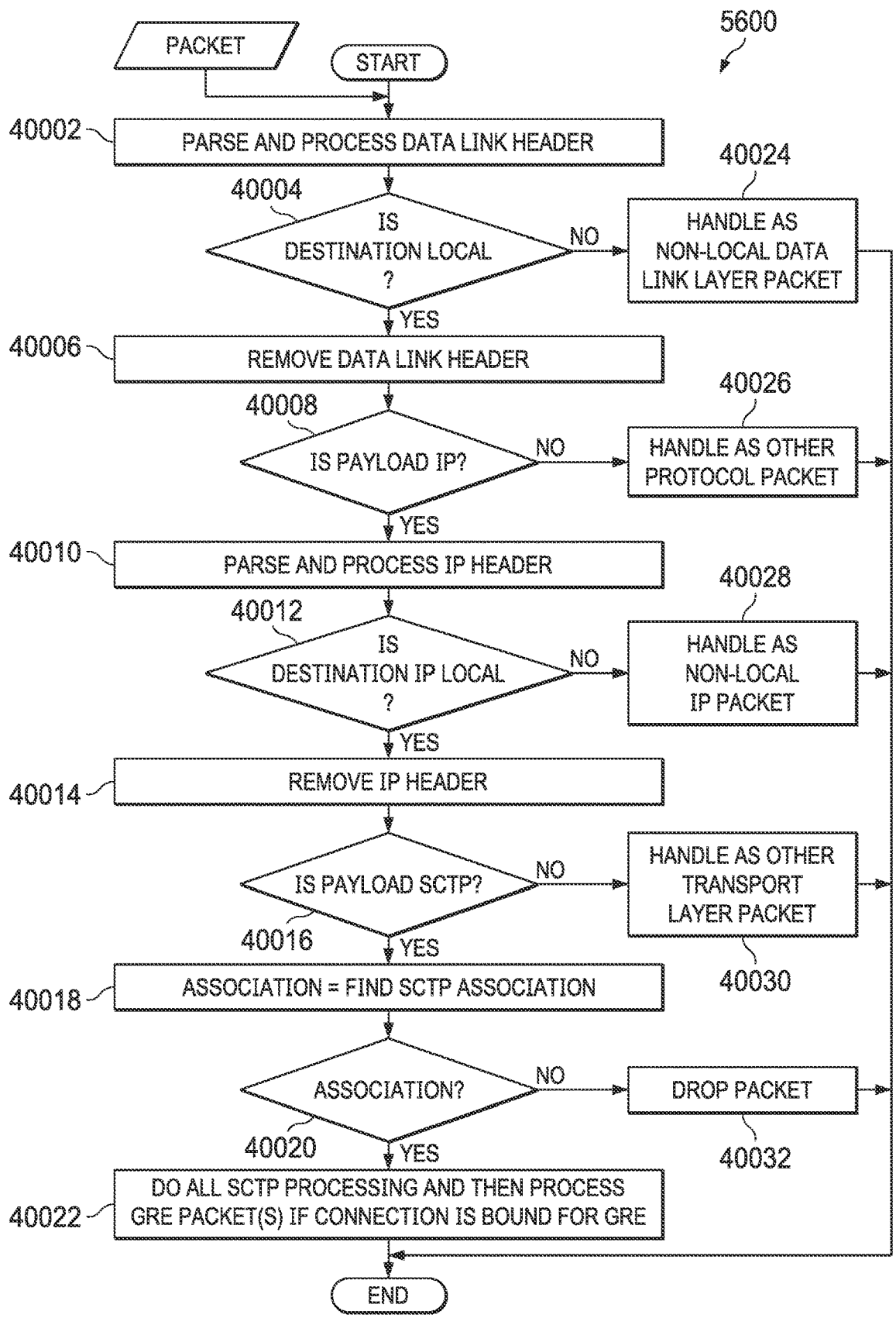
FIG. 56 is a flow diagram of a method of processing GRE-in-SCTP packets at a receiving router according to some embodiments.

FIG. 56 is a flow diagram of a method 5600 of processing GRE-in-SCTP packets at a receiving router according to some embodiments.

The input to the method is a packet received on the wire. The method starts at step 40002. Step 40002 parses and processes the data link header at the top of the packet, and then proceeds to step 40004. Step 40004 checks if data link layer determined at step 40002 the packet to be local, means this router is the termination point of the data link on which the packet arrived. For example, if the data link header is an Ethernet header and if the destination MAC address in the Ethernet header is local to the router then the Ethernet link terminates on the router. If the packet is local at the data link layer then this step proceeds to step 40006, else proceeds to step 40024. Step 40024 performs required handling of the packet at the data link layer as a non-local packet, which may result in forwarding of the packet further at the data link layer. After step 40024, the method 5600 terminates.

Step 40006 removes the data link header from the packet as the router is the end of the data link. It proceeds to step 40008. Step 40008 checks if the payload indicated by the data link header is IP. For example, if data link header is an Ethernet header then its Ethertype field indicates the payload type. If the Ethernet header has VLAN tags, then the Ethertype field in the last VLAN tag indicates the payload type. If the payload is IP, then proceeds to step 40010, else proceeds to step 40026. Step 40026 handles the packet as non-IP packet and then the method terminates.

Note that steps 40002-40008 and step 40024 are performed by the data link layer of the router.

Step 40010 processes the IP packet in the IP layer based on its IP header. For example, the destination address of the IP header is looked up in IP route table to make a forwarding decision on the IP packet etc. Then it proceeds to step 40012. Step 40012 checks if the destination address is local, e.g IP route table lookup matched destination address as a locally configured IP address in router. If not local, then proceeds to step 40028, else proceeds to step 40014. Step 40028 handles the packet as non-local IP packet, such as forwarding to the next-hop associated with the matching route entry from the IP route table lookup etc. After step 40028, the method 5600 terminates.

Step 40014 removes the IP header from the IP packet, as it is a local packet and then proceeds to step 40016. Step 40016 checks if the packet is a SCTP packet, i.e if IP header was IPv4 then if protocol field in the IPv4 header was set to 132 (SCTP) or if was IPv6 and then if the next-header field in the IPv6 header was set to 132 (SCTP). If not SCTP packet, then proceeds to 40030, else proceeds to step 40018.

Step 40030 handles the packet for the respective IP protocol type and then the method 5600 terminates.

Note that steps 40010-40016 and step 40028 are performed by the IP layer of the router.

Step 40018 finds the SCTP association of the SCTP packet based on source and destination IP addresses in the IP header (the addresses were passed along the flow since the removal of the IP header in step 40014) and, source and destination ports in the SCTP Common Header.

It proceeds to step 40020. Step 40020 checks if a matching SCTP association is found. If no matching association then proceeds to step 40032, else proceeds to step 40022. Step 40032 drops the packet as erroneous packet and then the method 5600 terminates.

Step 40022 performs all SCTP layer processing on the SCTP packet and if the SCTP association is bound to GRE then processes GRE packets from the data chunks received in the SCTP packet.

Figure 57:
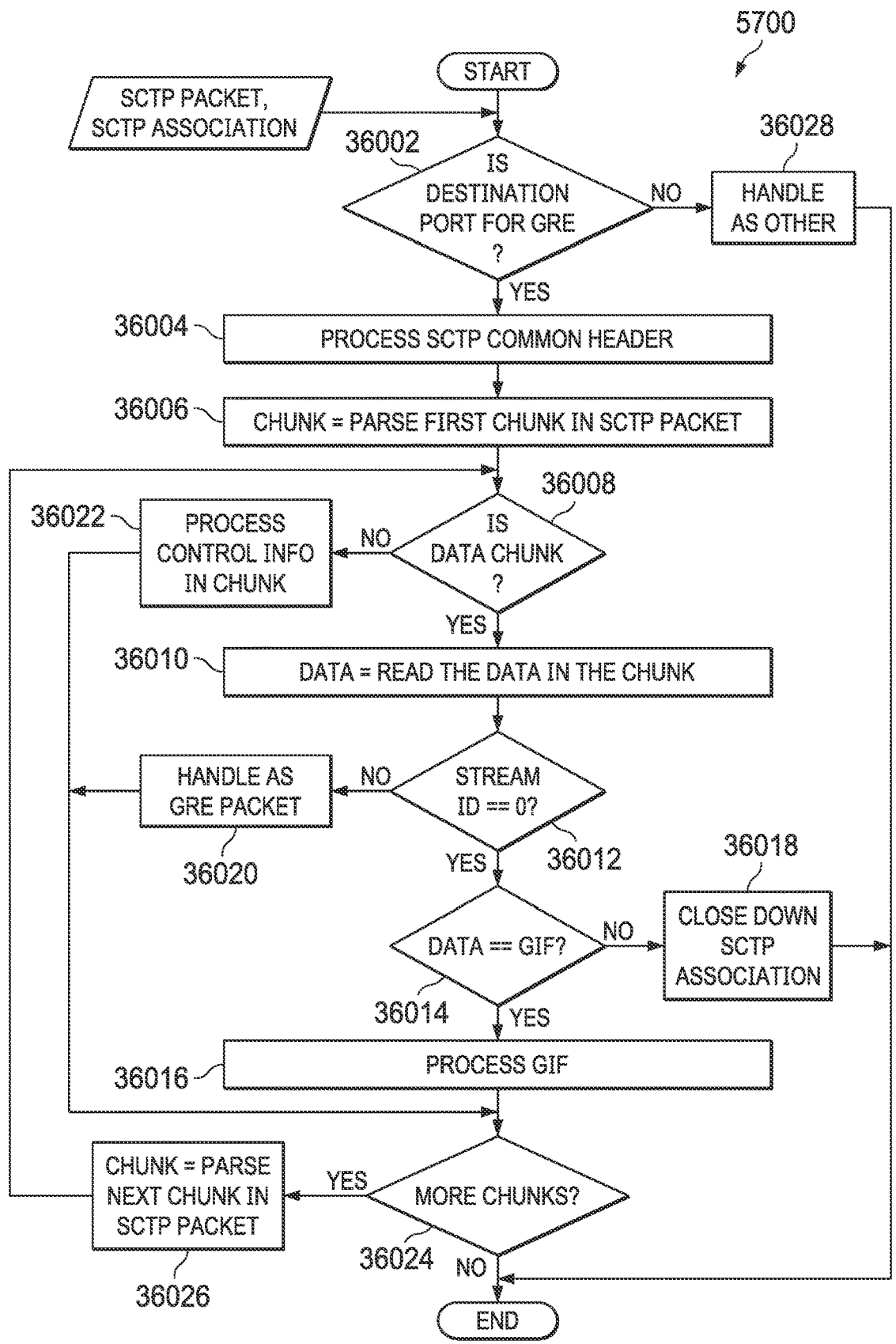
FIG. 57 is a flow diagram of a method of processing GRE-in-SCTP packets from an SCTP packet according to some embodiments.

FIG. 57 is a flow diagram of a method 5700 of processing GRE-in-SCTP packets from an SCTP packet according to some embodiments. Method 5700 may be used to implement step 40022 in FIG. 56.

The inputs to the method are:
- A SCTP packet received on a SCTP association, i.e received by the SCTP layer of the router with SCTP Common Header at the top.
- The SCTP Association, which is indicated by the tuple {Source IP Address from IP header, Destination IP Address from IP header, Source Port in SCTP Common Header, Destination Port in SCTP Common Header}.

The method begins at step 36002. Step 36002 checks if the Destination port in the SCTP Common Header is bound to GRE. If not GRE then proceeds to step 36028, else proceeds to step 36004. Step 36028 handles the SCTP packet for non-GRE applications using state-of-the-art methods.

Step 36004 processes SCTP Common Header using state-of-the-art methods. Then it proceeds to step 36006. Step 36006 parses the first chunk in the SCTP packet and then proceeds to step 36008.

Step 36008 checks if the chunk is a data chunk. If the chunk is not a data chunk (means a control chunk) then proceeds to step 36022, else proceeds to step 36010. Step 36022 processes the control chunk using state-of-the-art methods of SCTP and then proceeds to step 36024. Step 36010 reads the data chunk and hands over the data to the GRE layer. Step 36010 proceeds to step 36012.

Step 36012 checks if the Stream ID of the data chunk is 0. If not 0, then proceeds to step 36020, else proceeds to step 36014.

Step 36020 handles the data as GRE packet by the GRE layer. If the GRE header is of the NVGRE types then VSID in the NVGRE header identifies the NVGRE overlay to which the NVGRE payload belongs to. This step proceeds to step 36024.

Step 36014 checks if the data is GIF packet. If not GIF packet then this packet is not expected (i.e only GIF packet is expected in Stream ID 0), so proceeds to step 36018, else proceeds to step 36016. Step 36018 closes down the SCTP association using appropriate SCTP methods (which notifies the remote router with reason for closure such as by sending a SHUTDOWN control chunk in a SCTP packet), and then the method terminates. Step 36016 processes the GIF packet. If the router was the initiator if the connection then the step 36016 is implemented by some embodiments of the methods disclosed herein, else implemented by other embodiments of the methods disclosed herein. Step 36016 then proceeds to step 36024.

It is to be noted that steps 36014-36020 are performed by the GRE layer, which is the application of the SCTP association.

Step 36024 checks if there are more chunks in the SCTP packet. If no more chunks the method terminates, else proceeds to step 36026. Step 36026 parses the next chunk in the SCTP packet and returns to step 36008 to repeat the subsequent steps for the next chunk.

Intermediate routers, upon receiving these SCTP encapsulated packets, could load balance these packets across multiple paths (next-hops) based on the hash of the five-tuple (source IP address in IP Header, destination IP address in IP Header, source port in SCTP Common Header, destination port in SCTP Common Header, and protocol/next-header field in IP Header) of SCTP packets. If load balancing is desirable among GRE tunnel users, then it is recommended to use a pool of IP addresses at both routers in the SCTP association and then evenly distribute the addresses among the GRE tunnel users. For example, NVGRE overlays transported over a SCTP association may be load balanced by evenly distributing the addresses among the overlays, such that packets of a NVGRE overlays are always transmitted with its assigned IP address.

In some embodiments, QUIC (Quick UDP Internet Connections) is used as the reliable transport layer for tunneling of GRE packets. QUIC is a computer networking communications protocol which operates at the transport layer and serves a role similar to TCP and SCTP. QUIC was initially designed by Google, implemented, and deployed in 2012, announced publicly in 2013 as experimentation broadened, and currently being standardized by IETF. QUIC was designed as a high-performance reliable transport protocol and takes a few fundamental deviations from its predecessors TCP, SCTP, and the like.

While QUIC is still an Internet Draft in progress at IETF, QUIC is used by more than half of all connections from the Chrome web browser to Google's servers. Microsoft EDGE browser supports QUIC, Firefox supports it in their nightly builds. Although its name was initially proposed as the acronym for "Quick UDP Internet Connections", IETF's use of the word QUIC is not an acronym; it is simply the name of the protocol.

QUIC improves performance of connection-oriented applications by establishing a number of multiplexed connections (called streams) between two endpoints over UDP. The concept of streams in QUIC is similar to SCTP, which allows multiple streams of data to reach an endpoint independently, and hence independent of packet losses involving other streams. This solves the head-of-the-line blocking delays as experienced in TCP, if any of the TCP packets are delayed or lost. QUIC's secondary goals include reduced connection and transport latency, and bandwidth estimation in each direction to avoid congestion. A fundamental difference between QUIC and TCP or SCTP is that QUIC is a user space transport protocol, which allows rapid protocol revision without having to wait for system upgrades.

Within a QUIC connection, streams can be started at any time. Either endpoint can start at stream, which can be either bidirectional or unidirectional. QUIC inherits TCP's byte stream data model, so from the application's perspective it is a stream-oriented protocol.

Traditional transport layer protocols such as TCP, SCTP identifies a connection based on the tuple {Source IP Address, Destination IP Address, Source Port Number, Destination Port Number}. However, in QUIC, each connection is identified with a numeric connection identifier (ID). Each endpoint independently selects the connection ID and advertises that in during connection set-up. When an endpoint sends a QUIC packet to the peer then it encodes the QUIC header with the connection ID advertised by peer. The primary function of a connection ID is to ensure that changes in addressing at lower protocol layers (UDP, IP) do not cause packets for a QUIC connection to be delivered to the wrong endpoint. Each endpoint selects connection IDs using an implementation-specific (and perhaps deployment-specific) method which will allow packets with that connection ID to be routed back to the endpoint and identified by the endpoint upon receipt.

Additionally, QUIC provides encryption and authentication of payloads, which makes GRE-in-QUIC suitable for secured and reliable GRE tunnels. QUIC basically embeds TLS (Transport Layer Security) methods within its procedures. During connection set-up, QUIC includes the TLS handshake procedures to negotiate the security keys for encryption and authentication of the payload in QUIC packets. Then, with these keys, the payload of each QUIC packet on the connection is encrypted, authenticated by using TLS procedures.

Figure 58:
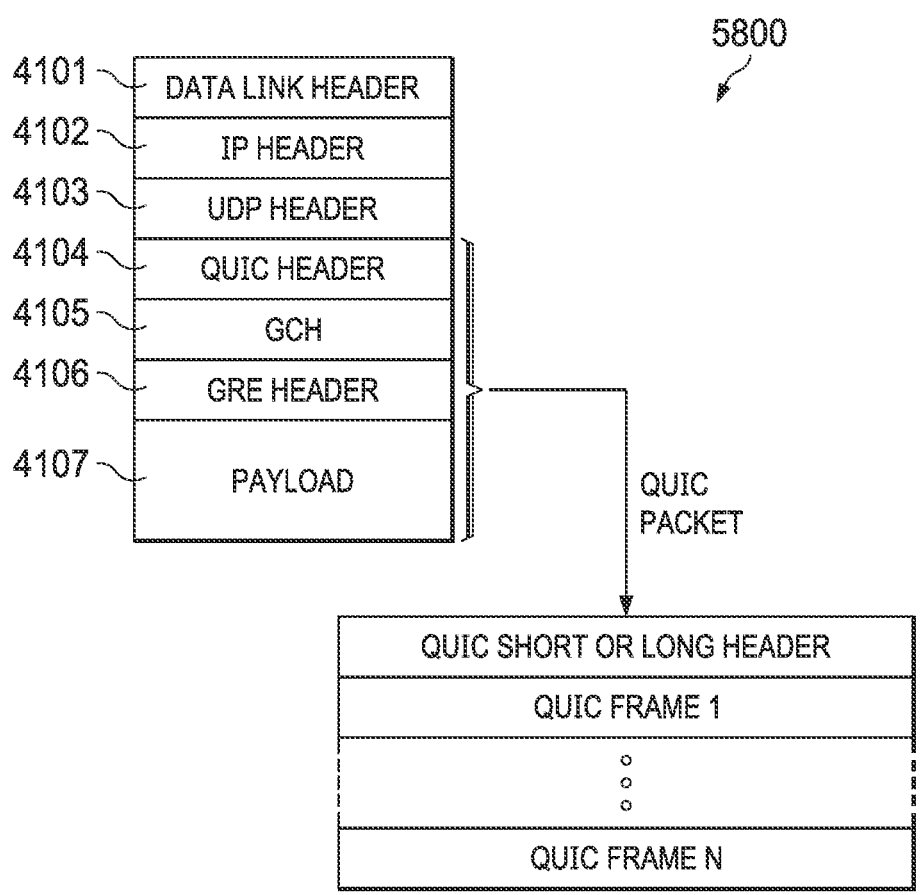
FIG. 58 is a block diagram of a packet including used for a GRE-in-QUIC encapsulation format according to some embodiments.

FIG. 58 is a block diagram of a packet including 5800 used for a GRE-in-QUIC encapsulation format according to some embodiments.

Semantics of headers 4101, 4102, 4106 and payload 4107 are same as disclosed herein for other headers of reliable transport layer protocols.

With respect to the reference model of a reliable GRE packet disclosed herein, herein the UDP Header 4103 and the QUIC Header 4104 belongs to the reliable delivery layer, because QUIC runs atop UDP. The reliability is built into QUIC and UDP Header 4104 just provides the basic transport service. The destination port number field in UDP Header 4104 is set to 80, which is the assigned port number by IANA for QUIC. When "QUIC Packet" is referenced, this means that the UDP header is not included in the packet. The headers 4104-4107 include the "QUIC Packet" for reliable tunnelling of GRE packets.

Header 4104 is the QUIC Header for the QUIC connection used by GRE packets as the tunnel. The QUIC Header is described in conceptual form as it is not a single header, but a set of headers interspersed across the QUIC packet 4104-4107. Secondly, there are several streams of the tuple {GRE Header 4106, Payload 4106} interspersed across the QUIC packet 4104-4107.

In general, a QUIC packet consists of two basic sections:
QUIC Short or Long Header.
Stack of QUIC Frames, which occupy the remaining portion of the packet.

Figure 59:
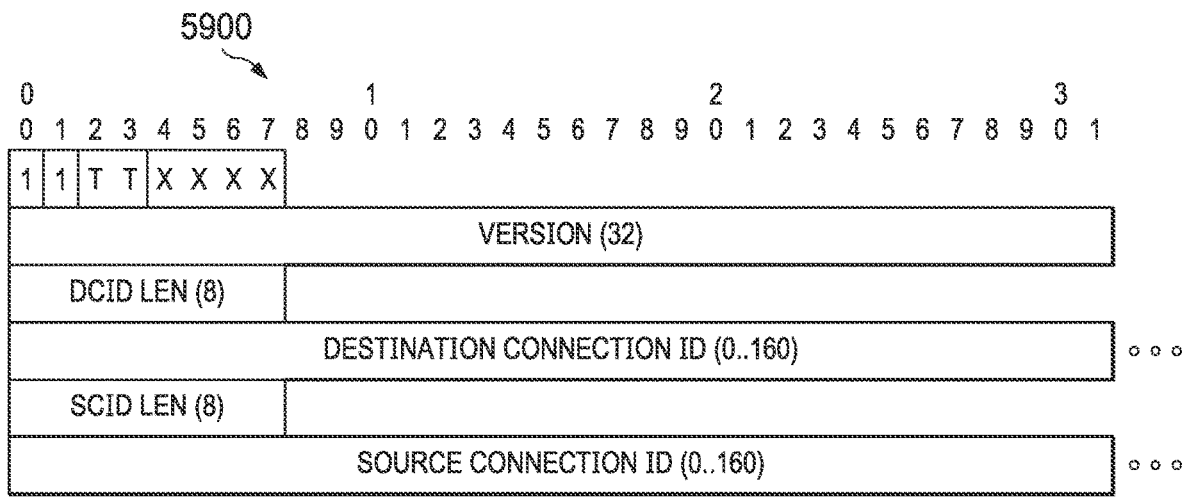
FIG. 59 is a QUIC long header according to some embodiments.

FIG. 59 is a QUIC Long header 5900 according to some embodiments. Some embodiments of the long header 5900 are used for packets that are sent during initial few phases of QUIC connection set-up. Once the initial phases are complete, a sender switches to sending packets using the short header.

Packets that use the long header contain the following fields:

Header Form: The most significant bit (0x80) of byte 0 (the first byte) is set to 1 for long headers.

Fixed Bit: The next bit (0x40) of byte 0 is set to 1. Packets containing a zero value for this bit are not valid packets in this version and is discarded.

Long Packet Type (T): The next two bits (those with a mask of 0x30) of byte 0 contain a packet type. Currently defined packet types are, 0x0=Initial, 0x01=0-RTT, 0x2=Handshake, 0x3=Retry.

Type-Specific Bits (X): The lower four bits (those with a mask of 0x0f) of byte 0 are type-specific.

Version: The QUIC Version is a 32-bit field that follows the first byte. This field indicates which version of QUIC is in use and determines how the rest of the protocol fields are interpreted.

DCID Len: The byte following the version contains the length in bytes of the Destination Connection ID field that follows it. This length is encoded as an 8-bit unsigned integer. In QUIC version 1, this value does not exceed 20. Endpoints that receive a version 1 long header with a value larger than 20 drops the packet. Servers should be able to read longer connection IDs from other QUIC versions in order to properly form a version negotiation packet.

Destination Connection ID: The Destination Connection ID field follows the DCID Len and is between 0 and 20 bytes in length.

SCID Len: The byte following the Destination Connection ID contains the length in bytes of the Source Connection ID field that follows it. This length is encoded as an 8-bit unsigned integer. In QUIC version 1, this value does not exceed 20 bytes. Endpoints that receive a version 1 long header with a value larger than 20 drop the packet. Servers should be able to read longer connection IDs from other QUIC versions in order to properly form a version negotiation packet.

Source Connection ID: The Source Connection ID field follows the SCID Len and is between 0 and 20 bytes in length.

Figure 60:
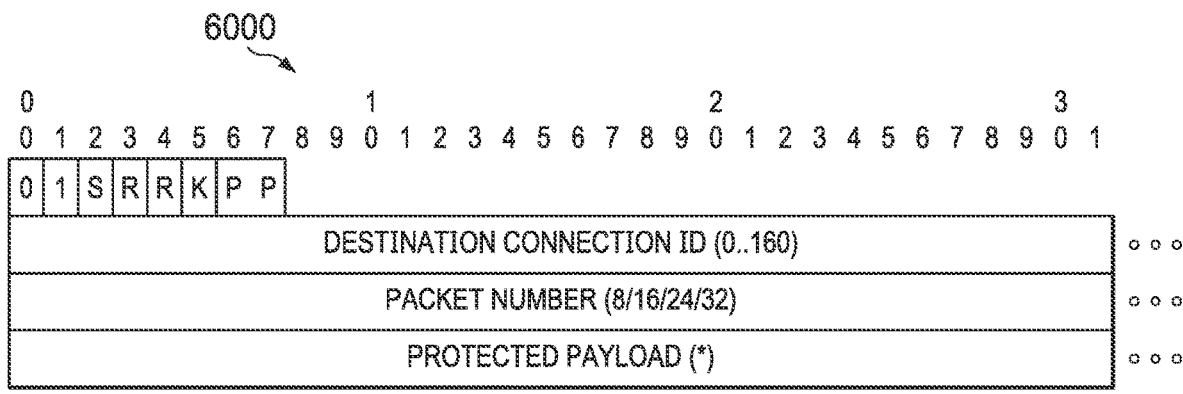
FIG. 60 is a QUIC short header according to some embodiments.

FIG. 60 is a QUIC short header 6000 according to some embodiments. Some embodiments of the short header 6000 are used after the initial few phases of connection negotiation. Packets that use the short header contain the following fields:

Header Form: The most significant bit (0x80) of byte 0 is set to 0 for the short header.

Fixed Bit: The next bit (0x40) of byte 0 is set to 1. Packets containing a zero value for this bit are not valid packets in this version and are discarded.

Spin Bit (S): The third most significant bit (0x20) of byte 0 is the latency spin bit, set as described herein.

Reserved Bits (R): The next two bits (those with a mask of 0x18) of byte 0 are reserved. These bits are protected using header protection. The value included prior to protection is set to 0. An endpoint treats receipt of a packet that has a non-zero value for these bits, after removing both packet and header protection, as a connection error of type PROTOCOL_VIOLATION. Discarding such a packet after only removing header protection can expose the endpoint to attacks.

Key Phase (K): The next bit (0x04) of byte 0 indicates the key phase, which allows a recipient of a packet to identify the packet protection keys that are used to protect the packet.

Packet Number Length (P): The least significant two bits (those with a mask of 0x03) of byte 0 contain the length of the packet number, encoded as an unsigned, two-bit integer that is one less than the length of the packet number field in bytes. That is, the length of the packet number field is the value of this field, plus one.

Destination Connection ID: The Destination Connection ID is a connection ID that is chosen by the intended recipient of the packet.

Packet Number: The packet number field is 1 to 4 bytes long. The packet number has confidentiality protection separate from packet protection. The length of the packet number field is encoded in Packet Number Length field.

Protected Payload: Packets with a short header always include a1-RTT protected payload.

The header form bit and the connection ID field of a short header packet are version-independent. The remaining fields are specific to the selected QUIC version The payload of QUIC packets, after removing the Long or Short header, consists of a sequence of complete frames. Not all packet types contain frames. The payload of a packet that contains frames contains at least one frame and may contain multiple frames and multiple frame types. Frames always fit within a single QUIC packet and cannot span multiple packets.

Figure 61:
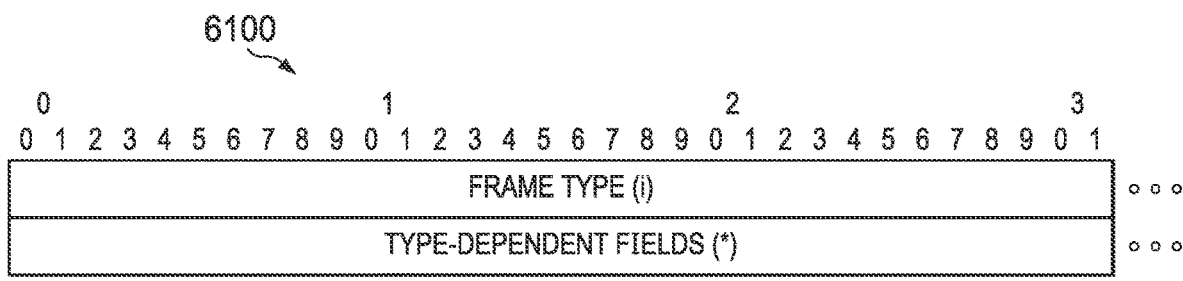
FIG. 61 is a generic frame layout that is used for a QUIC packet according to some embodiments.

FIG. 61 is a generic frame layout 6100 that is used for a QUIC packet according to some embodiments. Each frame begins with a Frame Type, indicating its type, followed by additional type-dependent fields.

Figure 62:
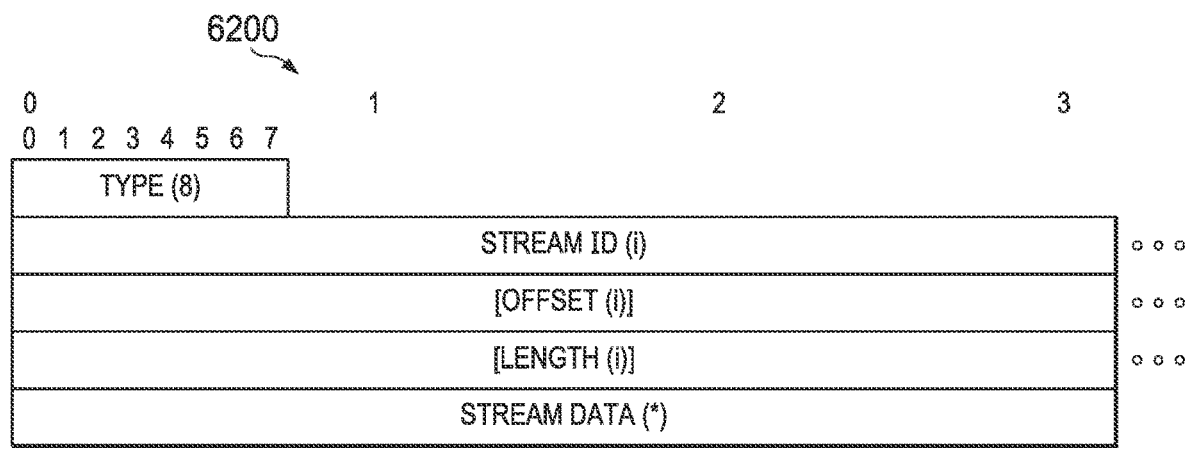
FIG. 62 is a format of a stream frame in a QUIC packet according to some embodiments.

FIG. 62 is a format 6200 of a stream frame according to some embodiments. The stream frame in the format 6200 includes the following fields:

Stream ID: A variable-length integer indicating the stream ID of the stream.

Offset: A variable-length integer specifying the byte offset in the stream for the data in this STREAM frame. This field is present when the OFF bit is set to 1. When the Offset field is absent, the offset is 0.

Length: A variable-length integer specifying the length of the Stream Data field in this STREAM frame.

Stream Data: The bytes from the designated stream to be delivered.

When a Stream Data field has a length of 0, the offset in the STREAM frame is the offset of the next byte that would be sent.

The first byte in the stream has an offset of 0. The largest offset delivered on a stream—the sum of the offset and data length—cannot exceed $2^{62}-1$, as it is not possible to provide flow control credit for that data. Receipt of a frame that exceeds this limit is treated as a connection error of type FRAME_ENCODING_ERROR or FLOW_CONTROL_ERROR.

One limitation in QUIC is that it is used to transport application protocols only such as HTTP etc, since the key target application for QUIC is the web traffic. This is why there is no field in any of the QUIC headers (e.g Long Header, Short Header, STREAM Frame Header) that specifies the type of user protocols. During QUIC connection set-up, the endpoints negotiate the application protocol that would be transported atop QUIC. QUIC performs this negotiation by using the ALPN (Application Layer Protocol Negotiation) of TLS (since QUIC embeds TLS handshake during connection setup).

As the name implies, Application Layer Protocol Negotiation (ALPN) is a TLS extension that introduces support for application protocol negotiation into the TLS handshake). For instances in which multiple application protocols are supported over QUIC, this extension allows the application layer to negotiate which application protocol will be used over the QUIC connection.

In the TLS specification, the extension type ("application_layer_protocol_negotiation(16)") is defined as follows:

```
enum {
    application_layer_protocol_negotiation(16), (65535)
} ExtensionType;
```

The "extension_data" field of the ("application_layer_protocol_negotiation(16)") extension SHALL contain a "ProtocolNameList" value.

```
opaque ProtocolName<1..2^8-1>;
struct {
    ProtocolName protocol_name_list<2..2^16-1>
} ProtocolNameList;
```

"ProtocolNameList" contains the list of protocols advertised by the client, in descending order of preference. Protocols are named by IANA-registered, opaque, non-empty byte strings.

Specifically, the process is as follows:
1. The client appends a new ProtocolNameList field, containing the list of supported application protocols, in the connection set-up message.
2. The server inspects the ProtocolNameList field and returns a ProtocolName field indicating the selected protocol as part of its response.
3. The server may respond with only a single protocol name, and if it does not support any that the client requests, then it may choose to abort the connection. As a result, once the connection is complete, both the secure tunnel is established, and the client and server are in agreement as to which application protocol will be used, they can begin communicating immediately.

Currently supported application protocol names are as follows:

```
HTTP/1.1 [HTTP] => "http/1.1"
SPDY/1 [SPDY/1] => "spdy/1"
SPDY/2 [SPDY/2] => "spdy/2"
SPDY/3 [SPDY/3] => "spdy/3"
```

Some embodiments of methods that implement QUIC can be segregated into two parts:

A. During connection set-up, negotiation between endpoints for multiplexing multiple user protocols over a QUIC connection, irrespective of their network layers. This negotiation is performed by MLPN (Multi-Layer Protocol Negotiation) mechanism introduced into TLS, since QUIC embeds TLS handshake during connection set-up.

B. The negotiated protocols can be transported in QUIC packets as payloads of novel GENERIC_STREAM frames.

The MLPN mechanism defined in Part-A is as follows:
A new extension type ("multi_layer_protocol_negotiation (20)") is defined for TLS which may be included by endpoints to negotiate multi-protocol support during connection set-up.

```
enum {
    multi_layer_protocol_negotiation(20), (65535)
} ExtensionType;
The "extension_data" field of the
("multi_layer_protocol_negotiation(16)") extension SHALL
contain a "MultiLayerProtocolList" value.
opaque LayerName<1..2^8-1>;
```

```
struct {
    uint_16    protocol_list<2..2^16-1>;
} ProtocolList;
struct {
    LayerName      layer_name;
    ProtocolList   protocols;
} LayerProtocolList;
struct {
    LayerProtocolList    layer_protocol_list <2..2^16-1>
} MultiLayerProtocolList;
```

"LayerName" contains the name of the protocol layer. Protocol layers are named by opaque, non-empty byte strings. Empty strings are not included and byte strings are not truncated. Some embodiments define the following layer names:

Data Link Layer="dlink"
Network Layer="network"
Transport Layer="transport"
Application layer protocols with standardized TCP ports="app/tcp"
Application layer protocols with standardized SCTP ports="app/sctp"
Application layer protocols with standardized UDP ports="app/udp"

"ProtocolList" contains a list of 16-bit values, wherein each value identifies a protocol. The value of the protocols is dependent on the layer for which the ProtocolList is applicable. The present disclosure defines the following layer-wise values of protocols.

For "dlink", following protocol values are defined. Ethernet=1, PPP (Point-to-Point Protocol)=2, HDLC (High-Level Data Link Control)=3, IEEE 802.11 wireless LAN=4, LLDP (Link Layer Discovery Protocol)=LLDP=5, Frame Relay=6.

For "network", the standardized Ethertype values are to be used. By this, all existing network layer protocols automatically applicable in this extension.

For "transport", the standardized Protocol Type values are to be used. By this, all existing transport layer protocols as well as other user protocols of network layer are automatically applicable in this extension.

For "app/tcp", the standardized TCP port numbers of the application protocols are to be used.

For "app/udp", the standardized UDP port numbers of the application protocols are to be used.

For "app/sctp", the standardized SCTP port numbers of the application protocols are to be used.

The usage of MLPN during QUIC connection set-up is as follows:

1. In the connection set-up message, the client sends a MultiLayerProtocolList containing the list of protocols it intends to transport over the QUIC connection.
2. The server inspects the MultiLayerProtocolList, resets the protocols that the server does not intend to support in the connection, and returns an updated MultiLayerProtocolList indicating the selected protocols as part of its response.
3. If the server does not support any protocol that the client requests, then it may choose to abort the connection. As a result, once the connection is complete, both the secure tunnel is established, and the client and server are in agreement as to which protocols will be used, they can begin communicating immediately.

The format of a generic stream frame defined in part B is disclosed below.

Figure 63:
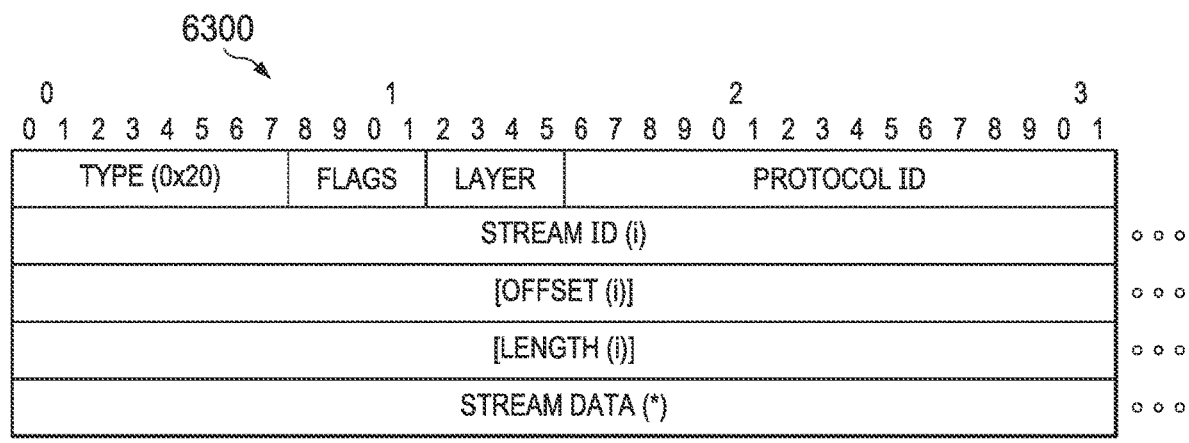
FIG. 63 is a format of a generic stream frame in a QUIC packet according to some embodiments.

FIG. 63 is a format 6300 of a generic stream frame according to some embodiments.

The definition of the fields in the format 6300 are as follows:

Type: This 8-bit field is the common field for any QUIC frame that indicates the type of the frame. Current QUIC specification defined frame types with values from 0x00-0x1e. So, this disclosure defines the value 0x20 to be allocated to indicate GENERIC_STREAM frame. If the techniques disclosed herein are standardized in IETF then this value needs to be reserved in QUIC protocol registry in IANA.

Flags: This 4-bit field carries the following flags.

The HEADER bit (0x8) field is applicable only when the payload (Stream Data field) is datagram oriented (e.g Ethernet, IP etc). When set, it means that Stream Data starts with the beginning of a datagram (i.e header of the protocol packet). If not set, then it means the Stream Data carries a fragment of a protocol packet. This also means multiple datagrams cannot be packed on a single frame. Since the streams in QUIC delivers the frames sequentially, so it is not required to indicate offset of a fragment with respective to the original packet.

The OFF bit (0x4) is set to indicate that there is an Offset field present. When set to 1, the Offset field is present. When set to 0, the Offset field is absent and the Stream Data starts at an offset of 0 (that is, the frame contains the first bytes of the stream, or the end of a stream that includes no data).

The LEN bit (0x2) is set to indicate that there is a Length field present. If this bit is set to 0, the Length field is absent, and the Stream Data field extends to the end of the packet. If this bit is set to 1, the Length field is present.

The FIN bit (0x1) is set only on frames that contain the final size of the stream. Setting this bit indicates that the frame marks the end of the stream.

Layer Type: This 4-bit field indicates the layer of protocol packet carried in the frame. The following values are used in the illustrated embodiment:

0x01=Data Link Layer
0x02=Network Layer
0x03=Transport Layer. Note that this also includes any non-transport protocols that runs over Network Layer.
0x04=Application Layer with TCP ports, means it includes all application protocols that have standardized TCP port numbers.
0x05=Application Layer with UDP ports, means it includes all application protocols that have standardized TCP port numbers.
0x06=Application Layer with SCTP ports, means it includes all application protocols that have standardized TCP port numbers.

Protocol ID: This 16-bit field indicates the protocol within the Layer Type. The values are dependent on the Layer Type field.

When Layer Type is Data Link Layer (0x01) then values in this field are defined as follows: Ethernet=1, PPP (Point-to-Point Protocol)=2, HDLC (High-Level Data Link Control)=3, IEEE 802.11 wireless LAN=4, LLDP (Link Layer Discovery Protocol)=LLDP=5, Frame Relay=6.

Data link layer protocols not included in the above list may be assigned values in the range 7-65535.

When Layer Type is Network Layer (0x02) then values in this field are set according to the standardized values for Ethertypes.

When Layer Type is Transport Layer (0x03) then values in this field are set according to the standardized values for Internet Protocol Numbers.

Stream ID: A variable-length integer indicating the stream ID of the stream.

Offset: A variable-length integer specifying the byte offset in the stream for the data in this GENERIC_STREAM frame. This field is present when the OFF bit is set to 1. When the Offset field is absent, the offset is 0.

Length: A variable-length integer specifying the length of the Stream Data field in this GENERIC_STREAM frame. This field is present when the LEN bit is set to 1. When the LEN bit is set to 0, the Stream Data field consumes all the remaining bytes in the packet.

Stream Data: This variable length field consists of the bytes from the designated stream to be delivered. If the HEADER bit is set then in case of Ethernet Packet, it starts with the Ethernet Header, in case of IPv4 packet, it starts with the IP Header etc.

In some embodiments, this disclosure defines methods for GRE-in-QUIC as follows:

1. During connection set-up, router acting as client uses MLPN to negotiate GRE-in-QUIC by including at least the following protocol in MultiLayerProtocolList:
  A LayerProtocolList entry with LayerProtocolList->layer name "transport" and LayerProtocolList->protocols include Protocol ID value for GRE, i.e 47 as defined in [INET-PROTO-IANA].
2. Each GRE tunnel user is transported as an independent stream in the QUIC connection. For example, when GRE tunnel users are NVGRE overlays then each NVGRE overlay is assigned an independent stream. A packet from an NVGRE overlay is carried as the payload of a GENERIC_STREAM frame, wherein the "Layer" field in the frame is encode with value 0x03 (transport layer) and Protocol ID field is encoded with the value assigned for GRE, i.e 47. The "Stream ID" field is encoded with the Stream ID assigned to the NVGRE overlay. The HEADER bit in the "Flags" field should be set to 0 always to indicate the payload as stream-oriented since GCH is included in the stream that demarcates a GRE packet in the payload. However, an implementation may also exclude GCH in case of which the HEADER bit is set according to the defined rules to demarcate a GRE packet in the payload. With this method multiple NVGRE overlays between two routers are multiplexed over a QUIC connection between them.

Note that Stream ID space is local to router, so each router can independently allocate an unused Stream ID from its local space. The router that sends an NVGRE overlay packet over the SCTP association uses its assigned Stream ID in corresponding data chunks in SCTP packet.

For a receiving router, there is no correlation between the Stream ID of a received data chunk to corresponding NVGRE overlay since the router identifies the overlay based on the VSID in the NVGRE header of the NVGRE packet in the payload of data chunk.

3. Stream ID value 0 is not used to transport GRE packets. It should be reserved by both routers for bulk management of all GRE tunnel users multiplexed on the QUIC connection. One usage of bulk management is the GIF. The GIF is sent on Stream ID 0.

Figure 64:
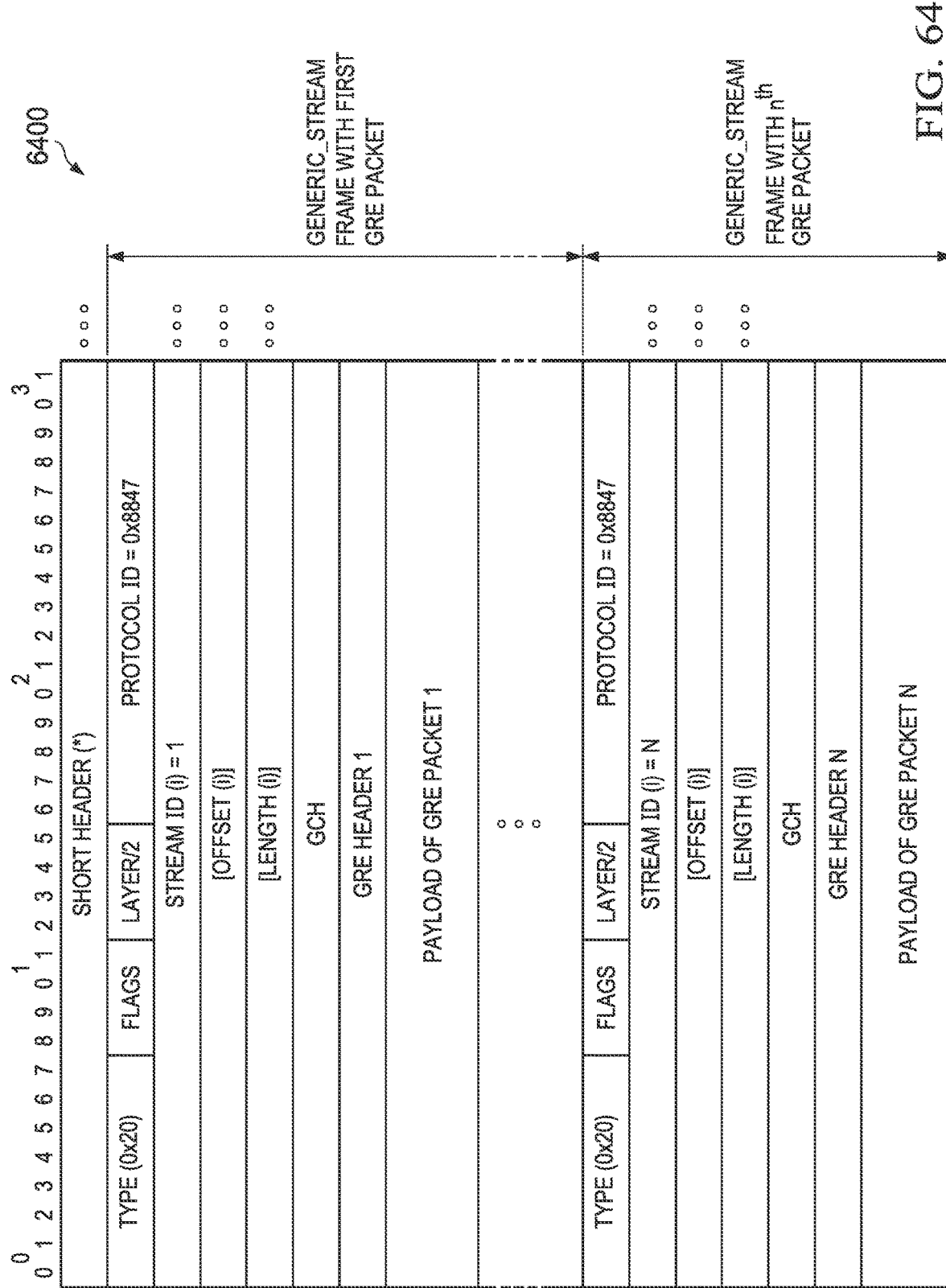
FIG. 64 is a QUIC packet that multiplexes N numbers of GRE packets (one from each GRE tunnel user such as an NVGRE overlay) according to some embodiments.

FIG. 64 is a QUIC packet 6400 that multiplexes N nos. of GRE packets (one from each GRE tunnel user such as an NVGRE overlay according to some embodiments. In the illustrated embodiment, stream IDs are assigned integer values 1 to N respectively.

Figure 65:
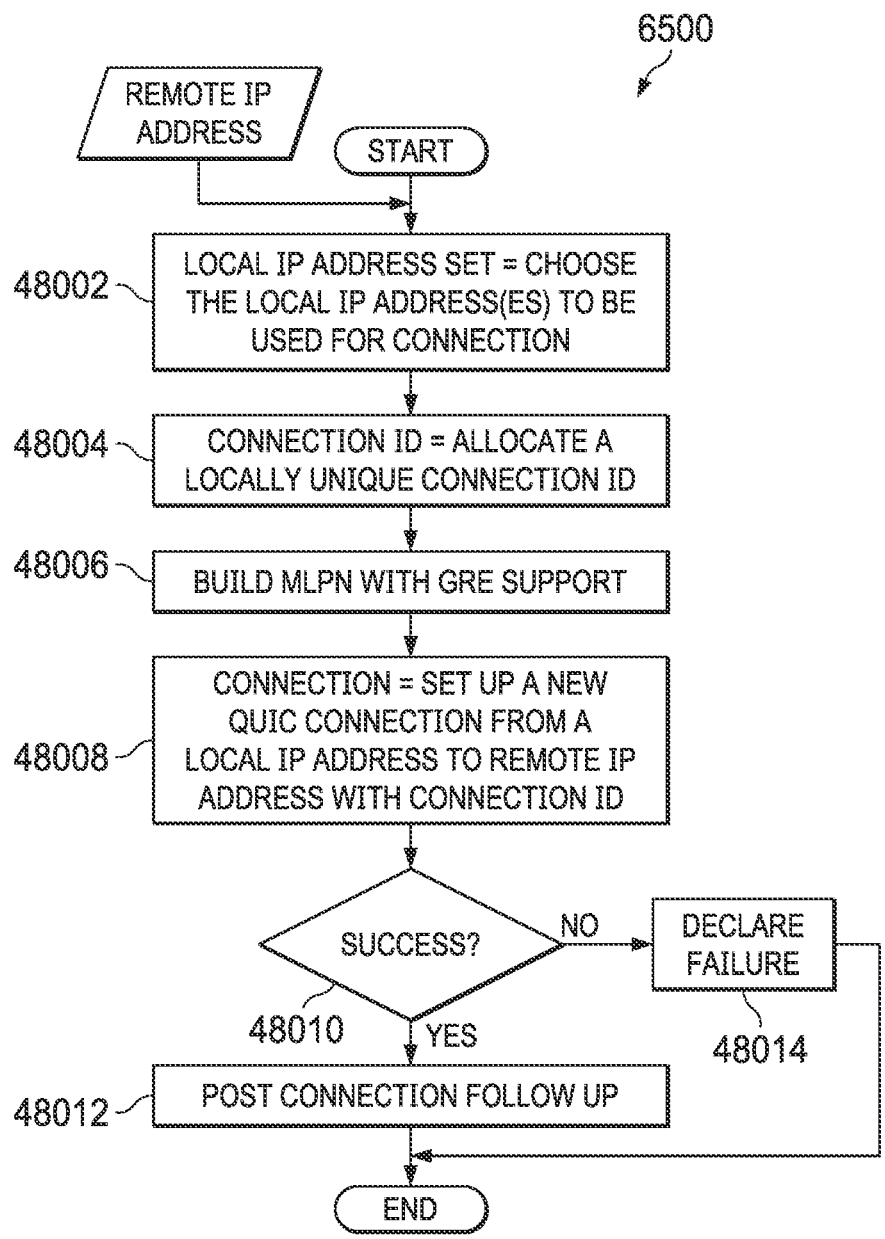
FIG. 65 is a flow diagram of a method of configuring a QUIC connection for GRE-in-QUIC according to some embodiments.

FIG. 65 is a flow diagram of a method 6500 of configuring a QUIC connection for GRE-in-QUIC according to some embodiments. When a router discovers that a new QUIC connection needs to be established to a remote router to tunnel GRE packets, it first determines at least one IP address of the remote router to which the QUIC connection is to be made (Note that during lifetime of a QUIC connection, QUIC packets may be exchanged between any pair of IP addresses within a pool of IP addresses at the routers). Then the router determines the following information in addition to the IP address:

Quality of Service (QoS) information. The QoS information is used for appropriate QoS markings in the IP header that encapsulates an QUIC packet.

The method 6500 starts at step 48002. Step 48002 chooses one or more configured local IP addresses that can be used for sending and receiving tunnel traffic. It proceeds to step 48004. Step 48004 allocates a local Connection ID to be used for the new connection, such that the number is not currently used by another existing QUIC connection. Then it proceeds to step 48006. Step 48006 builds the MLPN to be included in TLS message embedded in connection request. The MLPN includes the support for protocol ID GRE (=47) in layer "transport" and then proceeds to step 48008.

Step 48008 generates a QUIC connect request with Connection ID from one of the local IP addresses to the remote IP address. The QUIC connection request is a QUIC packet that carries data for cryptographic handshake and MLPN. The QUIC connection request is sent over a UDP packet. In the UDP packet, the local port number is set to any random value and destination port number is set to 80 or 443 or to a value administratively chosen for the entire network, to identify QUIC as the user protocol.

If the QUIC connect request is rejected by remote router, then the router should act to limit unnecessary repetition attempts to establish the connection. For example, the router might wait 60 seconds before trying to re-establish the connection. It proceeds to step 48010. Step 48010 checks if the QUIC connect request is accepted by remote router (means success). If success, this router would receive handshake from remote router, that includes the Connection ID allocated by remote router for the connection. If success then proceeds to step 48012, else proceeds to step 48014. Step 48014 declares failure to configure the connection, and then the method terminates. Step 48012 performs post connection follow ups if any. After step 48012, the method 6500 terminates.

Figure 66:
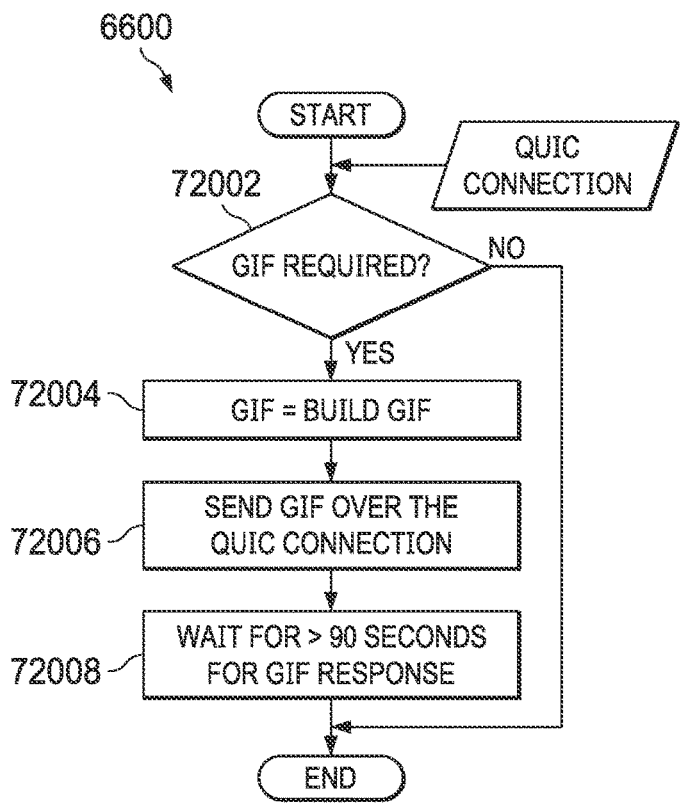
FIG. 66 is a flow diagram of a method of post connection follow up by an initiating router according to some embodiments.

FIG. 66 is a flow diagram of a method 6600 of post connection follow up by an initiating router according to some embodiments. Method 6600 may be used to implement step 48012 in FIG. 65.

The input to the method 6600 is the QUIC Connection that has become operational.

The method 6600 starts at step 72002. Step 72002 checks if requirement of GIF is configured in the router. If yes, then proceeds to step 72004, else the method 6600 terminates.

Step 72004 builds a GIF and fills the necessary fields. It proceeds to step 72006. Step 72006 sends the GIF over the QUIC connection. The GIF is sent as payload of a GENERIC_STREAM frame in a QUIC packet, wherein the value in the Stream ID field is encoded as 0. The Layer Type field is encoded with the value 0x03 for network layer and Protocol ID is encoded with value 47 for GRE. Then it proceeds to step 72008. Step 72008 waits for GIF response from peer router. It is recommended that an implementation wait for GIF response for at least 90 seconds. In order to wait, the router may start a timer for a duration within which it expects a GIF response and associates the timer with the QUIC connection. After this step, the method 6600 terminates.

When the initiating router receives a GIF response from the peer router, then it executes the method disclosed herein. In some embodiments, determination of a received packet on the connection as GIF is made as part general processing of GRE packets on the QUIC connection, as disclosed herein.

Figure 67:
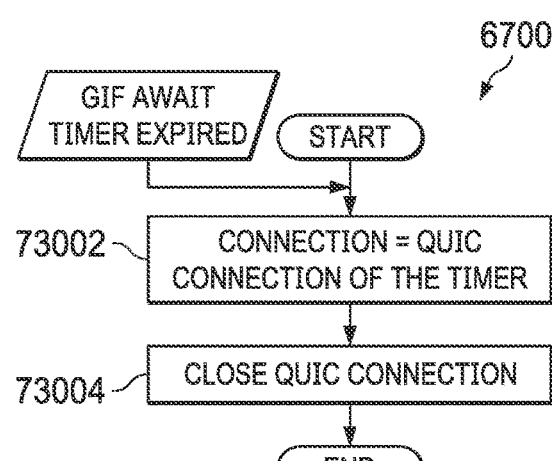
FIG. 67 is a flow diagram of a method of handling expiration of the GIF wait timer by an initiating motor according to some embodiments.

FIG. 67 is a flow diagram of a method 6700 of handling expiration of the GIF wait timer by an initiating router according to some embodiments.

The input to the method 6700 is the notification that GIF await timer expired. The method starts at step 73002. Step 73002 retrieves the QUIC connection associated with the timer and then proceeds to step 73004. Step 73004 closes the QUIC connection, and then the method 6700 terminates.

Figure 68:
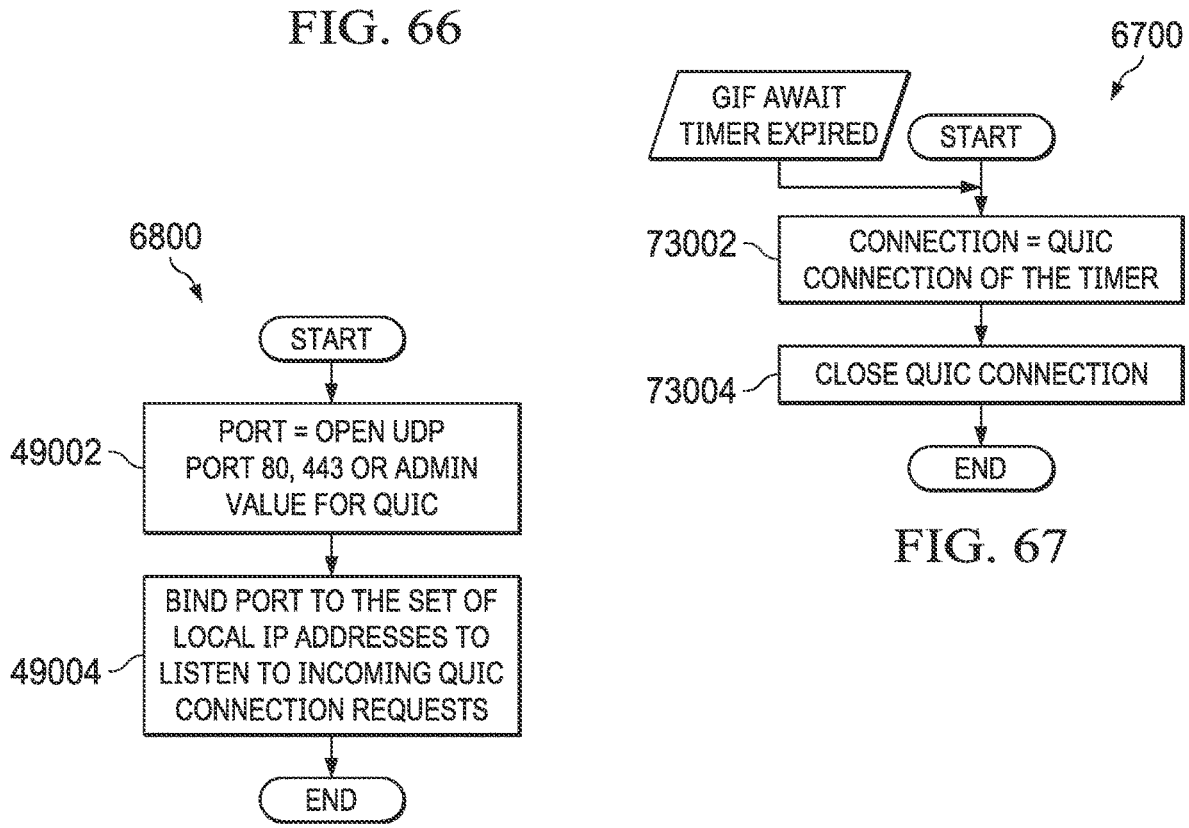
FIG. 68 is a flow diagram of a method of configuring a listening router for a QUIC connection in GRE-in-QUIC according to some embodiments.

FIG. 68 is a flow diagram of a method 6800 of configuring a listening router for a QUIC connection in GRE-in-QUIC according to some embodiments.

The method 6800 begins at step 49002. Step 49002 opens the UDP port 80, 443 or a network wide administratively configured value to identify QUIC as the user protocol, and then proceeds to step 49004. Step 49004 binds the port to the set of local IP addresses in the router chosen for QUIC connections and then starts listening to incoming QUIC connection requests to the port on any one of the IP addresses. After step 49004, the method 6800 terminates.

Figure 69:
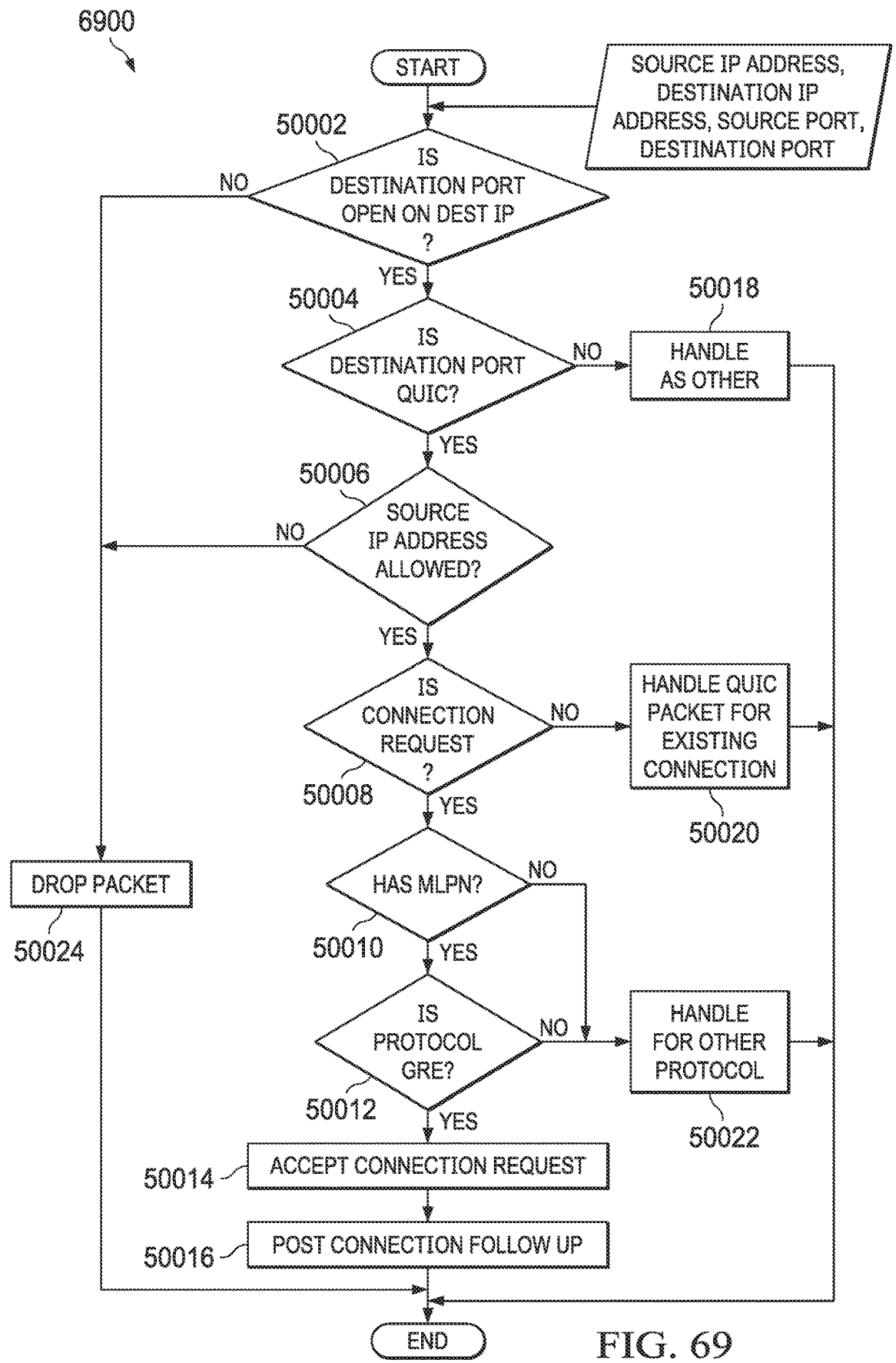
FIG. 69 is a flow diagram of a method of processing incoming connection requests at a router on the UDP port for QUIC according to some embodiments.

FIG. 69 is a flow diagram of a method 6900 of processing incoming connection requests at a router on the UDP port for QUIC according to some embodiments.

The input to the method is the UDP packet with following associated parameters:
  Source IP address, IP address of the remote router that sent the request
  Destination IP address, a local IP address of this router.
  Source Port, UDP port at the remote router.
  Destination Port, UDP port at this router to which the packet is sent.

The method 6900 begins at step 50002. Step 50002 checks if UDP in this router is ready to receive packets on the destination port at the Destination IP address. If not ready, then it proceeds to step 50024, else proceeds to step 50004. Step 50024 drops the packet. The method 6900 terminates after step 50024.

Step 50004 checks if the UDP destination port indicates user protocol as QUIC, i.e port is 80 or 443 or an administratively configured value (if any). If not then proceeds to step 50018, else proceeds to step 50006. Step 50018 handles the payload of the UDP packet as per the user protocol associated with the port. After step 50018, the method 6900 terminates.

Step 50006 checks if a QUIC Packet is allowed from the remote router, i.e from the source IP address. The factors that determine whether a router should allow a QUIC Packet from an IP address is not discussed herein. For example, the router may employ a method to discover all potential remote routers and sets of their local IP addresses that may participate in QUIC connection for GRE tunnels with the router. If the QUIC packet is not allowed then proceeds to step 50024, else proceeds to step 50008. Step 50024 drops the QUIC packet. The method terminates after step 50024.

In Step 50008, the router checks if the QUIC packet carries a connection request (this determination is made as per existing QUIC specification [QUIC]). If it is a connection request then proceeds to step 50010, else proceeds to step 50020. Step 50020 handles the packet as QUIC packet for an existing connection. After step 50020, the method 6900 terminates.

Step 50010 checks if the connection request includes MLPN, which is the case if the connection request is made by remote router as per the methods disclosed herein. If MLPN is not included then proceeds to step 50022, else proceeds to step 50012. Step 50022 handles the connection request for state-of-the-art user protocols.

Step 50012 checks if MLPN includes the support for GRE, i.e layer type "transport" and protocol 47. GRE is supported, if the connection request is made by remote router as per the methods disclosed herein. If GRE is not supported in MLPN then proceeds to step 50022, else proceeds to step 50014. Step 50022 handles the connection request for state-of-the-art user protocols.

Step 50014 accepts the request for a new QUIC connection. This step is implemented as per the server procedures for new connection in QUIC specification [QUIC], such as
  A local connection ID is allocated for the connection.
  State of the connection is created with the tuple {local connection ID, remote connection ID received in the QUIC packet of the connection request}.
  Sends response to remote router with the negotiated encryption, authentication keys and other connection parameters.

The method 6900 proceeds to step 50016. At step 50016, the router performs post connection follow ups if any. After step 50016, the method 6900 terminates.

Step 50016 is implemented by the method described herein, which makes the router wait for GIF from peer router, if configured to receive a GIF. Determination of a received packet on the connection as GIF is made as part general processing of GRE packets on the association, as disclosed herein.

If the router fails to receive a GIF within a predefined time period (e.g., when a previously set timeout expires), then the router handles expiration of the wait timer as disclosed herein.

Figure 70:
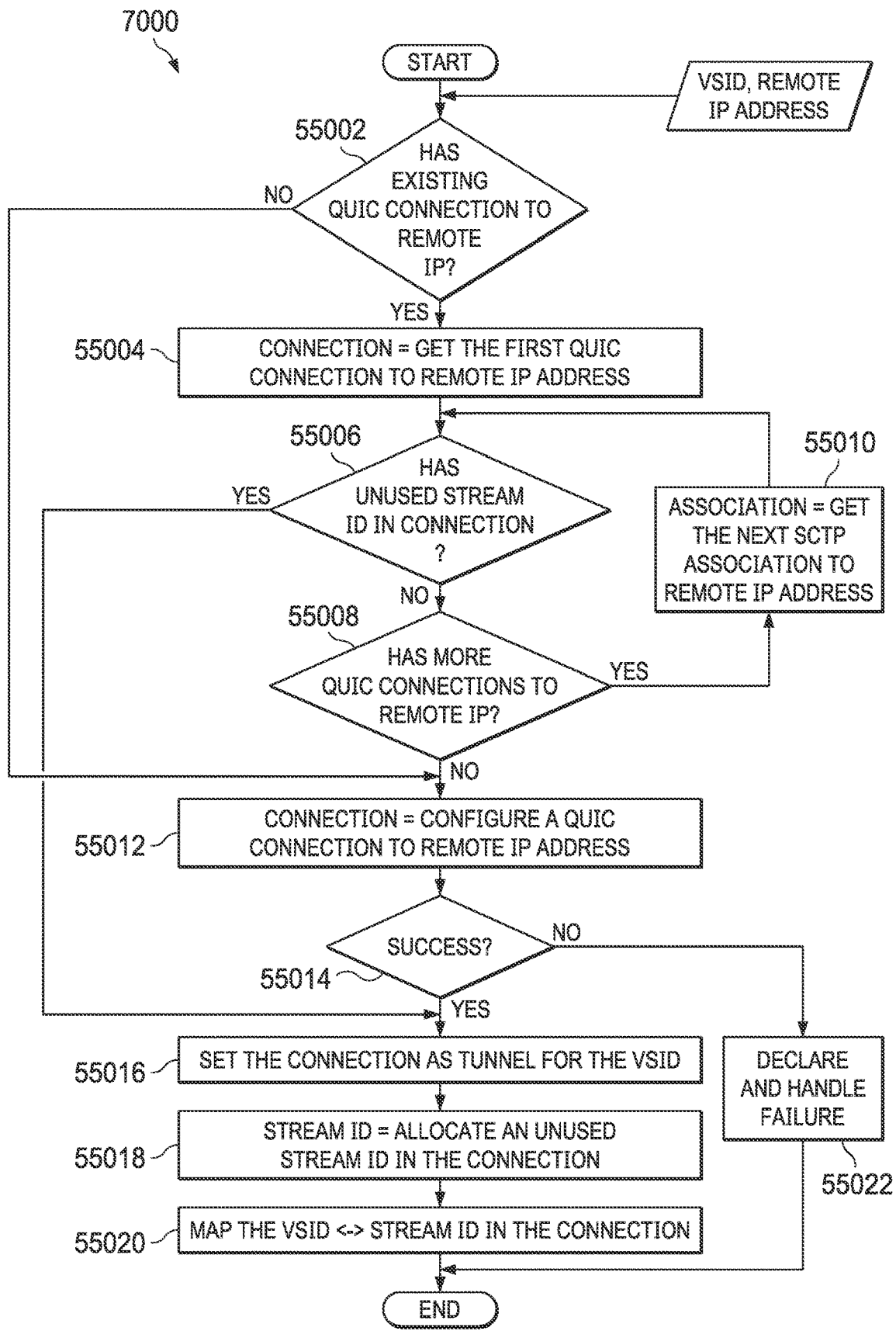
FIG. 70 is a flow diagram of a method of configuring an NVGRE overlay over a QUIC connection at a router according to some embodiments.

FIG. 70 is a flow diagram of a method 7000 of configuring an NVGRE overlay over a QUIC connection at a router according to some embodiments. In the illustrated embodiment, the configuration requires the router to assign the overlay a unique non-zero stream ID on a QUIC connection to the remote router. Note that Stream ID space is local to router, so each router can independently allocate an unused Stream ID from its local space. The router that plays the role of client in the QUIC connection always allocates even-numbered Stream IDs and the router that plays the role of server always allocates odd-numbered Stream IDs. The router that sends a NVGRE overlay packet over the QUIC connection uses its locally assigned Stream ID in corresponding GENERIC_STREAM frames in the QUIC packet.

For a receiving/remote router, there is no correlation between the Stream ID of a received GENERIC_STREAM frame to corresponding NVGRE overlay since the router identifies the overlay based on the VSID in the NVGRE header of the NVGRE packet in the payload of data chunk.

The inputs to the method 7000 are
  VSID of the NVGRE Overlay.
  An IP address in the remote router of the Overlay.

The method 7000 starts at step 55002. Step 55002 checks if there is an existing QUIC connection to the remote router for GRE-in-QUIC. If none, then proceeds to step 55012, else proceeds to step 55004. Step 55004 retrieves the first QUIC connection to remote router for GRE-in-QUIC, and then proceeds to step 55006. Step 55006 checks if there is at least one unused non-zero Stream ID available in the connection. If Stream ID is available then this connection can be used for the overlay and proceeds to step 55016, else cannot use this connection and proceeds to step 55008. Step 55008 checks if there are more QUIC connections to the remote router for GRE-in-QUIC. If yes, then proceeds to step 55010, else proceeds to step 55012. Step 55010 retrieves the next QUIC connection to remote router for GRE-in-QUIC, and then returns to step 55006 to evaluate feasibility of the next connection as tunnel for the overlay. Step 55012 configures a new QUIC connection to the remote router for GRE-in-QUIC. Then it proceeds to step 55014. Step 55014 checks if the connection has been set-up successfully. If not then proceeds to step 55022, else proceeds to step 55016. Step 55022 declares and handles failure to configure the NVGRE overlay.

Step 55016 sets the QUIC connection as the tunnel associated with the VSID, and then proceeds to step 55018. Step 55018 allocates an unused Stream ID in the connection as the identifier for the stream to be used to exchange packets for the overlay. It proceeds to step 55020. Step 55020 creates a mapping between VSID and the Stream ID of the overlay. After step 55020, the method 7000 terminates.

Figure 71:
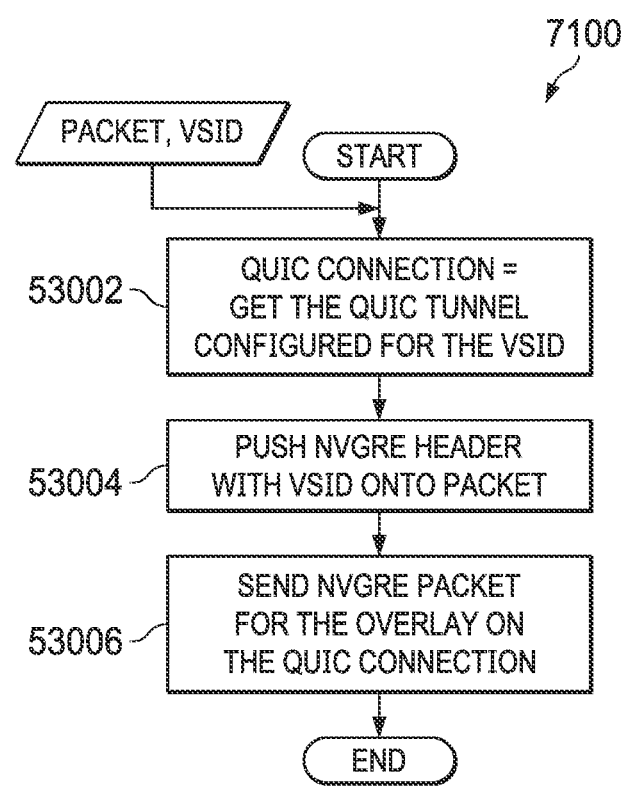
FIG. 71 is a flow diagram of a method for transmitting GRE-in-QUIC-based NVGRE overlay packets according to some embodiments.

FIG. 71 is a flow diagram of a method 7100 for transmitting GRE-in-QUIC-based NVGRE overlay packets according to some embodiments.

The inputs to the method are:
The packet to be transmitted (e.g an FC packet as described in section 3.2).
VSID that identifies the NVGRE overlay.

The method 7100 starts at step 53002. Step 53002 retrieves the QUIC tunnel configured for the VSID, which is the reliable transport layer connection. It proceeds to step 53004. Step 53004 encodes the VSID in a NVGRE header and pushes the NVGRE header onto the packet, and then proceeds to step 53006. Step 53006 sends the NVGRE packet on the QUIC connection. After step 53010, the method 7100 terminates.

Figure 72:
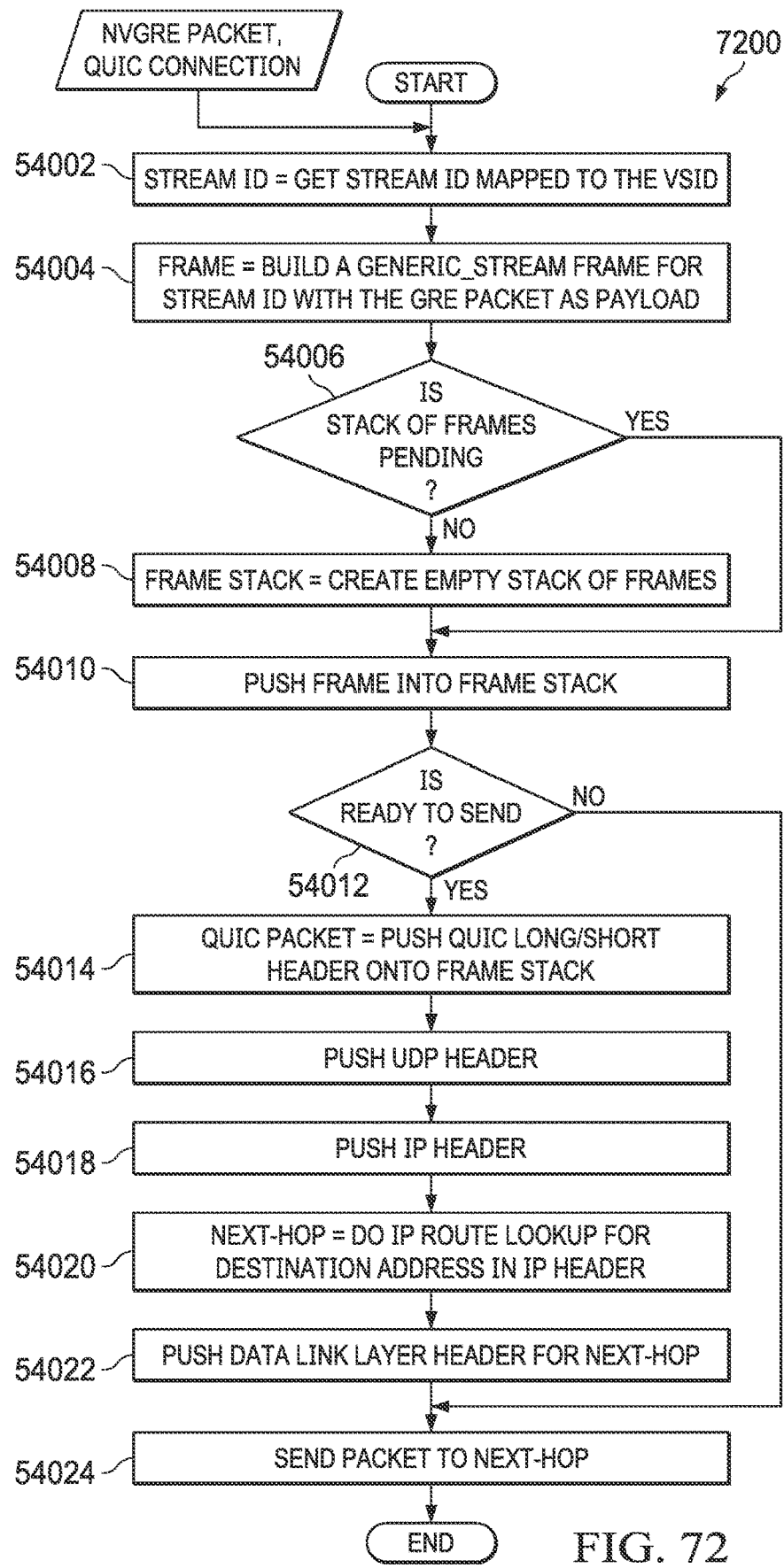
FIG. 72 is a flow diagram of a method of transmitting and NVGRE packet on a QUIC connection according to some embodiments.

FIG. 72 is a flow diagram of a method 7200 of transmitting an NVGRE packet on a QUIC connection according to some embodiments. Method 7200 may be used to implement step 53006 in FIG. 53.

The inputs to the method are:
NVGRE packet to be transmitted
QUIC connection on which to transmit the NVGRE packet The method 7200 starts at step 54002. Step 54002 retrieves the Stream ID mapped to the VSID of the NVGRE packet, and then proceeds to step 54004. 54004 builds a GENERIC_STREAM frame for Stream ID with the GRE packet as its payload and then proceeds to step 54006. Step 54006 checks if the one or more frames are pending to be sent on the QUIC connection. Since QUIC may bundle multiple frames on a single QUIC packet, so it is possible that previous frames may have been queued up and yet to be sent. Secondly, previous frames may also be pending due to congestion, flow control etc. If no frames are pending then proceeds to step 54008, else proceeds to step 54010. Step 54008 creates an empty stack of frames and then proceeds to step 54010. Step 54010 pushes the GENERIC_STREAM frame (containing the GRE packet) into the stack of frames, and then proceeds to step 54012.

Step 54012 checks if the stack of frames is ready to be sent over the QUIC connection. It is possible that the stack may not be sent immediately due to congestion, flow control etc or could be waiting for more frames within a time window to send an optimally sized QUIC packet. If not ready to be sent yet then the stack of frames will be sent later when ready, so the method terminates for now. If the stack of frames is ready to be sent, then proceeds to step 54014.

Step 54014 pushes the QUIC Header (i.e QUIC Long or Short Header as deemed appropriate for the connection) for the connection onto the stack of frames. This results in a complete QUIC packet. The Destination Connection ID field in the QUIC Header is filled as per the Connection IDs negotiated in the connection. Then it proceeds to step 54016.

Note that steps 54004-54014 are performed by the QUIC layer in the router.

Step 54016 pushes the UDP header onto the QUIC packet. The source port in UDP header may be a random value or may be a value based on ECMP (Equal Cost Multipath) hash. The destination port in UDP header is set to indicate QUIC packet as its payload, i.e could be value 80 or 443 or to a network wide value chosen administratively. The method 7200 proceeds to step 54018.

Step 54018 pushes the IP header onto the UDP packet. The source and destination address in the IP header are filled as per a pair of local and remote IP addresses in the QUIC connection (the addresses are provided by step 54014). Protocol field (if IPv4 Header) or the Next Header field (if IPv6 Header) is set to 17 to indicate the payload as UDP. Then the method 7200 proceeds to step 54020.

Step 54020 performs IP route table lookup for the destination address in the IP Header, which results in the next-hop for the packet. It proceeds to step 54022.

Steps 54018-54020 may be performed by the IP layer in the router.

Step 54022 pushes the Data Link Layer Header onto the IP packet which is required to send the packet on the link to the next hop. Then it proceeds to step 54024. Step 54024 sends the packet on the wire to the next-hop, and then the method 7200 terminates.

FIG. 73 is a flow diagram of a method 7300 of processing a GRE-in-QUIC packet after it is received by a router on a wire according to some embodiments.

The input to the method is a packet received on the wire. The method 7300 starts at step 56002. Step 56002 parses and processes the data link header at the top of the packet, and then proceeds to step 56004. Step 56004 checks if data link layer determined at step 56002 the packet to be local, which means this router is the termination point of the data link on which the packet arrived. For example, if the data link header is an ethernet header and if the destination MAC address in the ethernet header is local to the router then the ethernet link terminates on the router. If the packet is local at the data link layer then this step proceeds to step 56006, else proceeds to step 56026. Step 56026 performs required handling of the packet at the data link layer as a non-local packet, which may result in forwarding of the packet further at the data link layer. After step 56026, the method 7300 terminates.

Step 56006 removes the data link header from the packet as the router is the end of the data link. It proceeds to step 56008. Step 56008 checks if the payload indicated by the data link header is IP. For example, if data link header is an ethernet header then its Ethertype field indicates the payload type. If the ethernet header has VLAN tags, then the Ethertype field in the last VLAN tag indicates the payload type. If the payload is IP, then proceeds to step 56010, else proceeds to step 56028. Step 56028 handles the packet as non-IP packet and then the method 7300 terminates.

Note that steps 56002-56008 and step 56026 are performed by the data link layer of the router.

Step 56010 processes the IP packet in the IP layer based on its IP header. For example, the destination address of the IP header is looked up in IP route table to make a forwarding decision on the IP packet etc. Then it proceeds to step 56012. Step 56012 checks if the destination address is local, e.g IP route table lookup matched destination address as a locally configured IP address in router. If not local, then proceeds to step 56030, else proceeds to step 56014. Step 56030 handles the packet as non-local IP packet, such as forwarding to the next-hop associated with the matching route entry from the IP route table lookup etc. After step 56030, the method 7300 terminates.

Step 56014 removes the IP header from the IP packet, as it is a local packet and then proceeds to step 56016. Step 56016 checks if the packet is a UDP packet, i.e if IP header was IPv4 then if protocol field in the IPv4 header was set to 17 (UDP) or if was IPv6 and then if the next-header field in the IPv6 header was set to 17 (UDP). If not UDP packet, then proceeds to 56032, else proceeds to step 56018. Step 56032 handles the packet for the respective IP protocol type and then the method 7300 terminates.

Note that steps 56010-56016 and step 56030 are performed by the IP layer of the router.

Step 56018 checks if the destination port in the UDP header indicates QUIC as the payload, i.e value is 80 or 443 or a network wide value assigned administratively to identify QUIC as payload. If the payload is not QUIC then proceeds to step 56034, else proceeds to step 56020.

Step 56034 handles the packet for the respective port and then the method 7300 terminates.

Step 56020 finds the QUIC connection for the QUIC packet, based on Destination Connection ID in the QUIC Long or Short Header. The method 7300 proceeds to step 56022.

Step 56022 checks if a matching QUIC connection is found. If no matching connection then proceeds to step 56036, else proceeds to step 56024. Step 56036 drops the packet as erroneous packet and then the method 7300 terminates.

Step 56024 performs all QUIC layer processing on the QUIC packet. For each GENERIC_STREAM frame in the packet that indicates GRE as its payload, it processes the GRE packets from the Stream Data in the frame. After this step, the method 7300 terminates.

Figure 74:
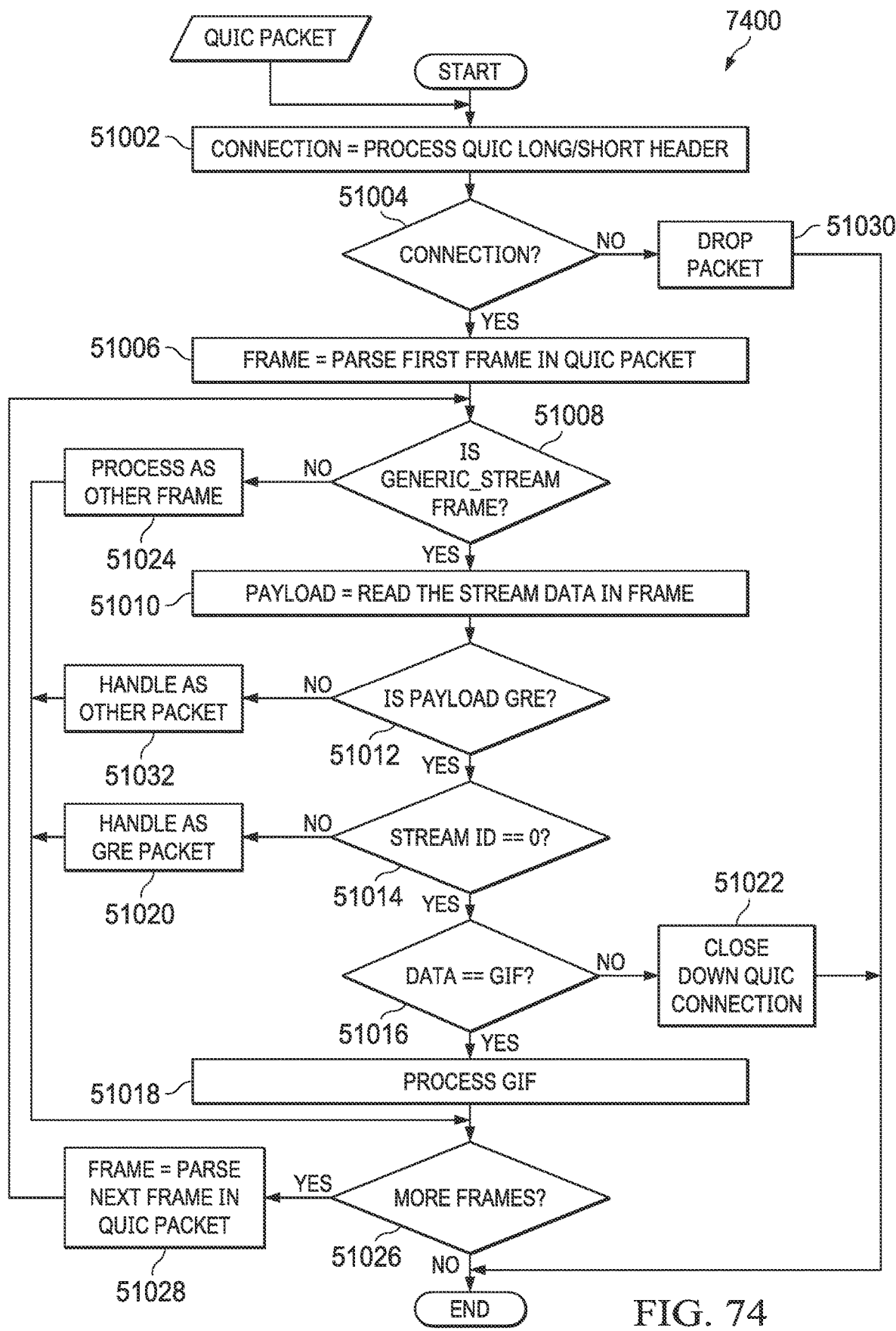
FIG. 74 is a flow diagram of a method of processing a GRE-in-QUIC packet from a QUIC packet according to some embodiments.

FIG. 74 is a flow diagram of a method 7400 of processing a GRE-in-QUIC packet from a QUIC packet according to some embodiments.

The input to the method is a QUIC packet received for a potential existing connection.

The method 7400 begins at step 51002. Step 51002 parses and processes the QUIC Short Header or Long Header (whichever is present, but most likely would be the Short Header) in the received packet, using state-of-the-art methods. In this step, it finds the existing QUIC connection based on the connection ID(s) in the header. Then it proceeds to step 51004. Step 51004 checks if a connection is found. If not found, then proceeds to step 51030, else proceeds to step 51006. Step 51030 drops the packet and then the method 7400 terminates.

The method 7400 proceeds to step 51006. Step 51006 parses the first frame in the QUIC packet and then proceeds to step 51008.

Step 51008 checks if the frame is a GENERIC_STREAM frame. If the frame is not a GENERIC_STREAM frame then proceeds to step 51024, else proceeds to step 51010. Step 51024 processes the frame using state-of-the-art methods of QUIC and then proceeds to step 51026. Step 51010 reads the Stream Data (Payload) from the GENERIC_STREAM frame and then proceeds to step 51012.

Step 51012 checks if the payload type determined by Layer Type and Protocol ID fields in the GENERIC_STREAM is GRE packet(s). If the payload type is GRE then proceeds to step 51014, else proceeds to step 51032. Step 51032 handles the payload as per its type.

Step 51014 checks if Stream ID in GENERIC_STREAM is 0. If not 0 then it proceeds to step 51020, else the method 7300 proceeds to step 51016.

Step 51020 hands over the payload to the GRE layer. If the GRE header is of the NVGRE types, then the VSID of the NVGRE header in the payload identifies the NVGRE overlay to which the payload belongs to. This step proceeds to step 51026.

Step 51016 checks if the payload is MOIF packet. This determination is made if the Stream ID of the GENERIC_STREAM frame is 0 and the payload is GIF. If not GIF packet then this packet is not expected, so proceeds to step 51022, else proceeds to step 51018. Step 51022 closes down the QUIC connection using appropriate methods (e.g which notifies the remote router with reason for closure such as by sending a CONNECTION CLOSE frame in a QUIC packet in the context of the connection), and then the method 7400 terminates.

Step 51018 processes the GIF.

Step 51018 then proceeds to step 51026.

It is to be noted that steps 51014-51020 are performed by the GRE layer, which is user of the QUIC connection.

Step 51026 checks if there are more frames in the QUIC packet. If no more frames then the method terminates, else proceeds to step 51028. Step 51028 parses the next frame in the QUIC packet and returns to step 51008 to repeat the subsequent steps for the next frame.

Intermediate routers, upon receiving these UDP encapsulated QUIC packets, could balance these packets based on the hash of the five-tuple (source IP address in IP Header, destination IP address in IP Header, source port in UDP Header, destination port in UDP Header, and protocol/next-header field in IP Header) of UDP packets. If load balancing is desirable among the GRE tunnel users (e.g NVGRE overlays), then it is recommended to use a pool of IP addresses at both router in the QUIC connection and then distribute the addresses among the GRE tunnel users.

In some embodiments, certain aspects of the techniques disclosed herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques disclosed herein. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more all of the following:
 a) hardware-only circuit implementations (such as implementations and only analog and/or digital circuitry) and
 b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
 c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements disclosed herein in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been disclosed herein with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed herein are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed herein may be altered or modified and all such variations are considered within the scope of the disclosed subject matter. Accordingly, the protection sought herein is as set forth in the claims below.

What is claimed is:

1. A method comprising:
 encapsulating, at a router, a payload in a generic routing encapsulation (GRE) header that defines a connectionless GRE tunnel;
 encapsulating, at the router, the payload and the GRE header in a GRE control header;
 encapsulating, at the router, the payload, the GRE header, and the GRE control header in at least one reliable transport header associated with a connection formed using a reliable transport layer; and
 conveying the payload, the GRE header, the GRE control header, and the at least one reliable transport header over the reliable transport layer.

2. The method of claim 1, further comprising:
 encapsulating, at the router, the payload, the GRE header, the GRE control header, and the at least one reliable transport header in an IP header of an IP underlay tunnel in an IP network.

3. The method of claim 2, further comprising:
 encapsulating, at the router, the payload, the GRE header, the GRE control header, the at least one reliable transport header, and the IP header in a data link layer header for a next hop in an IP network.

4. The method of claim 1, wherein the reliable transport layer is connection-oriented and guarantees reliable delivery of the payload via the connectionless GRE tunnel.

5. The method of claim 4, wherein the reliable transport layer guarantees reliable delivery of GRE packets between source and destination IP addresses in an IP underlay tunnel.

6. The method of claim 1, wherein the reliable transport layer provides secure delivery of the payload via the connectionless GRE tunnel, and wherein the secure delivery includes encryption by the reliable transport layer.

7. The method of claim 1, wherein the payload is encapsulated in the GRE control header in response to the connection formed using the reliable transport layer being stream-oriented and transporting a stream of bytes.

8. The method of claim 7, wherein the GRE control header demarcates a GRE packet within the stream of bytes.

9. The method of claim 8, wherein the GRE control header comprises a length field that indicates a size of the GRE packet in the stream of bytes, and wherein the length field in the GRE control header is used to determine an ending byte of the GRE packet.

10. The method of claim 1, wherein encapsulating the payload in the GRE header comprises encapsulating the payload in a network virtualization using GRE (NVGRE) header that allows multiple NVGRE overlays to be multiplexed onto a single IP underlay tunnel.

11. The method of claim 10, wherein the NVGRE header comprises a virtual subnet identifier (VSID) field that indicates one of the multiple NVGRE overlays supported by the NVGRE.

12. The method of claim 1, further comprising:
performing at least one of flow control or congestion control using the reliable transport layer.

13. The method of claim 1, wherein the reliable transport layer comprises at least one of a Transmission Control Protocol (TCP) layer, a Stream Control Transmission Protocol (SCTP) or a QUIC protocol to establish a set of multiplexed sub-connections or streams over a single connection between two endpoints of the GRE tunnel, or a transport layer security (TLS) cryptographic protocol.

14. A router comprising:
a processor configured to:
encapsulate a payload of a packet in a generic routing encapsulation (GRE) header that defines a connectionless GRE tunnel;
encapsulate the payload and the GRE header in a GRE control header; and
encapsulate the payload, the GRE header, and the GRE control header in at least one reliable transport header associated with a connection formed using a reliable transport layer; and
a transmitter configured to convey the payload, the GRE header, the GRE control header, and the at least one reliable transport header over the reliable transport layer.

15. The router of claim 14, wherein the processor is further configured to:
encapsulate the payload, the GRE header, the GRE control header, and the at least one reliable transport header in an IP header of an IP underlay tunnel in an IP network.

16. The router of claim 15, wherein the processor is further configured to:
encapsulate the payload, the GRE header, the GRE control header, the at least one reliable transport header, and the IP header in a data link layer header for a next hop in an IP network.

17. The router of claim 14, wherein the reliable transport layer is connection-oriented and guarantees reliable delivery of the payload via the connectionless GRE tunnel.

18. The router of claim 17, wherein the reliable transport layer guarantees reliable delivery of GRE packets between source and destination IP addresses in an IP underlay tunnel.

19. The router of claim 14, wherein the reliable transport layer provides secure delivery of the payload via the connectionless GRE tunnel, and wherein the secure delivery includes encryption by the reliable transport layer.

20. The router of claim 14, wherein the processor is configured to encapsulate the payload in the GRE control header in response to the connection formed by the reliable transport layer being stream-oriented and transporting a stream of bytes.

21. The router of claim 20, wherein the GRE control header demarcates a GRE packet within the stream of bytes.

22. The router of claim 21, wherein the GRE control header comprises a length field that indicates a size of the GRE packet in the stream of bytes, and wherein the length field in the GRE control header is used to determine an ending byte of the GRE packet.

23. The router of claim 14, wherein the processor is configured to encapsulate the payload in a network virtualization using GRE (NVGRE) header that allows multiple NVGRE overlays to be multiplexed onto a single IP underlay tunnel.

24. The router of claim 23, wherein the NVGRE header comprises a virtual subnet identifier (VSID) field that indicates one of the multiple NVGRE overlays supported by the NVGRE.

25. The router of claim 14, wherein the processor is configured to perform at least one of flow control or congestion control using the reliable transport layer.

26. The router of claim 14, wherein the processor is configured to perform encryption using the reliable transport layer.

27. The router of claim 14, wherein the reliable transport layer comprises at least one of a Transmission Control Protocol (TCP) layer, a Stream Control Transmission Protocol (SCTP) or a QUIC protocol to establish a set of multiplexed sub-connections or streams over a single connection between two endpoints of the tunnel, or a transport layer security (TLS) cryptographic protocol.

28. An apparatus comprising:
at least one processor; and
at least one memory including instructions which, when executed by the at least one processor, cause the apparatus at least to perform:
encapsulating, at a router, a payload in a generic routing encapsulation (GRE) header that defines a connectionless GRE tunnel;
encapsulating, at the router, the payload and the GRE header in a GRE control header;
encapsulating, at the router, the payload, the GRE header, and the GRE control header in at least one reliable transport header associated with a connection formed using a reliable transport layer; and
conveying the payload, the GRE header, the GRE control header, and the at least one reliable transport header over the reliable transport layer.

29. The apparatus of claim 28, wherein the instructions, when executed by the at least one processor, cause the apparatus at least to perform:
encapsulating, at the router, the payload, the GRE header, the GRE control header, and the at least one reliable transport header in an IP header of an IP underlay tunnel in an IP network; and
encapsulating, at the router, the payload, the GRE header, the GRE control header, the at least one reliable transport header, and the IP header in a data link layer header for a next hop in an IP network.

30. The apparatus of claim 28, wherein the instructions, when executed by the at least one processor, cause the apparatus at least to perform:
encapsulating the payload in a network virtualization using GRE (NVGRE) header that allows multiple NVGRE overlays to be multiplexed onto a single IP underlay tunnel, wherein the NVGRE header comprises a virtual subnet identifier (VSID) field that indicates one of the multiple NVGRE overlays supported by the NVGRE.

31. The apparatus of claim 28, wherein the instructions, when executed by the at least one processor, cause the apparatus at least to perform:
performing at least one of flow control or congestion control using the reliable transport layer.

* * * * *